US010640969B2

(12) United States Patent
Grosch et al.

(10) Patent No.: US 10,640,969 B2
(45) Date of Patent: May 5, 2020

(54) CUBE COUPLING JOINT

(71) Applicant: BuildXGroup, Inc., Newport Beach, CA (US)

(72) Inventors: Gregory E. Grosch, Newport Beach, CA (US); Tarek M. Mokhtar, Newport Beach, CA (US)

(73) Assignee: BuildXGroup, Inc., Newport Beach, CA (US)

( * ) Notice: Subject to any disclaimer, the term of this patent is extended or adjusted under 35 U.S.C. 154(b) by 0 days.

(21) Appl. No.: 16/277,777

(22) Filed: Feb. 15, 2019

(65) Prior Publication Data
US 2019/0257070 A1 Aug. 22, 2019

Related U.S. Application Data

(60) Provisional application No. 62/731,510, filed on Sep. 14, 2018, provisional application No. 62/631,754, filed on Feb. 17, 2018.

(51) Int. Cl.
*E04B 1/19* (2006.01)
*F16B 7/18* (2006.01)
(Continued)

(52) U.S. Cl.
CPC .............. *E04B 1/1912* (2013.01); *E04B 1/40* (2013.01); *E04B 1/5831* (2013.01); *F16B 7/182* (2013.01);
(Continued)

(58) Field of Classification Search
CPC .. E04B 1/1912; E04B 1/40; E04B 2001/1972; E04B 2001/1918;
(Continued)

(56) References Cited

U.S. PATENT DOCUMENTS 2,956,705 A   10/1960   Clingman
3,182,846 A    5/1965   Kaff
(Continued)

FOREIGN PATENT DOCUMENTS

DE   2833428 A1 * 2/1980 ......... A47B 47/0016
DE   3734533 A1 * 5/1989 ........... E04B 1/2403
(Continued)

OTHER PUBLICATIONS

Search Report and Written Opinion received in International Application No. PCT/US2019/018236 dated Apr. 29, 2019, in 22 pages.

*Primary Examiner* — Christine T Cajilig
(74) *Attorney, Agent, or Firm* — Knobbe, Martens, Olson & Bear, LLP

(57) ABSTRACT

A joint assembly for joining structural members in a building frame can comprise: a marriage strap including one or more through-holes; one or more fasteners configured to be inserted through the one or more through-holes of the marriage strap; and a cube coupling joint including one or more recessed channels sized and shaped to receive a portion of the marriage strap, one or more fastener holes located within the one or more recessed channels and configured to receive and secure to the one or more fasteners. In some embodiments, the marriage strap is configured to be inserted into the one or more recessed channels of the cube coupling joint and the one or more fasteners are further configured to be inserted into and secured to the one or more fastener holes of the cube coupling joint.

33 Claims, 39 Drawing Sheets

(51) Int. Cl.
  *E04B 1/41* (2006.01)
  *E04B 1/58* (2006.01)
  *E04B 1/24* (2006.01)

(52) U.S. Cl.
  CPC ...... *F16B 7/185* (2013.01); *E04B 2001/1972* (2013.01); *E04B 2001/2406* (2013.01); *E04B 2001/2418* (2013.01); *E04B 2001/2451* (2013.01)

(58) Field of Classification Search
  CPC ..... E04B 2001/2406; E04B 2001/2418; E04B 1/5831; E04B 1/1903; F16B 7/185; F16B 7/182
  See application file for complete search history.

(56) References Cited

U.S. PATENT DOCUMENTS

| | | | |
|---|---|---|---|
| 3,532,369 A | 10/1970 | Reilly | |
| 3,685,863 A | 8/1972 | Oetiker | |
| 3,890,022 A | 6/1975 | Moon | |
| 3,921,360 A | 11/1975 | Baldwin | |
| 3,982,841 A | 9/1976 | Endzweig | |
| 4,344,716 A | 8/1982 | Sigel | |
| 4,610,561 A | 9/1986 | Cecchellero et al. | |
| 4,678,359 A | 7/1987 | Keen | |
| 4,844,648 A | 7/1989 | Fentiman | |
| 4,925,330 A | 5/1990 | Cornish | |
| 5,033,901 A | 7/1991 | Dias | |
| 5,498,094 A | 3/1996 | Imai | |
| 5,611,187 A | 3/1997 | Jones | |
| 6,135,687 A * | 10/2000 | Leek | F16B 31/028 411/10 |
| 6,378,265 B1 | 4/2002 | Konstandt | |
| 6,390,719 B1 | 5/2002 | Chan | |
| 6,516,955 B1 | 2/2003 | Dudhwala et al. | |
| 6,758,354 B2 | 7/2004 | Carletti | |
| 6,854,238 B2 * | 2/2005 | Boots | A47B 47/027 403/176 |
| 7,204,064 B2 | 4/2007 | Cazzolaro | |
| 7,334,377 B2 * | 2/2008 | Dubensky | E04B 1/3483 52/653.2 |
| 7,677,010 B2 | 3/2010 | Boots | |
| 8,020,328 B2 * | 9/2011 | Lavi | A47B 47/0016 40/605 |
| 8,468,775 B2 | 6/2013 | Vaughn | |
| 8,789,335 B2 | 7/2014 | Davis et al. | |
| 8,959,867 B2 | 2/2015 | Schold | |
| 9,458,874 B2 | 10/2016 | Sim | |
| 10,450,737 B2 * | 10/2019 | Bowron | E04B 1/34326 |
| 2002/0059770 A1 | 5/2002 | Fritsche et al. | |
| 2002/0189191 A1 | 12/2002 | Strassle et al. | |
| 2007/0110511 A1 * | 5/2007 | Chen | A47B 57/40 403/230 |
| 2008/0110127 A1 | 5/2008 | Terada et al. | |
| 2009/0313938 A1 | 12/2009 | Li | |
| 2011/0047925 A1 | 3/2011 | Gan | |
| 2012/0009013 A1 | 1/2012 | Evitt | |
| 2013/0101342 A1 * | 4/2013 | Bernardin | A47B 47/0008 403/292 |
| 2014/0150370 A1 | 6/2014 | Daas et al. | |
| 2015/0175763 A1 * | 6/2015 | Kinmount | C08J 5/045 403/375 |
| 2015/0240848 A1 | 8/2015 | Jang et al. | |
| 2015/0377414 A1 * | 12/2015 | Pirseyedi | A47B 47/0016 403/205 |
| 2017/0233996 A1 | 8/2017 | Abernathy et al. | |
| 2017/0234345 A1 * | 8/2017 | Morimoto | A47B 47/0091 439/577 |
| 2018/0171623 A1 * | 6/2018 | Magargee | E04B 1/4157 |

FOREIGN PATENT DOCUMENTS

| | | | |
|---|---|---|---|
| DE | 4315603 A1 | 12/1993 | |
| DE | 9413840 U1 | 10/1995 | |
| DE | 102009005353 A1 * | 7/2010 | ........... E04B 1/5806 |
| DE | 102011119271 A1 * | 5/2013 | ........... E04B 1/5831 |
| FR | 2590943 A1 | 6/1987 | |
| FR | 3042395 A1 | 4/2017 | |
| WO | WO 2004/081308 A1 | 9/2004 | |
| WO | WO-2004085862 A1 * | 10/2004 | ........... F16B 7/182 |
| WO | WO 2009/100551 A1 | 8/2009 | |
| WO | WO2014023982 A1 | 2/2014 | |

* cited by examiner

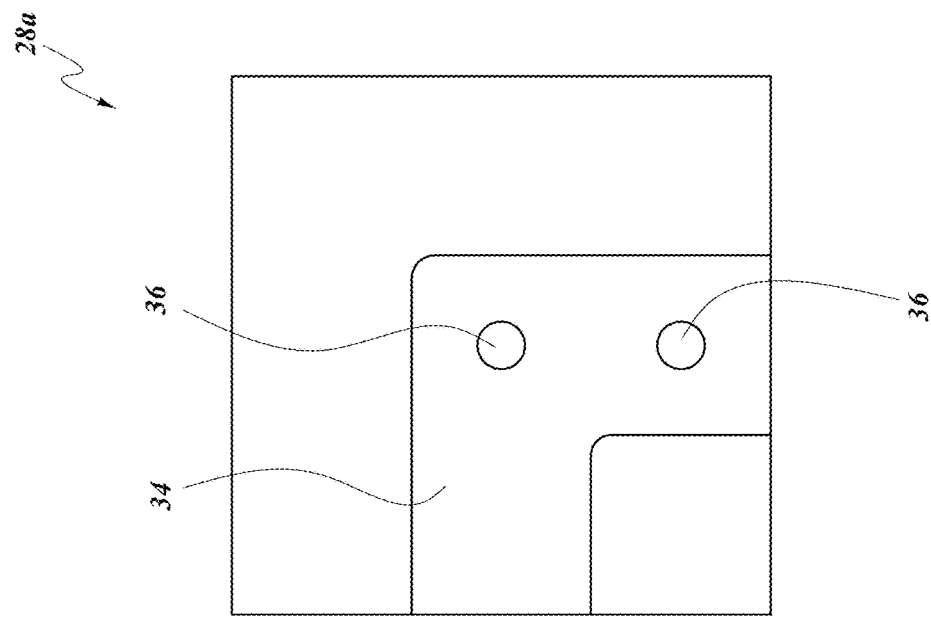
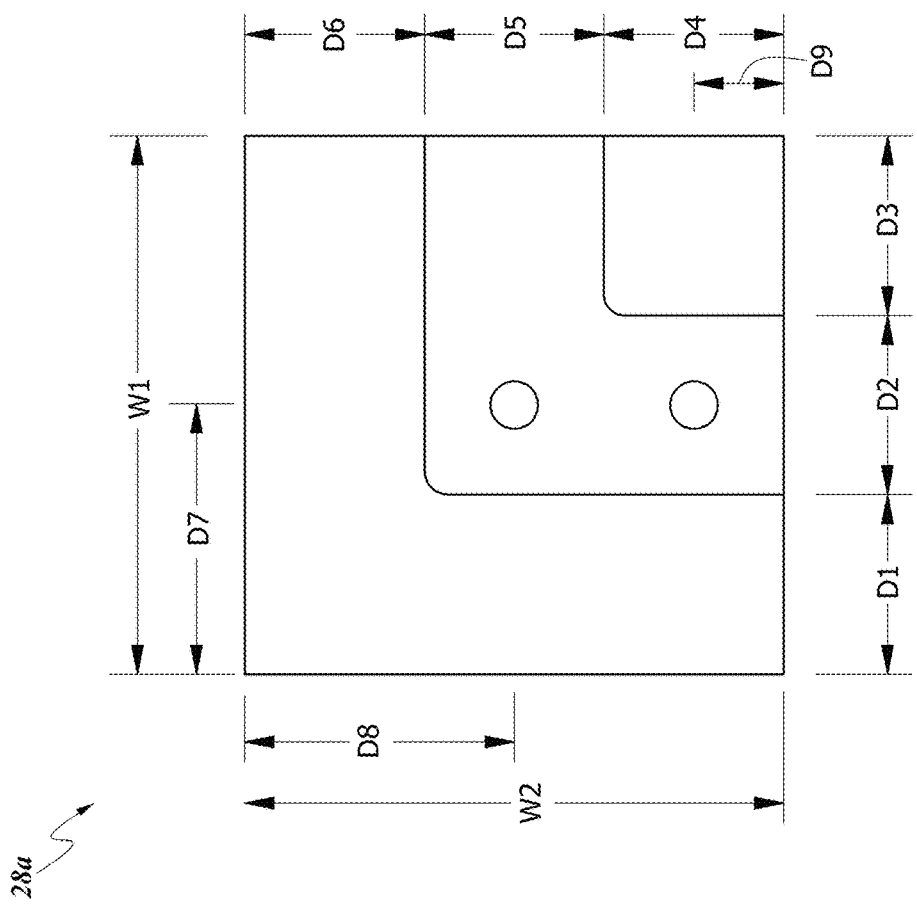
FIG.3D
FIG.3C

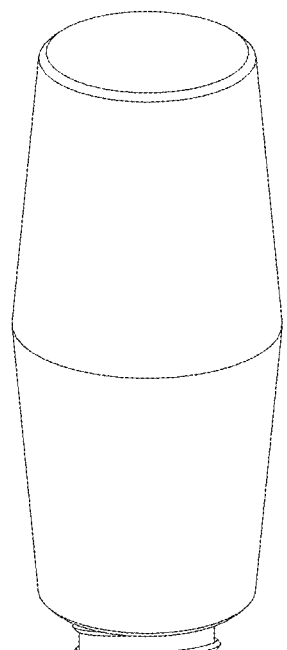
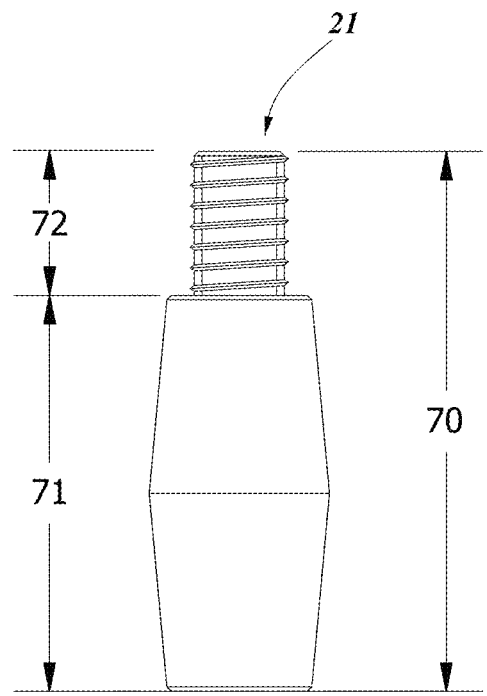
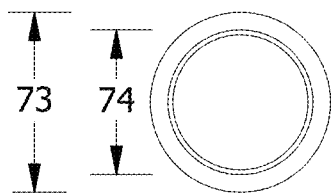
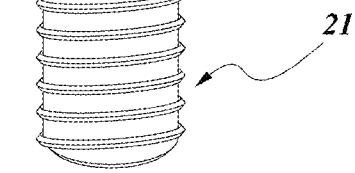
FIG.6A
FIG.6C
FIG.6B

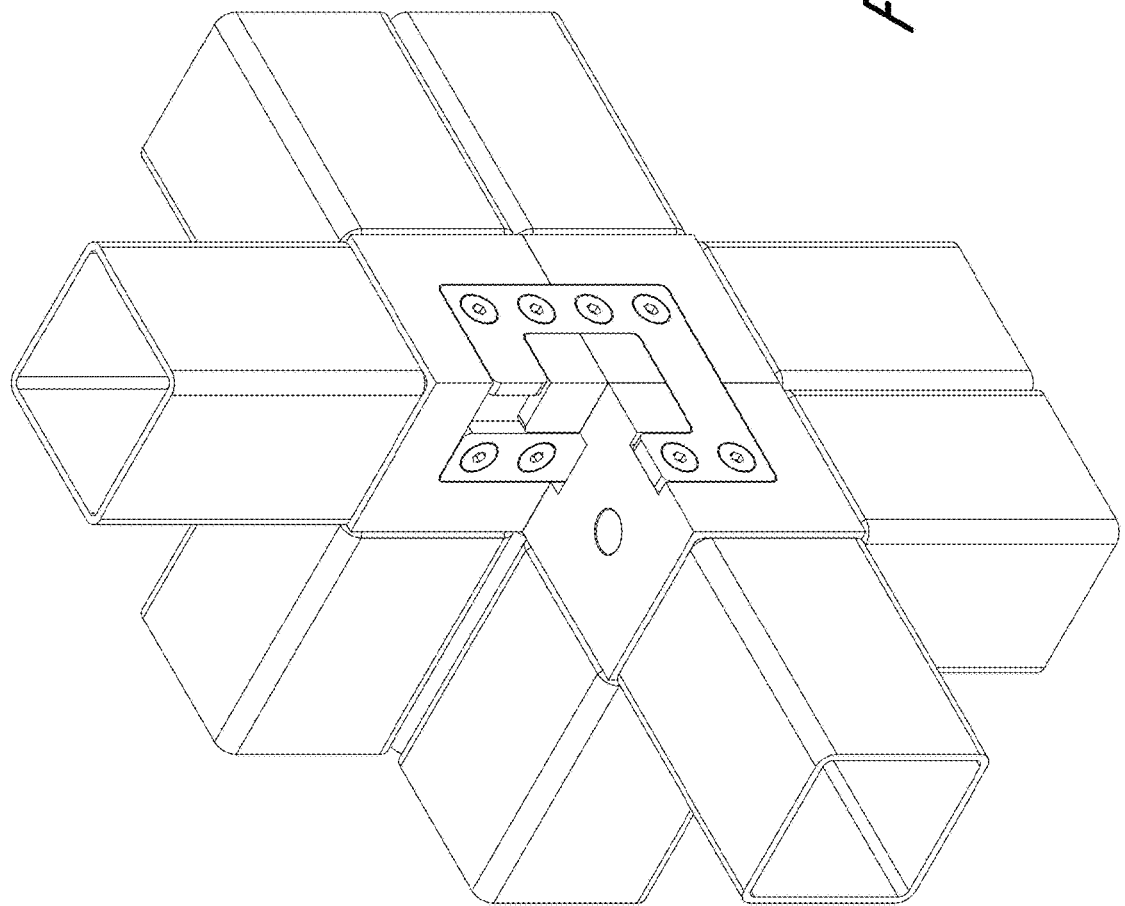

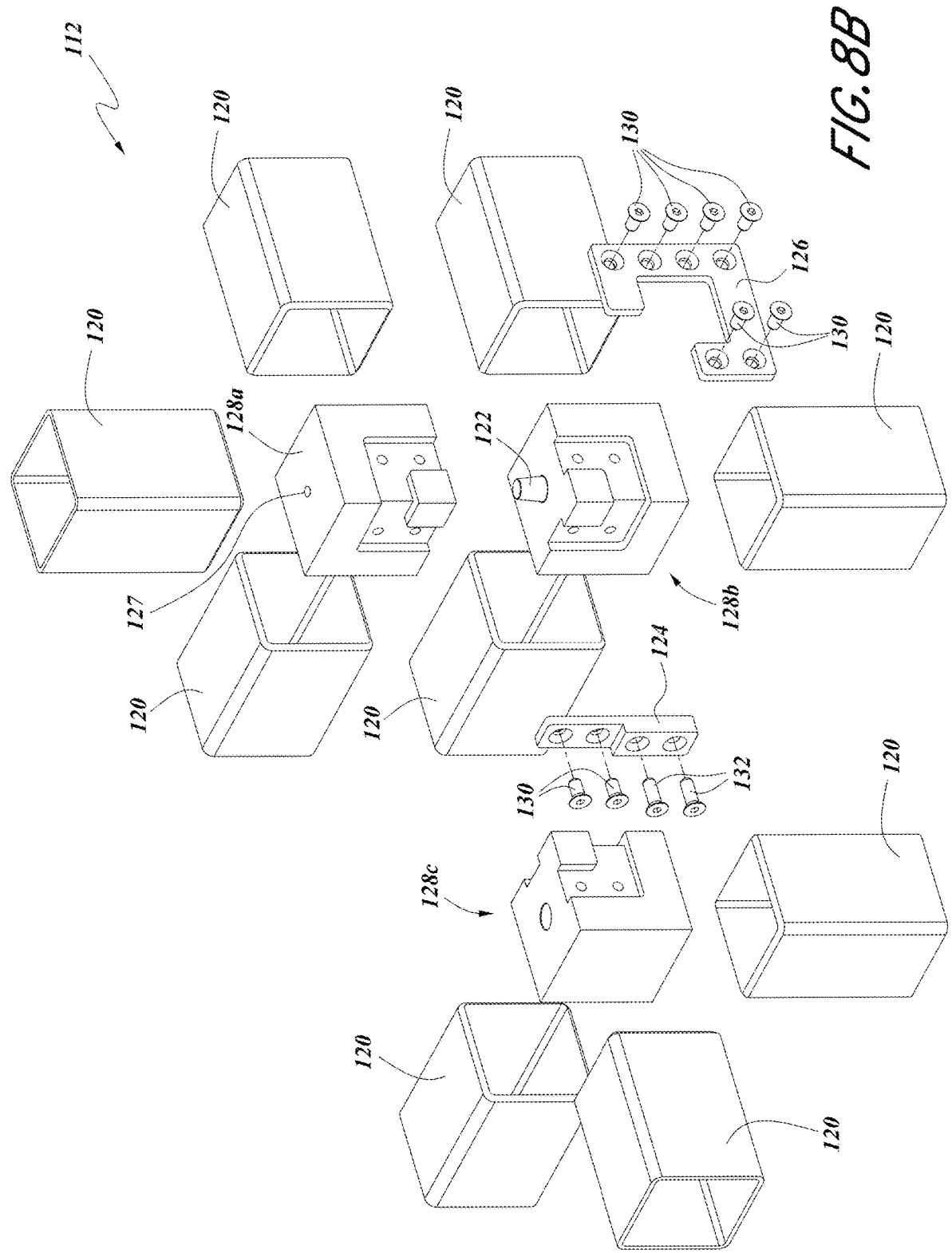

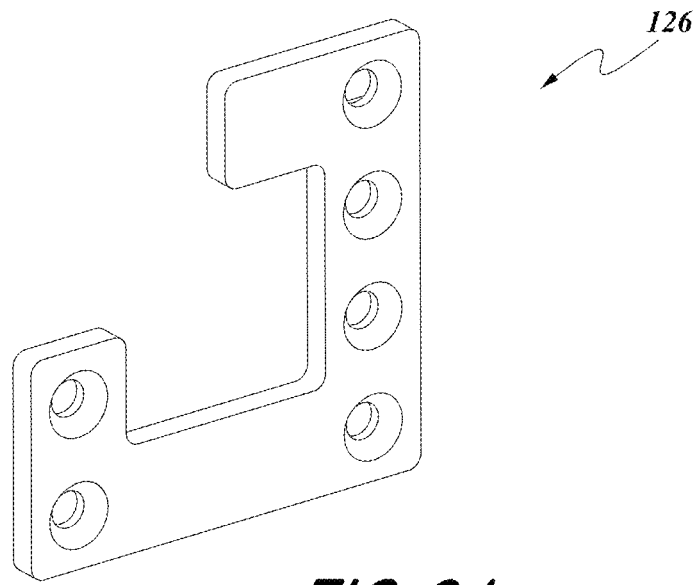
FIG.9A
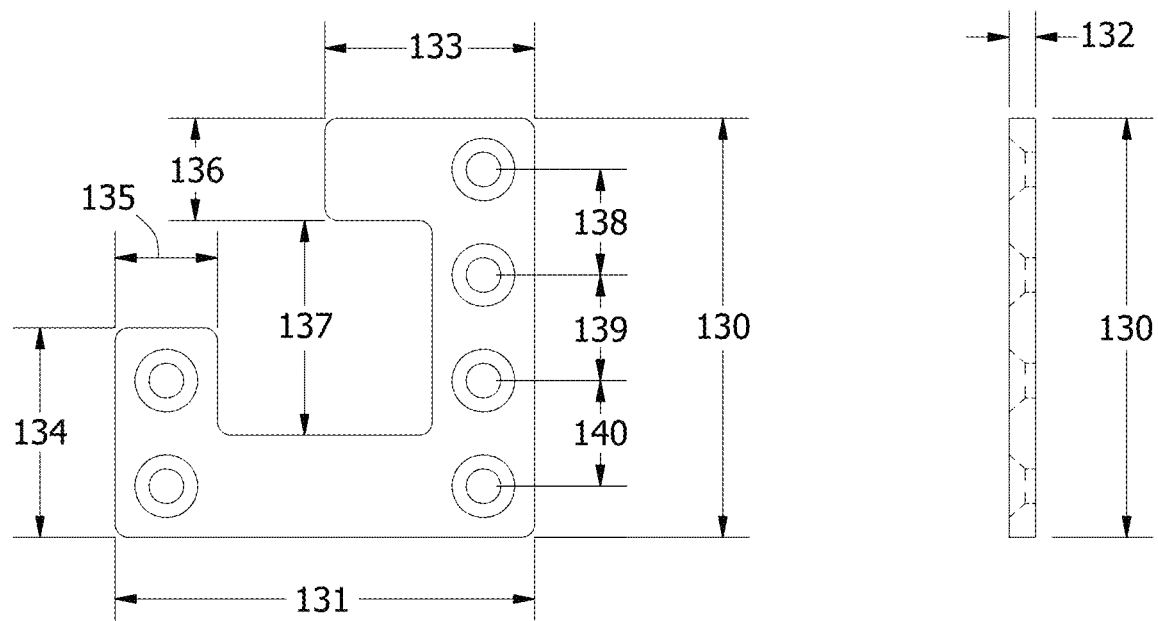
FIG.9B
FIG.9C

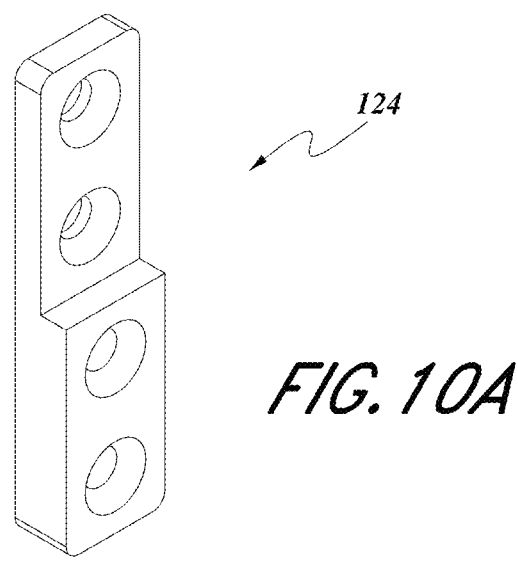
FIG.10A
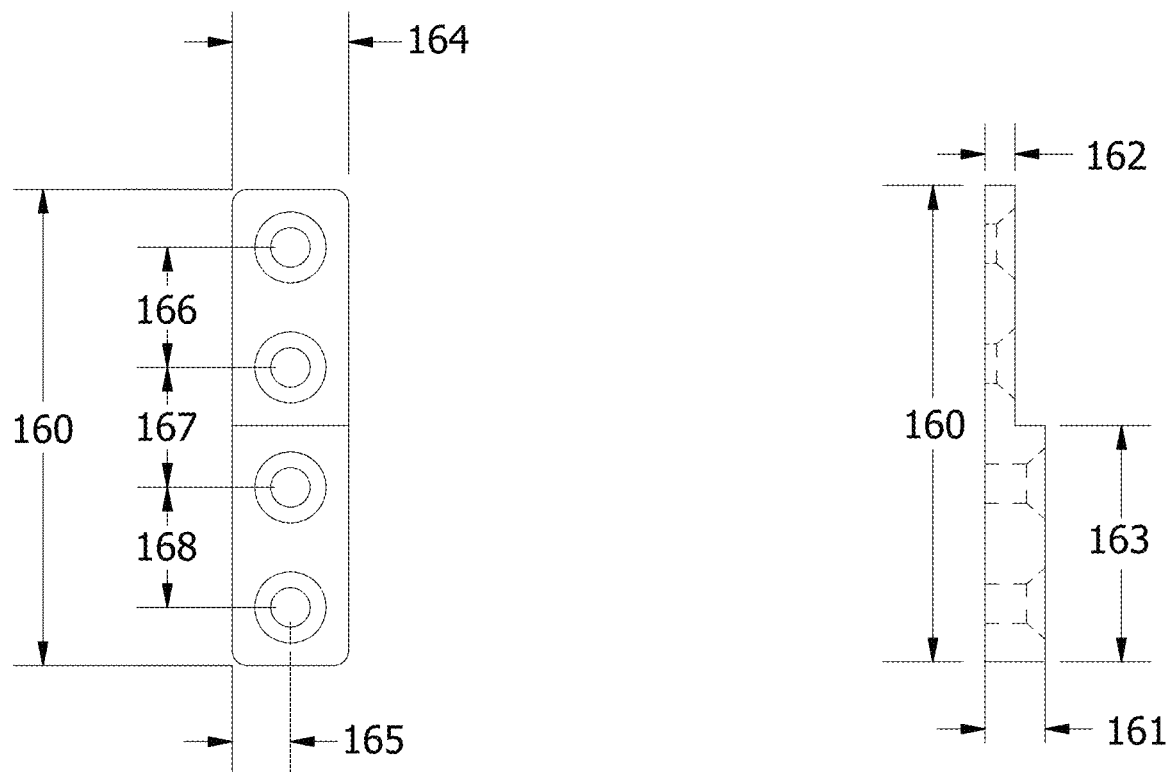
FIG.10B
FIG.10C

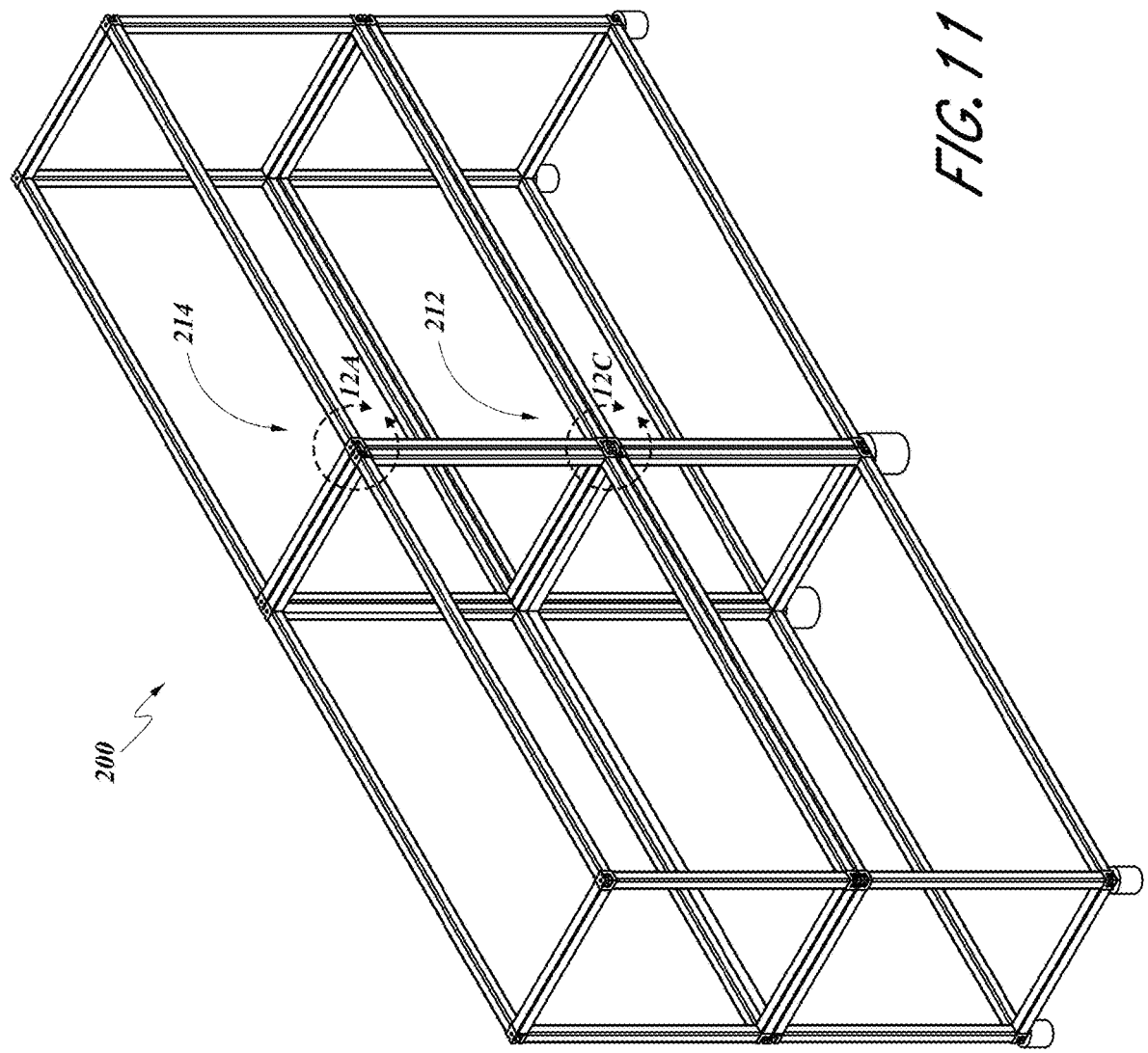

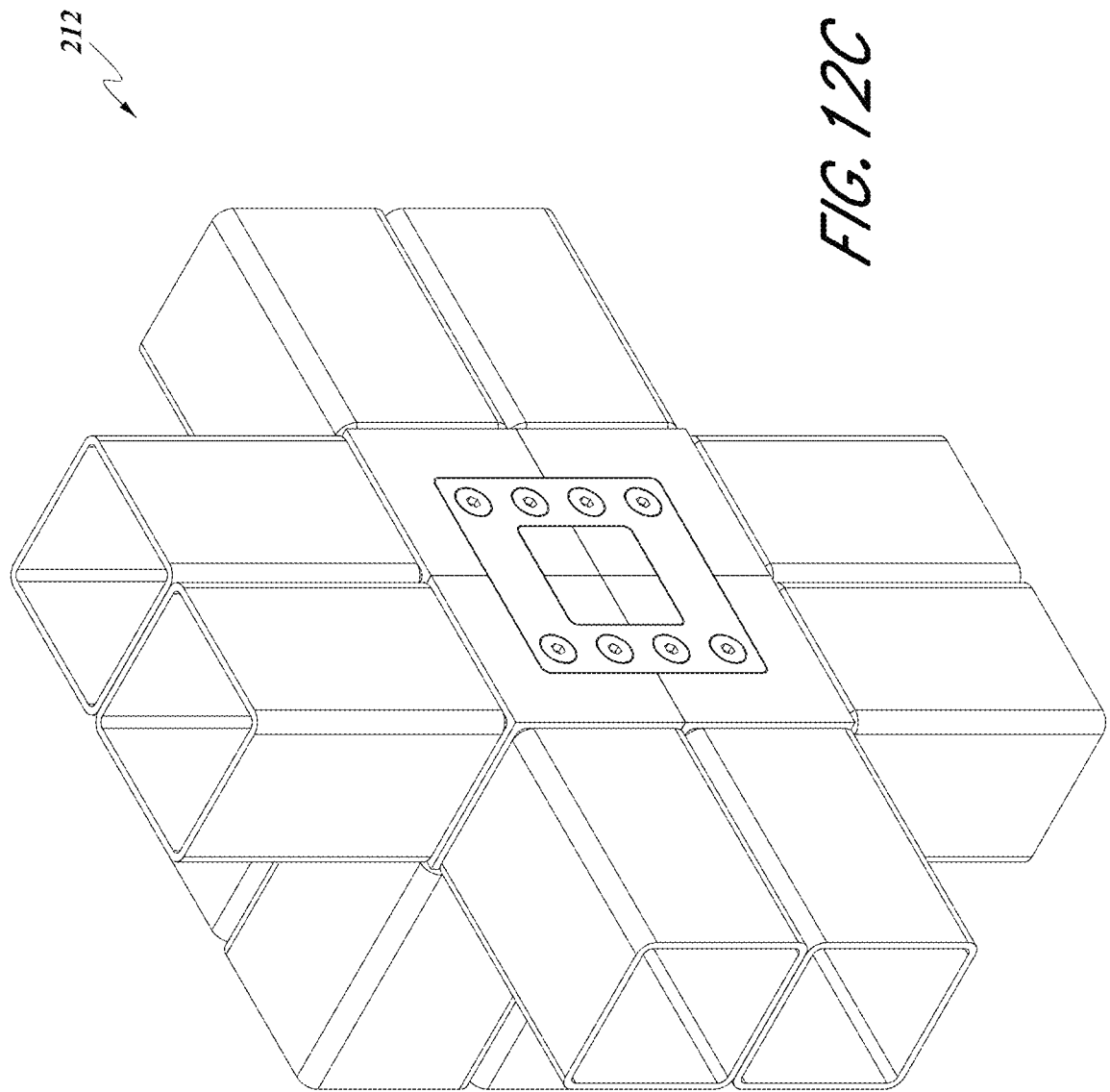

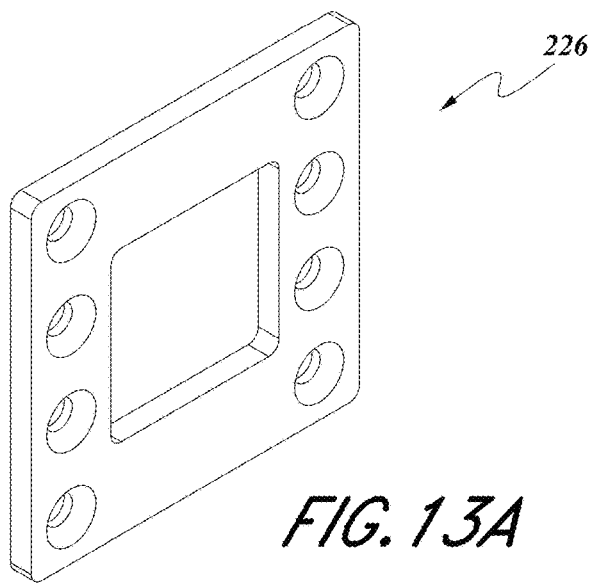
FIG. 13A
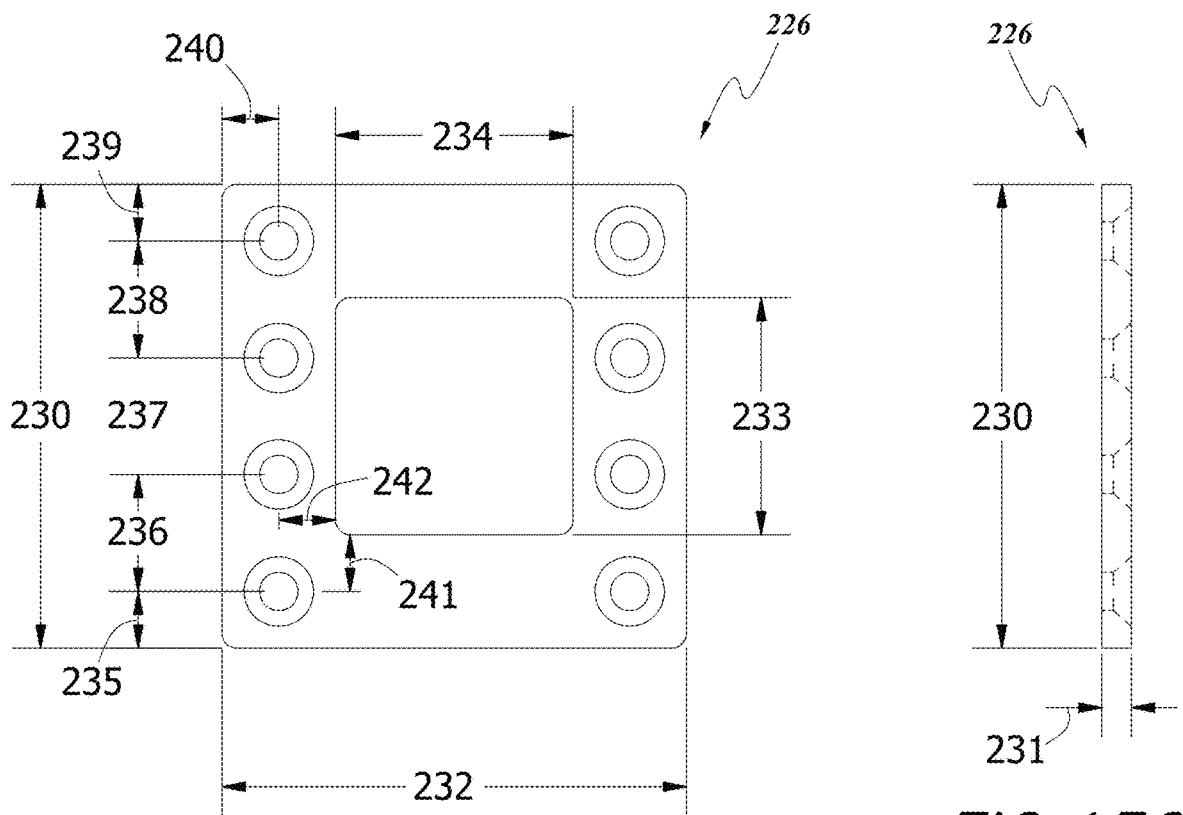
FIG. 13B
FIG. 13C

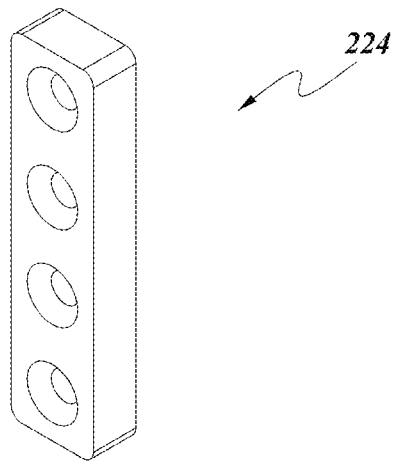
FIG.14A
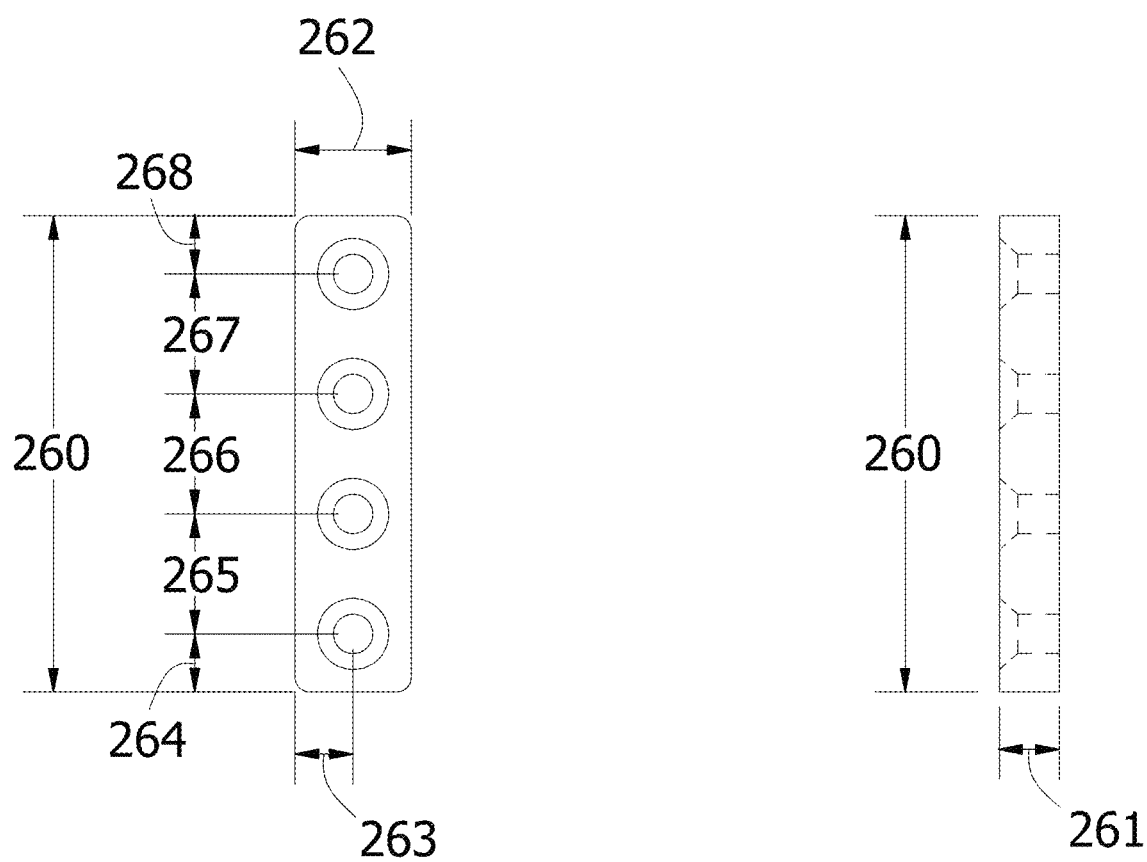
FIG.14B
FIG.14C

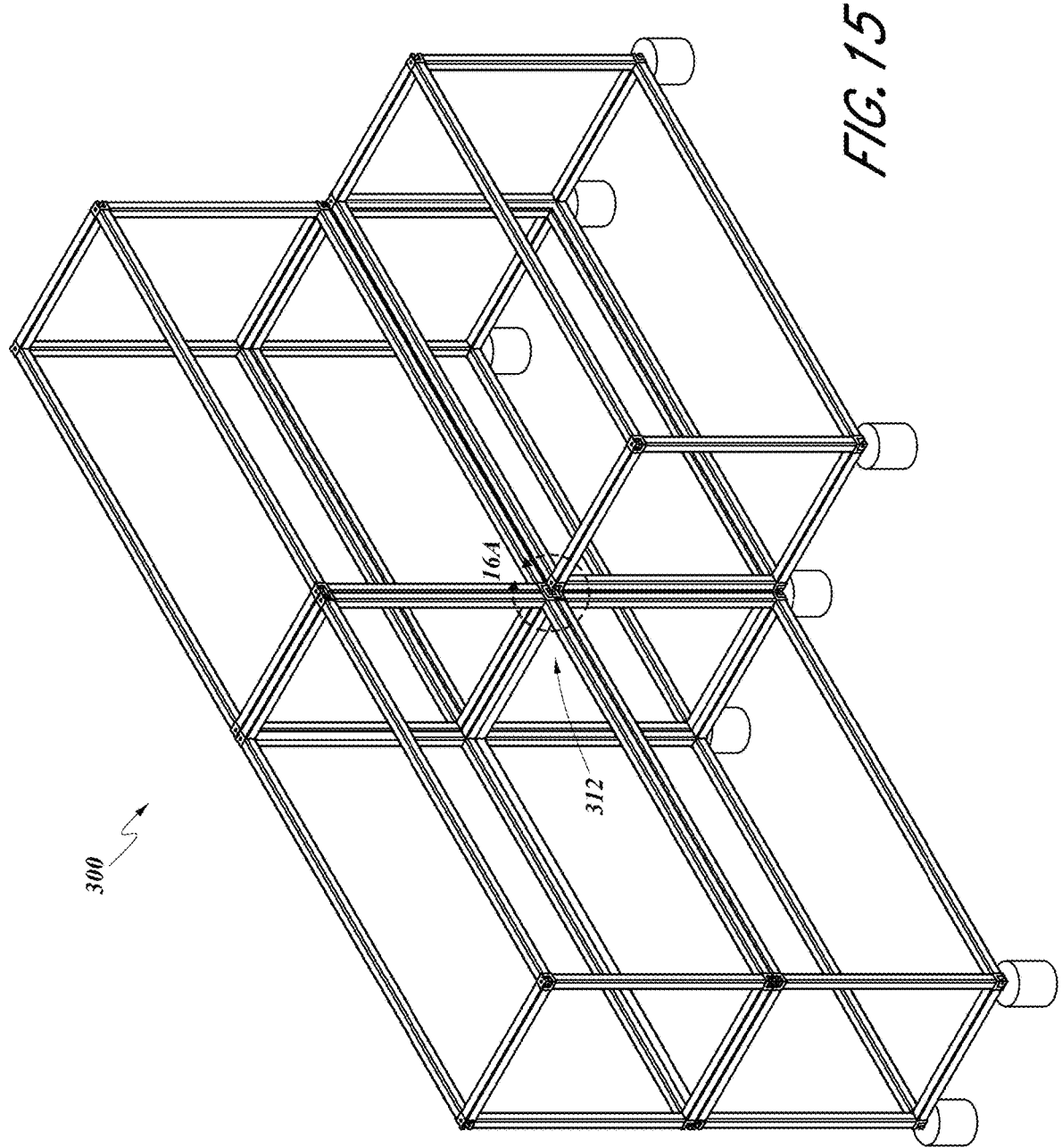

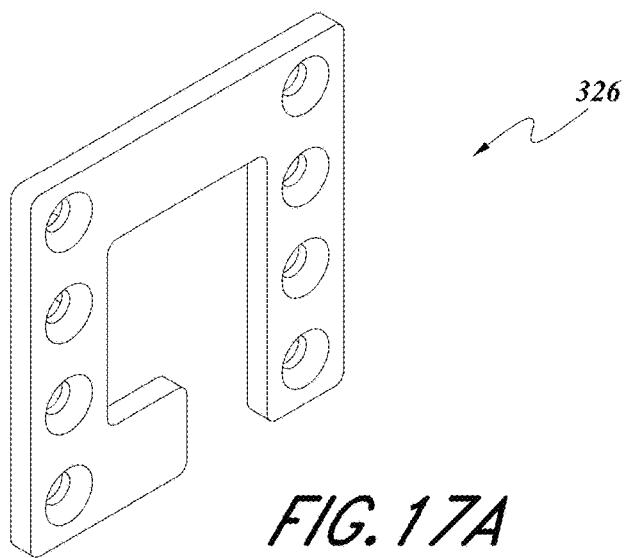
FIG.17A
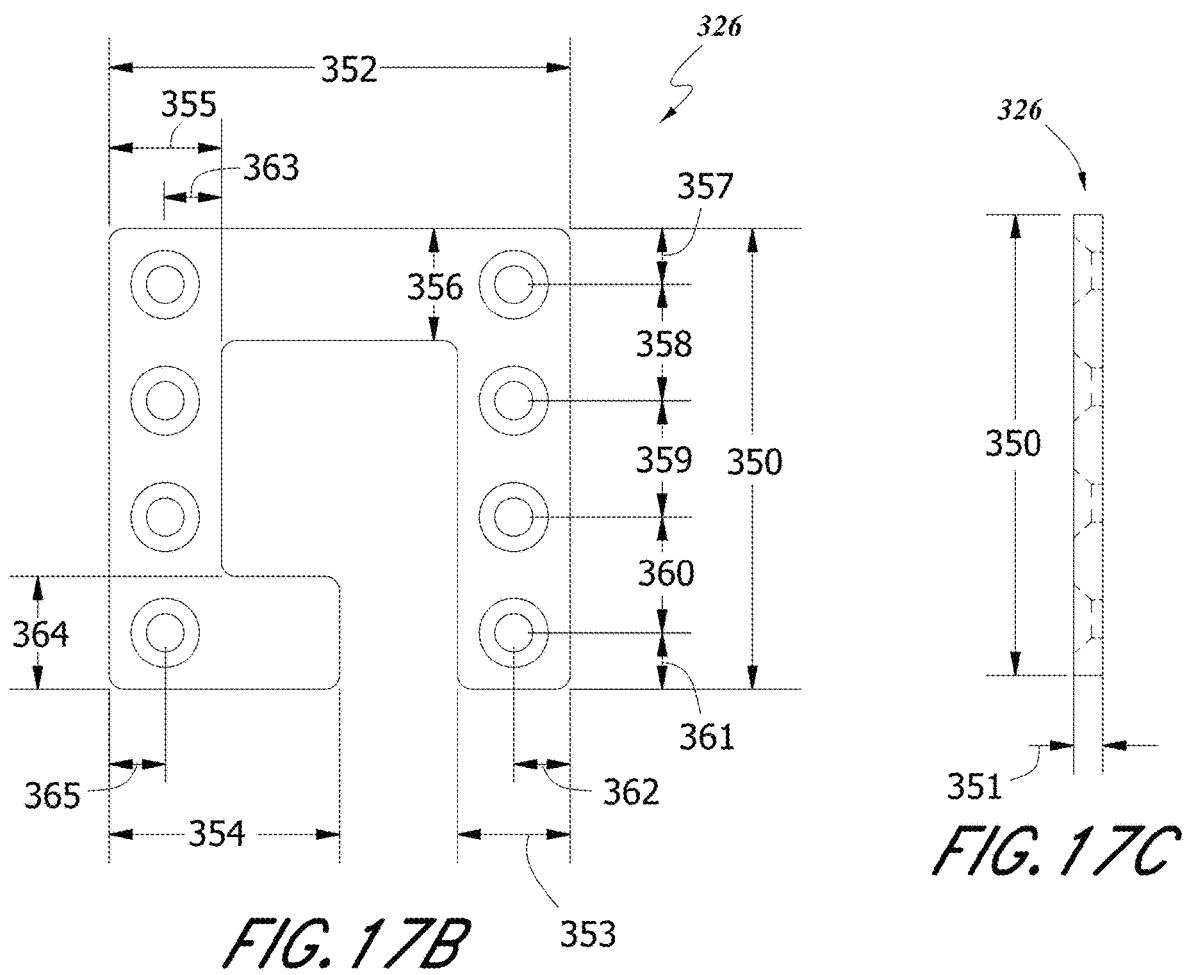
FIG.17B
FIG.17C

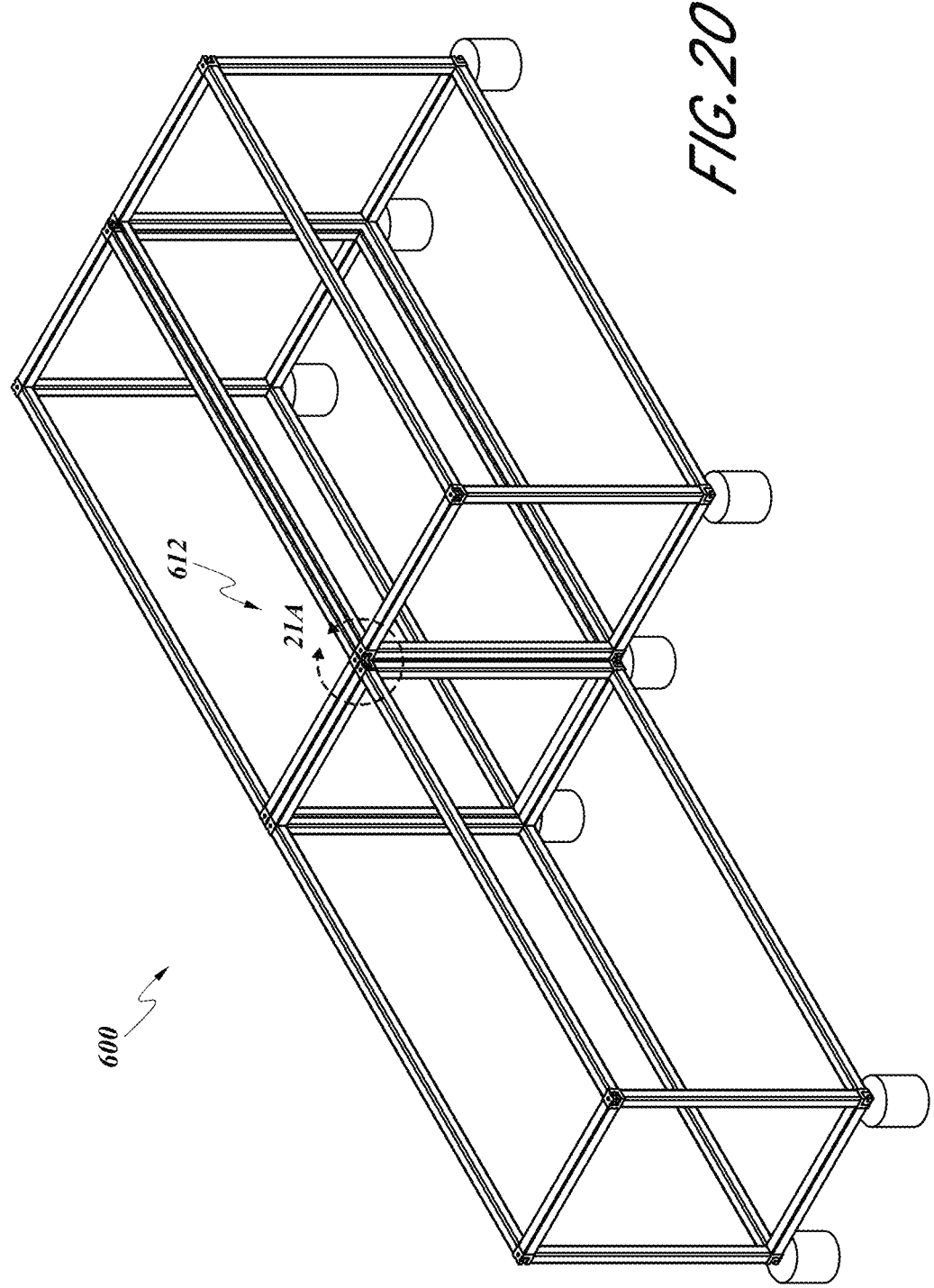

CUBE COUPLING JOINT

INCORPORATION BY REFERENCE TO ANY PRIORITY APPLICATIONS

This application claims priority to U.S. Provisional Application No. 62/631,754, filed Feb. 17, 2018, titled CUBE COUPLING JOINT and U.S. Provisional Application No. 62/731,510, filed Sep. 14, 2018, titled CUBE COUPLING JOINT. The entire contents of the above-identified provisional applications are hereby incorporated by reference herein.

BACKGROUND

Field

This disclosure relates to construction of structures and more particularly to modular structural systems.

Description of the Related Art

Unlike structures built entirely (or substantially) at a construction site, modular structures and buildings are built in sections off-site, such as in factories. In modular construction, pre-manufactured sections of structures are brought to a construction site and joined together by construction teams. Modular structures and construction methods are becoming more popular because they can reduce construction timelines and costs associated or inherent with constructing structures on a construction site (e.g., on-site welding or assembling of structures and/or structural components in difficult conditions, such as weather conditions). Various systems, techniques, and devices have been devised to advance the field of modular construction. However, there is still a need for improvement.

SUMMARY

The systems, methods and devices of this disclosure each have several innovative aspects, no single one of which is solely responsible for the desirable attributes disclosed herein.

Certain aspects of the disclosure relate to the recognition that there is a need for systems, techniques, and/or devices that can reduce the time, effort, and cost of connecting modular, prefabricated sections or frames on a construction jobsite. Certain aspects of the disclosure relate to the recognition of the need for devices that, in addition to facilitating simple connection of modular structures, provide robust capacity to withstand both static (e.g., gravity loads) and dynamic (e.g., wind, seismic) loading conditions.

One aspect of the disclosure relates to joints for coupling structural members together, such as beams and columns in modular building structures. Cube coupling joints can provide multiple advantages. For example, the cube coupling joints described herein can be pre-manufactured and secured to structural members in a factory and installed on a construction jobsite with fasteners and marriage straps, such as those discussed herein. This can allow for convenient and quick construction since installers can simply place the marriage straps in recessed channels on the cube coupling joints and secure them using fasteners. This can also allow assembly of entire floors of modular buildings in a relatively short amount of time. Little or no on-site welding may be required to install modular frame sections using the cube coupling joints described herein. This can be significantly beneficial because on-site welding can be time-consuming and can delay construction timelines. On-site welding can also be costly (e.g., certified welders working in the field often cannot work as fast as they can in a facility with the aid of machinery and other tools). Once a modular structure is installed on a construction jobsite, a certified inspector can visit the site and certify the final product.

Further, unlike other methods and devices for connecting pre-manufactured modular buildings or frames, in aspects of the disclosure, the cube coupling joints can be designed to resist substantial vertical and lateral forces, and other conditions, such as those experienced during a seismic event. For example, the cube coupling joints, along with connected structural members, can form a moment-resisting frame that can withstand seismic loads. The cube coupling joint can be solid or substantially solid and can be made of various materials (e.g., steel) with varying material properties (e.g., yield strength). The marriage straps and fasteners can also be made of various materials with varying material properties and, along with the cube coupling joints, can be designed to withstand greater forces due to seismic loading conditions than connected structural members that are secured to a face of the cube coupling joint, thus controlling the location of failure if significant seismic forces are experienced. For example, the cube coupling joints, marriage straps, and fasteners can be designed to have strength capacity such that the first mode of failure occurs when the beam structural members yield. The system can be designed so that the connected beam structural members develop their plastic capacity when significant loading (e.g., seismic loading) is experienced. The structural members can comprise a variety of materials with varying material properties (e.g., yield strength). Advantageously, the marriage straps discussed and shown herein can help link one or more moment-resisting modular frames together so that the modular frames act in combination to resist lateral forces (such as seismic forces). Such marriage straps can help safely and efficiently transfer lateral forces (as well as, for example, gravity forces) between individual moment-resisting modular frames. In certain aspects of the disclosure, the cube coupling joints, marriage straps, and fasteners disclosed herein provide an efficient method for making additions (or subtractions) of frames/sections in a modular structure in part due to the fact that the one or more recessed channels of the cube coupling joints can be located on exterior-facing surfaces of the cube coupling joint. One skilled in the art will realize that these features can facilitate the connection of many types of frames/sections in modular structures.

In certain aspects of the disclosure, a joint assembly for joining structural members in a building frame can comprise: a marriage strap comprising one or more through-holes; one or more fasteners configured to be inserted through the one or more through-holes of the marriage strap; and a cube coupling joint. The cube coupling joint can comprise: one or more recessed channels sized and shaped to receive a portion of the marriage strap; and one or more fastener holes located within the one or more recessed channels and configured to receive and secure to the one or more fasteners. The marriage strap can be configured to be inserted into the one or more recessed channels of the cube coupling joint and wherein the one or more fasteners are further configured to be inserted into and secured to the one or more fastener holes of the cube coupling joint. The cube coupling joint of the joint assembly can be substantially solid. The marriage strap of the joint assembly, when inserted into the one or more recessed channels, can sit flush with an outer surface of the cube coupling joint. The one or more recessed channels in the cube coupling joint can be L-shaped, C-shaped, and/or G-shaped. A portion of the marriage strap can have the same shape as the one or more recessed channels. The cube coupling joint can further comprise an alignment hole configured to receive an alignment pin, and the alignment pin can be configured to permit alignment of a second cube coupling joint. The joint assembly can further comprise the alignment pin. The alignment pin can be a shear pin. The shear pin can comprise: a first end and a second end, the first end and the second end having an outer diameter; and a middle region having an inner diameter greater than the outer diameter. The outer diameter at the first and second ends can gradually transition to the inner diameter in the middle region.

In certain aspects of the disclosure, a cube coupling joint for joining structural members in a building frame can comprise a substantially solid body. The cube coupling joint can further comprise an anchor portion extending outward from a bottom face of the cube coupling joint configured to secure to a concrete structural foundation with an adhesive material, wherein the anchor portion comprises protrusions for engaging with the adhesive material. The cube coupling joint can comprise hollow portions and/or reduced cross-section areas which comprise a total volume that is less than 50% of a volume of the cube coupling joint. The cube coupling joint can comprise hollow portions and/or reduced cross-section areas which comprise a total volume that is less than 20% of a volume of the cube coupling joint. The cube coupling joint can further comprise: one or more recesses sized and shaped to receive a portion of a marriage strap; one or more fastener holes located within the one or more recesses configured to receive and secure to one or more fastener stems; and one or more alignment holes configured to receive one or more alignment pins to permit alignment of a second cube coupling joint. A total volume of the one or more recesses, one or more fastener holes, and one or more alignment holes can be less than or equal to 40% of a volume of the cube coupling joint. A total volume of the one or more recesses, one or more fastener holes, and one or more alignment holes can be less than or equal to 25% of a volume of the cube coupling joint. The cube coupling joint can further comprise a recessed channel sized and shaped to receive a portion of a marriage strap and a fastener hole located within the recessed channel configured to receive and secure to a fastener stem. A thickness of the marriage strap can be within 5% of a depth of the recessed channel of the cube coupling joint. The recessed channel in the cube coupling joint can comprise an L-shape. The fastener hole of the cube coupling joint can be configured to align with a through-hole in the marriage strap, and the marriage strap can comprise a tapered perimeter around the through-hole. The tapered perimeter can be configured to allow a fastener head to rest within the tapered perimeter to create a flush plane between the fastener head and an outer surface of the marriage strap when the fastener stem is fully inserted through the through-hole of the marriage strap. The cube coupling joint can further comprise an alignment hole configured to receive an alignment pin to permit alignment of a second cube coupling joint. The alignment pin can comprise a first portion extending from an outer end of the alignment pin to a middle region of the alignment pin, wherein the outer end has a first diameter and the middle region has a second diameter greater than the first diameter, and wherein the alignment hole of the second cube coupling joint is sized and shaped to accommodate the first portion of the alignment pin.

In certain aspects of the disclosure, a method of connecting two modular frames can comprise: providing a first corner of a first modular frame including a first cube coupling joint and at least one structural member secured to a first face of the first cube coupling joint; providing a second corner of a second modular frame including a second cube coupling joint and at least one structural member secured to a second face of the second cube coupling joint; aligning said first corner of said first modular frame with said second corner of said second modular frame with an alignment pin configured for insertion into a first alignment hole located on an alignment face of the first cube coupling joint and a second alignment hole located on an alignment face of the second cube coupling joint; inserting a first portion of a marriage strap within a first recessed channel located on a recessed face of the first cube coupling joint and inserting a second portion of the marriage strap within a second recessed channel located on a recessed face of the second cube coupling joint, wherein the marriage strap comprises one or more through-holes configured to align with one or more fastener holes within the first and second recessed channels; securing the first cube coupling joint and second cube coupling joint together by inserting one or more fasteners through the one or more through-holes in the marriage strap and threading the one or more fasteners into the one or more fastener holes in the first and second cube coupling joints. The marriage strap can further comprise tapered perimeters surrounding the one or more through-holes, wherein a thickness of the marriage strap is substantially equal to a depth of the first and second recessed channels, and wherein, when the one or more fasteners are threaded into the one or more fastener holes in the first and second cube coupling joints, a head of the one or more fasteners is substantially flush with a surface of the marriage strap and wherein, when the first and second portions of the marriage strap are inserted within the first and second recessed channels, the surface of the marriage strap is substantially flush with the recessed faces of the first and second cube coupling joints. The at least one structural members can be secured to the first and second faces of the first and second cube coupling joints by welding prior to delivery to a construction site. The marriage strap can comprise an L-shape and/or a C-shape. The marriage strap can be sized and shaped to fit entirely within the first and second recessed channels of the first and second cube coupling joints. The first recessed channel can comprise an L-shape. The first and second cube coupling joints can be substantially solid. Each of the first and second cube coupling joints can comprise hollow portions and/or reduced cross-section areas which comprise a total volume that is less than 40% of a volume of each of the first and second cube coupling joints. Each of the first and second cube coupling joints can comprise hollow portions and/or reduced cross-section areas which comprise a total volume that is less than 20% of a volume of each of the first and second cube coupling joints. The first alignment hole, first recessed channel, and one or more fastener holes of the first cube coupling joint can comprise a total volume that is less than 25% of a volume of the first cube coupling joint.

In certain aspects of the disclosure, a modular structure can comprise structural members having hollow structural sections which are coupled to substantially solid cube coupling joints, wherein the cube coupling joints are connected to each other with marriage straps extending within recesses of the cube coupling joints. The marriage straps can comprise through-holes configured to permit fasteners to pass therethrough and secure to the cube coupling joints. The marriage straps can have thicknesses within 5% of depths of the recesses of the cube coupling joints. The marriage straps can have thicknesses within 2% of depths of the recesses of the cube coupling joints. The fasteners can have threaded surfaces which can cooperate with and secure to threaded fastener holes in the recesses of the cube coupling joints. The threaded fasteners holes can be configured to align with the through-holes of the marriage straps.

In certain aspects of the disclosure, a cube coupling joint assembly for joining structural members in a building frame can comprise: a cube coupling joint comprising one or more recessed channels sized and shaped to receive one or more marriage straps and at least one hole located within the one or more recessed channels configured to receive and secure to a fastener; and wherein one or more marriage straps is inserted into the one or more recessed channels and wherein the fastener is inserted through a through-hole of the one or more marriage straps. The cube coupling joint of the cube coupling joint assembly can be substantially solid. The cube coupling joint of the cube coupling joint assembly can include at least one alignment hole configured to receive an alignment pin configured to permit alignment of a second cube coupling joint. The cube coupling joint assembly can further comprise the alignment pin. The one or more marriage straps, when positioned in the one or more recessed channels, can sit flush with an outer surface of the cube coupling joint.

In certain aspects of the disclosure, a cube coupling joint for joining structural members in a building frame can comprise a substantially solid body. The cube coupling joint can further comprise one or more recessed channels sized and shaped to receive one or more marriage straps. The cube coupling joint can further comprise at least one hole located within the one or more recessed channels and configured to receive and secure to a fastener.

In certain aspects of the disclosure, a cube coupling joint for joining structural members in a building frame can comprise one or more recessed channels sized and shaped to receive one or more marriage straps and at least one hole located within the one or more recessed channels and configured to receive and secure to a fastener.

In certain aspects of the disclosure, a cube coupling joint for joining structural members in a building frame can comprise: one or more recessed channels sized and shaped to receive one or more marriage straps, the one or more marriage straps including one or more through-holes surrounded by a tapered perimeter for allowing a fastener stem to pass through the through-hole and a fastener head to rest within the tapered perimeter thereby creating a flush plane between the fastener head and an outer surface of the one or more marriage straps when the fastener is fully inserted through the through-hole of the one or more marriage straps; at least one alignment hole configured to receive an alignment pin configured to permit alignment of a second cube coupling joint; at least one threaded hole located within the one or more recessed channels and configured to receive and secure to the fastener stem; wherein, when the one or more marriage straps is inserted into the one or more recessed channels and the fastener stem is inserted through the through-holes of the one or more marriage straps and secured to the at least one threaded hole located within the one or more recessed channels, the outer surface of the one or more marriage straps and a remainder surface surrounding the one or more recessed channels of the cube coupling joint are substantially flush with one another; and wherein the cube coupling joint is substantially solid.

In certain aspects of the disclosure, a method of connecting two modular building frames can comprise: providing a first corner of a first modular building frame including a first cube coupling joint and at least one structural member welded to a first face of the first cube coupling joint; providing a second corner of a second modular building frame including a second cube coupling joint and at least one structural member welded to a second face of the second cube coupling joint; aligning said first corner of said first modular building frame with said second corner of said second modular building frame using an alignment pin located on a first alignment face of the first cube coupling joint and an alignment hole located on a second alignment face of the second cube coupling joint; inserting at least one marriage strap at least partially within a first recessed channel located on a first partially recessed face of the first cube coupling joint and a second recessed channel located on a second partially recessed face of the second cube coupling joint, wherein the at least one marriage strap contains tapered holes and the first and second cube coupling joints contain threaded holes; securing the first cube coupling joint and second cube coupling joint together by inserting fasteners through the tapered holes in the at least one marriage strap and threading the fasteners into the threaded holes in the first and second cube coupling joints, wherein, when the fasteners are threaded into the threaded holes in the first and second coupling cubes a head of the fasteners is substantially flush with a surface of the at least one marriage strap and wherein, when the at least one marriage strap is inserted at least partially within the first recessed channel located on the first cube coupling joint and the second recessed channel located on the second cube coupling joint, the surface of the at least one marriage strap is substantially flush with the first partially recessed face of the first cube coupling joint and the second partially recessed face of the second cube coupling joint.

In certain aspects of the disclosure, a modular structure can comprise one or more structural frames. Each of the structural frames can have one or more structural members which are coupled to substantially solid cube coupling joints. The cube coupling joints can be connected to each other with one or more marriage straps extending within and securing to recesses of the cube coupling joints. The marriage straps can comprise through-holes configured to permit fasteners to pass therethrough and secure to the cube coupling joints. The marriage straps can have thicknesses within 5% of depths of the recesses of the cube coupling joints. The marriage straps can have thicknesses within 2% of depths of the recesses of the cube coupling joints. The fasteners can have threaded surfaces and the recesses of the cube coupling joints can have threaded fastener holes configured to align with the through-holes of the marriage straps and secure to the threaded surfaces of the fasteners. The structural members can be hollow.

In certain aspects of the disclosure, a building system can comprise: a plurality of structural members, the plurality of structural members coupled to substantially solid cube coupling joints, wherein the cube coupling joints have one or more recessed channels; and one or more marriage straps configured to fit within and extend between the one or more recessed channels of the substantially solid cube coupling joints, wherein the one or more marriage straps are configured to secure the cube coupling joints to each other. A total volume of hollow portions and reduced cross-section areas of each of the cube coupling joints can be less than 50% of a volume of each of the cube coupling joints. Each of the cube coupling joints can be 50% solid or greater. Each of the cube coupling joints can be 90% solid or greater. At least one of the one or more marriage straps can comprise a first portion and a second portion, the first portion being angled with respect to the first portion. The first portion can be perpendicular to the second portion. The one or more recessed channels of the cube coupling joints can be L-shaped. A portion of each of the one or more marriage straps can have the same shape as the one or more recessed channels. Each of the one or more marriage straps, when inserted into the one or more recessed channels of the cube coupling joints, can sit substantially flush with an outer surface of the cube coupling joints. Each of the one or more marriage straps can have a thickness that is within 10% of a depth of the one or more recessed channels of the cube coupling joints. Each of the one or more marriage straps have a thickness that is within 5% of a depth of the one or more recessed channels of the cube coupling joints. The one or more marriage straps can comprise one or more through-holes configured to align with one or more holes located within the one or more recessed channels of the cube coupling joints, and the one or more through-holes of the marriage straps can be configured to allow one or more fasteners to pass therethrough and secure to the one or more holes of the cube coupling joints.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

FIG. 3C illustrates a side view of the cube coupling joint of FIG. 3A.

FIG. 3D illustrates another side view of the cube coupling joint of FIG. 3A.

FIG. 6A illustrates a perspective view of an embodiment of a shear pin in accordance with aspects of this disclosure.

FIG. 6B illustrates a side view of the shear pin of FIG. 6A.

FIG. 6C illustrates a top view of the shear pin of FIG. 6A.

FIG. 8A illustrates an enlarged perspective view an intermediate connection assembly in accordance with aspects of this disclosure, which is also shown in FIG. 7 and labeled 8A.

FIG. 8B illustrates an exploded view of the intermediate connection assembly of FIG. 8A.

FIG. 9A illustrates a perspective view of an embodiment of a marriage strap in accordance with aspects of this disclosure.

FIG. 9B illustrates a front view of the marriage strap of FIG. 9A.

FIG. 9C illustrates a side view of the marriage strap of FIG. 9A.

FIG. 10A illustrates a perspective view of an embodiment of a marriage strap in accordance with aspects of this disclosure.

FIG. 10B illustrates a front view of the marriage strap of FIG. 10A.

FIG. 10C illustrates a side view of the marriage strap of FIG. 10A.

FIG. 11 illustrates a perspective view of another configuration for a modular structure in accordance with aspects of this disclosure.

FIG. 12C illustrates a perspective view an intermediate connection assembly shown in FIG. 11 and labeled 12C.

FIG. 13A illustrates a perspective view of an embodiment of a marriage strap in accordance with aspects of this disclosure.

FIG. 13B illustrates a front view of the marriage strap of FIG. 13A.

FIG. 13C illustrates a side view of the marriage strap of FIG. 13A.

FIG. 14A illustrates a perspective view of an embodiment of a marriage strap in accordance with aspects of this disclosure.

FIG. 14B illustrates a front view of the marriage strap of FIG. 14A.

FIG. 14C illustrates a side view of the marriage strap of FIG. 14A.

FIG. 15 illustrates a perspective view of another configuration for a modular structure in accordance with aspects of this disclosure.

FIG. 17A illustrates a perspective view of an embodiment of a marriage strap in accordance with aspects of this disclosure.

FIG. 17B illustrates a front view of the marriage strap of FIG. 17A.

FIG. 17C illustrates a side view of the marriage strap of FIG. 17A.

FIG. 20 illustrates a perspective view of another configuration for a modular structure in accordance with aspects of this disclosure.

DETAILED DESCRIPTION

Various embodiments will be described below in conjunction with the drawings for purposes of illustration. It should be appreciated that many other implementations of the disclosed concepts are possible, and various advantages can be achieved with the disclosed implementations.

As described herein, a cube coupling joint can be used, for example, in the construction of modular structures, including residential and commercial buildings, whereby stand-alone frames/sections can be pre-manufactured in factories and installed on a construction jobsite using fasteners, such as bolts and/or rivets. The cube coupling joints can connect modular frames and/or sections with the use of one or more marriage straps and fasteners that secure within recessed channels of the cube coupling joints. In certain aspects, the cube coupling joints, when secured using the marriage straps and fasteners, can advantageously be substantially "flush" with surrounding surfaces, thereby facilitating the outfitting of the interior and/or exterior of the adjacent wall components. In certain aspects, the cube coupling joints can be solid or substantially solid, and can, along with the connected structural members, form a moment-resisting frame capable of withstanding seismic loading conditions.

Figure 1:
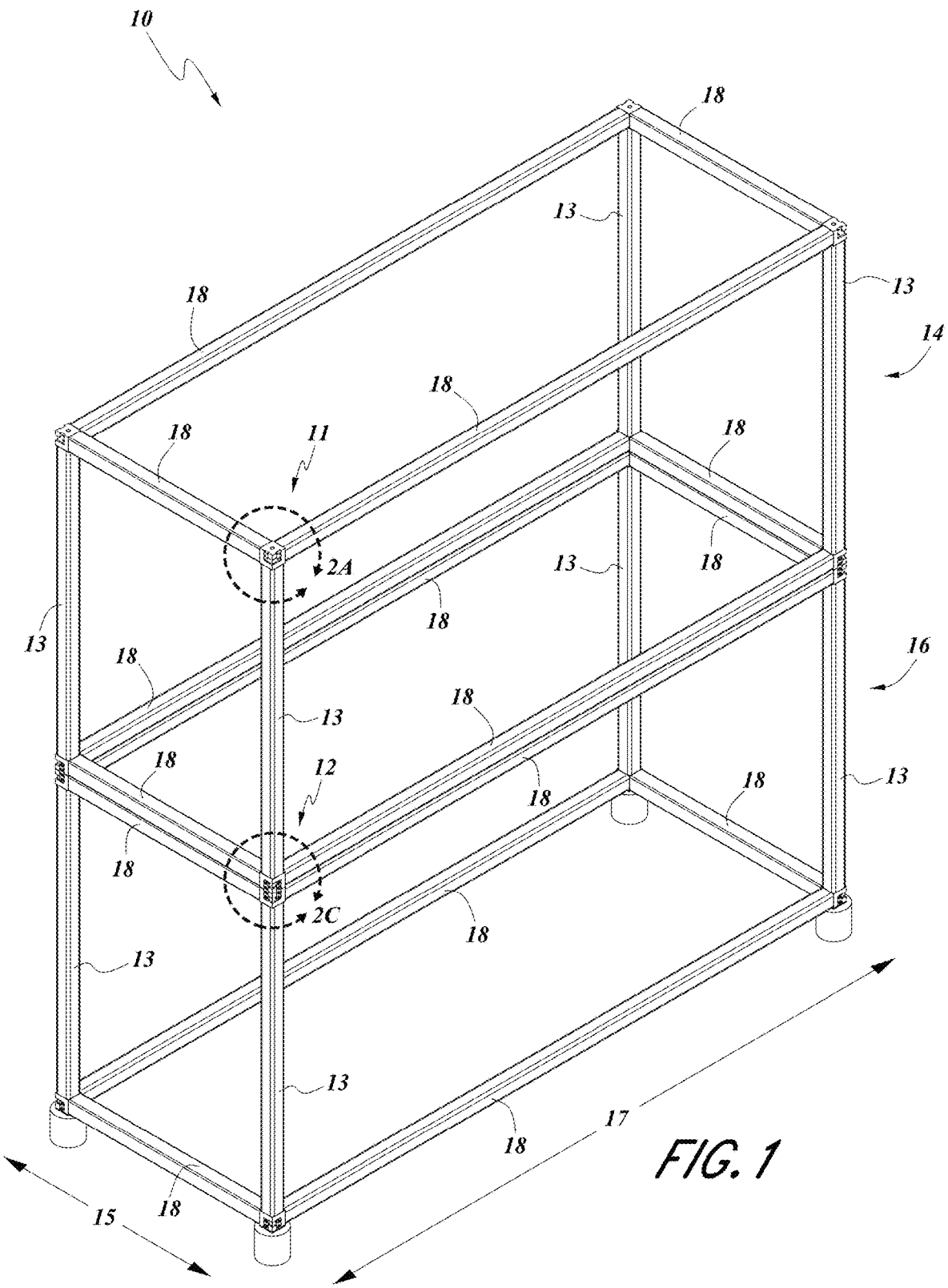
FIG. 1 illustrates a perspective view of a modular structure in accordance with aspects of this disclosure.

The modular frames discussed herein can be pre-manufactured to include one or more bays, such as one or more, two or more, three or more, four or more, five or more, or six or more bays. As used herein, the term "bay" describes the horizontal spaces between columns 13. For example, as shown by FIG. 1, a modular structure 10 can include two pre-manufactured frames 14, 16 (stacked vertically) each having one bay 17 in a longitudinal direction and one bay 15 in a transverse direction, and also having a frame height corresponding to the story. Each modular frame 10 can be pre-manufactured in a factory with beams 18 and columns 13, and the beams 18 and columns 13 of each frame can be secured (e.g., welded) to cube coupling joints to form the finished frame. As described herein, the finished frame can also be pre-manufactured with various outfitting prior to delivery and installation on a construction site, such as drywall, wall studs, cladding, etc. Upon delivery, one of the pre-manufactured frames can be placed atop or adjacent to one another, and the assembly methods discussed herein can be utilized to secure the two frames together using the marriage straps and cube coupling joints discussed herein. While FIG. 1 shows a longitudinal bay longer than a transverse bay in the modular frames, the longitudinal bay can have an equal length as the transverse bay and vice versa, depending on the desired configuration for the modular structure.

Although the figures below illustrate modular structures having two vertical stories, one of skill in the art can appreciate that the devices, systems, and/or methods discussed herein can allow for modular structures of more than two stories. For example, the devices, systems, and/or methods discussed herein can be utilized to assemble modular structures having one or more, two or more, three or more, four or more, five or more, six or more, seven or more, eight or more, or nine or more stories, although the number of stories in modular structures can exceed these numbers in some cases.

The cube coupling joints described in this disclosure (such as 28a, 28b, 128a, 128b, 1238c, 227a, 227b, 228a, 228b, 228c, 228d, 328a, 328b, 328c, 328d, 328e, 628a, 628b, 628c, 728c, 728b) can be substantially solid. For example, the cube coupling joints can have a body that has little or no hollow portions, such as holes. The cube coupling joints can have a non-hollow interior. The cube coupling joints can have no hollow portions other than the alignment holes and/or fastener holes such as those discussed herein, and can have no reduced cross-section areas other than the recesses or recessed channels such as those as discussed herein. In some embodiments, the total volume of the hollow portions (e.g., alignment holes, fastener holes) and reduced cross-section areas (e.g., recesses or recessed channels) on the cube coupling joints is less than or equal to a certain percentage of an outer volume of the cube coupling joints. The "outer volume" of the cube coupling joints can be found by multiplying the height, width, and length of the cube coupling joint together. The "solid portion" of the cube coupling joints can be equal to the "outer volume" of the cube coupling joints minus the total volume of the hollow portions and reduced cross-section areas. For example, where the cube coupling joint has a height of 6 inch, width of 6 inch, and a length of 6 inch, and thus an outer volume of 216 inch$^3$, and the total volume of hollow portions and reduced cross-section areas is equal to 108 inch$^3$, the total volume of hollow portions and reduced cross-section areas is 50% of the outer volume of the cube coupling joint or, put another way, the total volume of hollow portions and reduced cross-section areas is 50%. In the same example, where the total volume of hollow portions and reduced cross-section areas is equal to 108 inch$^3$, the "solid portion" of the cube coupling joint is 50%, or put another way, the cube coupling joint is 50% solid.

The total volume of the hollow portions and reduced cross-section areas in the cube coupling joints can in certain embodiments be less than or equal to 50% of the outer volume of the cube coupling joint, in certain embodiments less than or equal to 40% of the outer volume of the cube coupling joint, in certain embodiments less than or equal to 30% of the outer volume of the cube coupling joint, in certain embodiments less than or equal to 25% of the outer volume of the cube coupling joint, in certain embodiments less than or equal to 20% of the outer volume of the cube coupling joint, in certain embodiments less than or equal to 15% of the outer volume of the cube coupling joint, in certain embodiments less than or equal to 10% of the outer volume of the cube coupling joint, in certain embodiments less or equal to 5% of the outer volume of the cube coupling joint, in certain embodiments less or equal to 2%, in certain embodiments less or equal to 1%, or any percentages therebetween, or any ranges bounded by any combination of these percentages, although other values can be used in some implementations. The total volume of the hollow portions and reduced cross-section areas can be between 50% and 2% of the outer volume of the cube coupling joint, in certain embodiments, between 40% and 5% in certain embodiments, between 30% and 10% in certain embodiments, between 25% and 15% in certain embodiments, between 50% and 5% in certain embodiments, between 40% and 5% in certain embodiments, between 30% and 5% in certain embodiments, between 20% and 5% in certain embodiments, between 10% and 5% in certain embodiments, between 40% and 2% in certain embodiments, between 30% and 2% in certain embodiments, between 25% and 2% in certain embodiments, between 20% and 2% in certain embodiments, between 15% and 2% in certain embodiments, between 10% and 2% in certain embodiments, between 5% and 2% in certain embodiments, or any range bounded by these ranges. In certain embodiments, the total volume of the hollow portions and reduced cross-section areas can be between 50% and 1% of the outer volume of the cube coupling joint, in certain embodiments, between 40% and 1% in certain embodiments, between 30% and 1% in certain embodiments, between 25% and 1% in certain embodiments between 15% and 1% in certain embodiments, between 10% and 1% in certain embodiments, between 5% and 1% in certain embodiments, or any range bounded by these ranges.

The solid portion (defined above) of the cube coupling joints discussed herein can be 50% solid or greater, 60% solid or greater, 70% solid or greater, 80% solid or greater, 90% solid or greater, or 95% solid or greater, or 98% solid or greater or 99% or greater or any percentages therebetween, or any ranges bounded by any combination of these percentages, although other values can be used in some implementations. The solid portion of the cube coupling joints discussed herein can be between 50% and 98% solid in certain embodiments, between 60% and 95% solid in certain embodiments, between 70% and 90% solid in certain embodiments, between 75% and 85% solid in certain embodiments, between 80% and 90% solid in certain embodiments, between 90% and 98% solid in certain embodiments, or any range bounded by these ranges.

As an example, a cube coupling joint (such as any of those discussed herein) having an alignment hole 32, one or more recessed channels 34, and one or more threaded holes 35, 36 (discussed further below) can be 98% solid, 95% solid, 90% solid, 85% solid, 80% solid, 70% solid, 60% solid, or 50% solid, or any percentages therebetween. Keeping the total volume of the hollow portions and reduced cross-section areas below 50% (or other percentages discussed above) of the outer volume of the cube coupling joints discussed herein and/or keeping the solid portion of the cube coupling joints equal to or greater than 50% can advantageously allow the cube coupling joints to resist forces and/or stresses arising from various loading conditions and can enable the cube coupling joints discussed herein to transfer forces between beam and column structural members within a modular structure. For example, keeping the total volume of the hollow portions and reduced cross-section areas below 50% (or other percentages discussed above) can advantageously allow the cube coupling joints 28 to, along with the connected structural members, form a lateral resisting system, such as a moment resisting frame, that can be capable of resisting strong lateral forces, such as those due to wind or seismic loads. In some embodiments, the cube coupling joints 28 have no alignment holes, no fastener holes, and/or no recesses or recessed channels. The cube coupling joints 28 can have, in certain embodiments, a cube shape, which can have at least six substantially flat sides that can include holes and/or recesses on the flat sides as described herein. As mentioned above, the total volume of the cube coupling joint 28 and the percentages described above with respect to cube coupling joint 28 and hollow portions and/or reduced cross-section areas are applicable to all cube coupling joints described herein. As noted above, while keeping the total volume of the hollow portions and reduced cross-section areas below 50% (or other percentages discussed above) of the outer volume of the cube coupling joints and/or while keeping the solid portion of the cube coupling joints equal to or greater than 50% can have certain advantages, it is anticipated that in certain embodiments the cube coupling joint can be formed outside these ranges and can have certain advantages associated with, for example, the structure of the cube coupling joints, the marriage straps and interaction therewith, the alignment and/or shear pins and the interaction therewith that can find utility independent of the cube coupling joint being formed within the ranges described above.

As can be seen from FIG. 1, embodiments of cube coupling joints 28 can be utilized to connect multiple pre-manufactured modular frames. FIG. 1 shows a two-story modular frame structure 10 secured to a structural foundation. As discussed above, the cube coupling joints 28 can advantageously allow the top and/or bottom story (or other sections of a modular structure) to be constructed in a factory, whereby structural members (e.g., beams and columns) can be welded or otherwise secured to faces of the cube coupling joints 28 in a factory along with, for example, other finishings (e.g., steel studs, drywall, etc.). The pre-manufactured modular sections can then be transported to a construction jobsite and installed by simply securing the cube coupling joints 28 to one another using the devices and methods described herein. In some embodiments, the installation of the pre-manufactured modular sections involves using marriage straps and fasteners (such as threaded bolts) that secure the cube coupling joints 28 to one another. As discussed above, this can significantly reduce the time and cost resulting from such installation on a construction jobsite. In some embodiments, the cube coupling joints 28 include one or more alignment holes which can receive an alignment pin. The alignment pins discussed throughout this disclosure can be shear pins which can provide for transfer of forces between modular frames. As described herein, an alignment and or shear pin can fit within an alignment hole of one cube coupling joint 28 at one end of the shear pin and within another alignment hole of another cube coupling joint 28, thereby aligning and/or securing the two cube coupling joints 28 together. In addition to helping alignment and therefore the construction of modular frames, the shear pin can provide transfer of loads within the modular structure. For example, the shear pin can transfer lateral loads, such as seismic and/or wind loads, between the cube coupling joints 28 and corresponding modular frames of the modular structure.

Figure 2A:
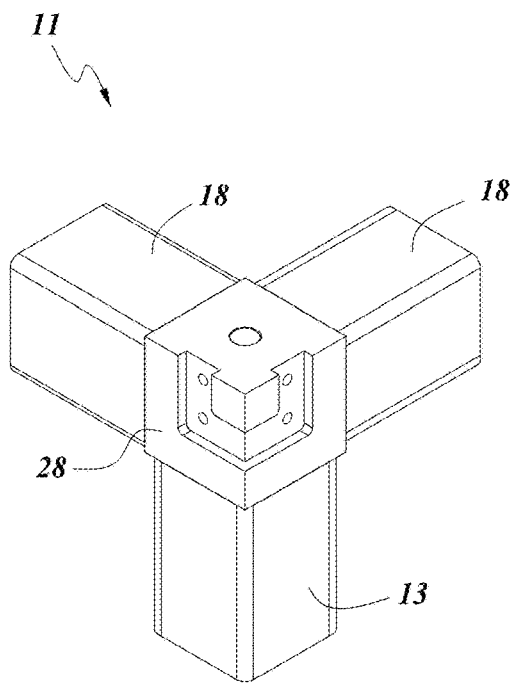
FIG. 2A illustrates an enlarged perspective view a portion of FIG. 1 labeled 2A, which illustrates a top corner of a modular structure with beam and column structural members secured to a cube coupling joint in accordance with aspects of this disclosure.

The modular frame structure of FIG. 1 can include a top corner 11 as illustrated in FIG. 2A]. FIG. 2A illustrates a close up perspective view of the top corner 11 of FIG. 1, showing two horizontal beam members 18 and one vertical column member 13 connected to a cube coupling joint 28. As discussed herein, a modular frame can be pre-manufactured prior to delivery to a construction site and installed on the construction site using the devices, systems, and/or methods discussed herein. For example, the beams and column structural members 13, 18 shown in the top corner 11 of FIGS. 2A and 2B can be secured to the cube coupling joint 28 by welding in a factory prior to delivery. The beams and/or column structural members 13, 18 can be secured to the cube coupling joint 28 using the weld techniques discussed herein. For example, as discussed below the beam and/or column structural members can be Hollow Structural Sections (HSS) with beveled, chamfered, or non-beveled edges, and can be welded to a face of the cube coupling joint 28 with fillet welds, partial joint penetration welds, and/or complete joint penetration welds. The cube coupling joint 28 can have the same design as other cube coupling joints described herein, or alternatively, can have a different design. For example, in some embodiments where a modular structure is designed as having only two modular frames stacked vertically and which will not be connected to other modular frames and/or structure, the cube coupling joint 28 can be solid or substantially solid and can have no recessed channels and/or no alignment holes (in contrast to the embodiment shown in FIGS. 2A and 2B). Alternatively, the cube coupling joint 28 can have the same design as other cube coupling joints discussed herein in order provide the option of expanding the two-story modular structure to have an additional first and/or second story. The cube coupling joints discussed herein can advantageously allow flexibility in the arrangement and configuration of modular structures.

The beam 18 and column 13 structural members discussed herein can be generally hollow with a square or rectangular cross-section, for example. In some embodiments, the beam 18 and column 13 structural members can be solid or semi-solid, and/or can have other cross-sectional shapes. Preferably, the beam 13 and column 18 structural members have the same or similar shape and/or similar dimensions as the cube coupling joints 28 to facilitate connection and/or securement to the cube coupling joints 28. Hereinafter beam and column structural members are referred to with numerals 20, 120, 220, and 320. The structural members 20, 120, 220, and 320 can be the same in some or all respects as beam and column structural members 13, 18 discussed above and accordingly reference can be made to the aspects and modified and alternative aspects described above.

Figure 2B:
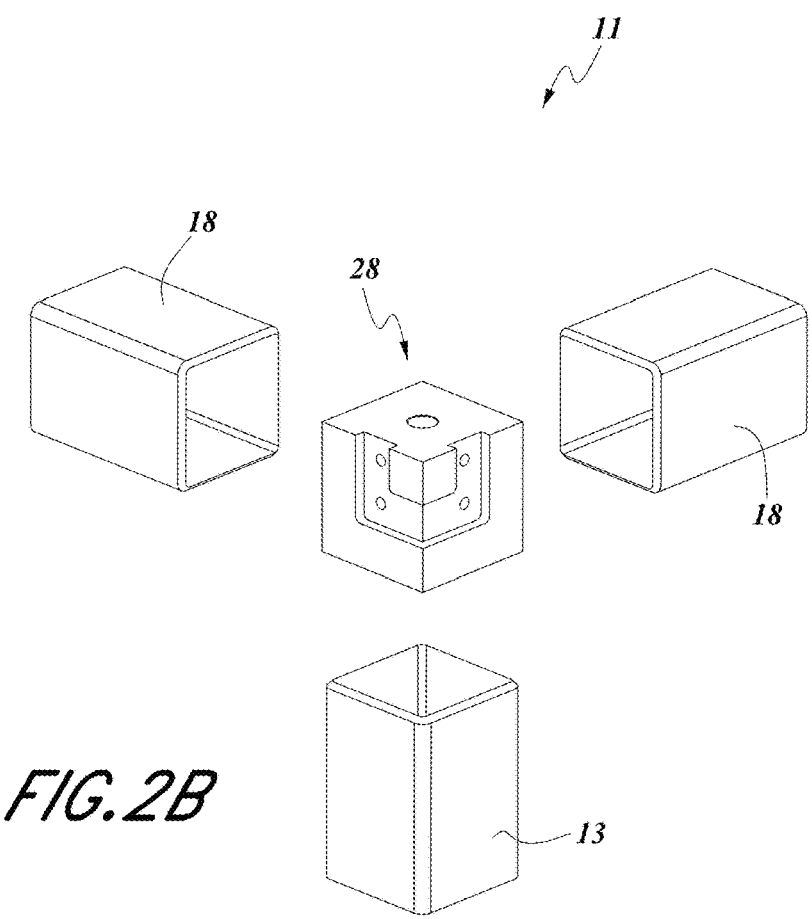
FIG. 2B illustrates an exploded view of the top corner of the modular structure of FIG. 2A.
Figure 2C:
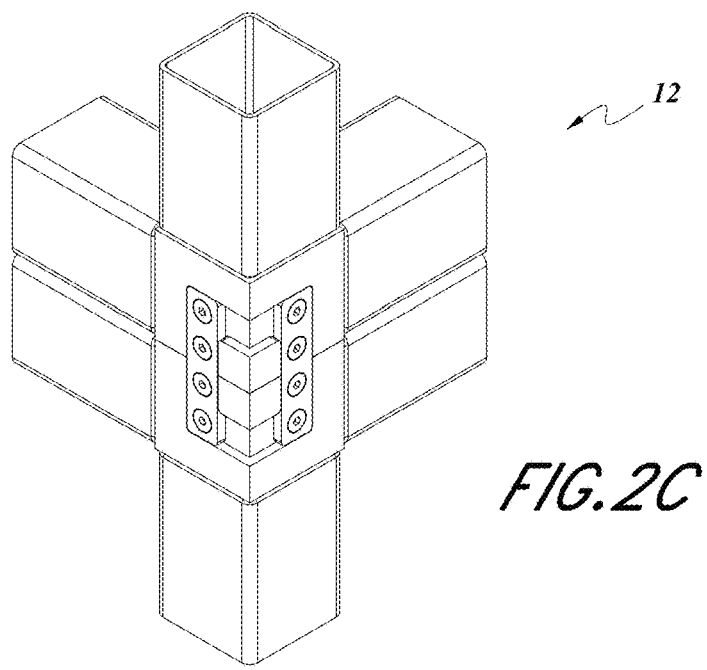
FIG. 2C illustrates an enlarged perspective view of a portion of FIG. 1 labeled 2C, which illustrates an intermediate connection assembly with beam and column structural members secured to cube coupling joints in accordance with aspects of this disclosure.

FIG. 2C illustrates a perspective view of an intermediate joint assembly 12 with structural members 20 secured to two cube coupling joints 28a, 28b. Cube coupling joints 28a, 28b can be the same in some or all respects as cube coupling joint 28 and accordingly reference can be made to the aspects and modified and alternative aspects described above. The term "intermediate" and the phrase "intermediate joint assembly" as used herein are used to describe connections of a modular structure occurring in regions of the modular structure other than top or bottom portions of the modular structure. However, the devices, systems, and/or methods discussed with regard to intermediate joint assemblies 12 herein can be used with regard to top and/or bottom joint assemblies, such as those discussed and/or shown herein. Some intermediate joint assemblies described in this disclosure include two cube coupling joints, which connect two modular frames, as illustrated by the intermediate joint assembly in FIG. 2C. However, as can be seen in other figures appearing in this disclosure, some intermediate joint assemblies include more than two cube coupling joints, such as three, four, five, or six cube coupling joints, depending on the configuration of the modular structure.

Figure 2D:
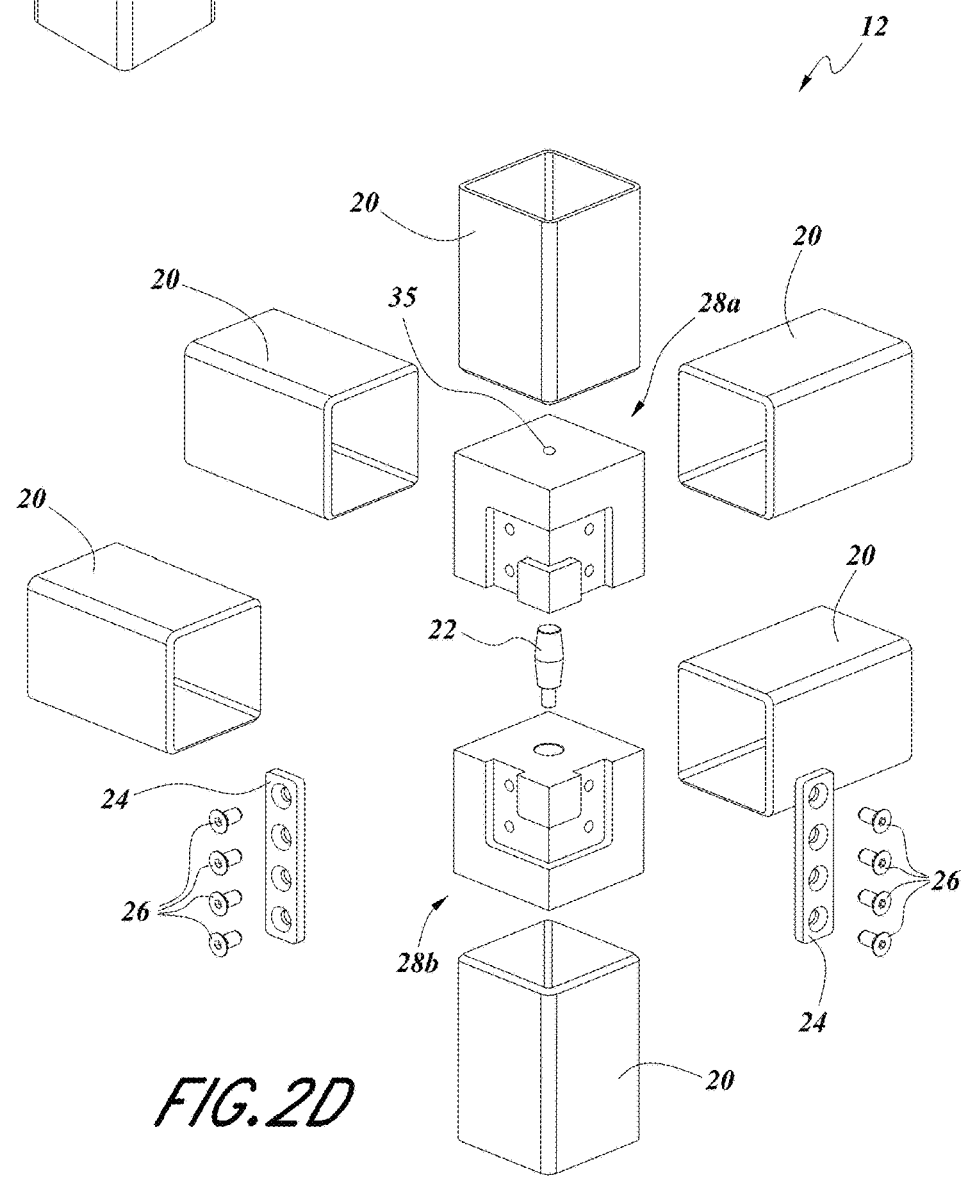
FIG. 2D illustrates an exploded view of the intermediate connection assembly of FIG. 2C.

FIG. 2D illustrates an exploded view of the intermediate joint assembly of FIG. 2C, showing how corners of two modular frames can be assembled to form a modular structure. The intermediate joint assembly 12 can include structural members 20, cube coupling joints 28a, 28b, one or more marriage straps 24, one or more alignment and/or shear pins 22, and one or more fasteners 26. FIG. 2D illustrates how the intermediate joint assembly 12 can be assembled. As discussed above, the structural members 20 can be welded to the cube coupling joints 28 prior to delivery to a construction site. Alternatively, the structural members could be welded, or otherwise secured, to the cube coupling joints 28 at the construction site. Once the structural members 20 are secured or connected to the cube coupling joints 28a, 28b for each of the two frame corners, the cube coupling joints 28a, 28b of each respective modular frame corner can be secured to one another. The cube coupling joints 28a, 28b can be secured to one another using one or more alignment pins 22. As discussed herein, the cube coupling joints 28a, 28b can include one or more alignment holes 32 configured to permit one or more alignment or shear pins 22 to fit within (see FIG. 3B). For example, the cube coupling joints 28 can include one or more, two or more, three or more, four or more, five or more, six or more, seven or more, or eight or more alignment holes 32. The one or more alignment holes 32 of the cube coupling joints 28a, 28b can permit one or more, two or more, three or more, four or more, five or more, six or more, seven or more, or eight or more alignment or shear pins 22 to fit within, for example. Including a plurality of shear pins 22 and corresponding alignment holes 32 may advantageously provide more shear transfer capacity between cube coupling joints 28a, 28b and the connected modular frames of the modular structure 10. However, including one shear pin 22 and corresponding alignment hole 32 may aid simplicity in construction, and can also allow the cube coupling joints 28a, 28b to maintain a more solid cross section, thus resulting in greater strength capacity of the cube coupling joints 28a, 28b. However, regardless of whether one, or multiple shear pins 22 are utilized, the total shear capacity of the shear pin or pins 22 can be designed to provide optimal shear transfer and strength capacity of the shear pin or pins 22. For example, one shear pin 22 can be utilized with a certain diameter and cross sectional area (along a plane parallel to a bottom surface of the cube coupling joint, for example). Alternatively, multiple shear pins 22 can be utilized which together have a total cross sectional area equal to that of the single shear pin 22. Thus, one, or more than one shear pin 22 can be utilized, and can be sized and shaped, along with one or more alignment holes 32, to provide optimal shear transfer and strength capacity of the cube coupling joints 28a, 28b, one or more shear pins 22, and/or other components of the modular frame and/or assembled modular structure as described herein.

The cube coupling joints 28a, 28b shown in FIGS. 2C and 2D can be secured together using one or more alignment holes 32, one or more alignment or shear pins 22, and also a bonding material. For example, bonding material can be injected into the one or more alignment holes 32 prior to placement of the one or more shear pins 22. The bonding material can act to at least partially secure the two cube coupling joints 28a, 28b to one another vertically. In such embodiments, the one or more alignment holes 32 can have an interior volume that is greater or slightly greater than a volume of the portion of the shear pin 22 that is placed there within, providing a gap for the bonding material.

As illustrated in FIGS. 2C and 2D, each cube coupling joint 28a, 28b of the intermediate joint assembly 12 can be secured to one another using one or more marriage straps 24 and one or more fasteners 26. As discussed herein, the one or more marriage straps 24 can fit within one or more recesses or recessed channels 34 of the cube coupling joints 28a, 28b, and the one or more fasteners 26 can be threaded through one or more through-holes 41 in the one or more marriage straps 24 and be threaded into one or more holes 36 in the one or more recesses of the cube coupling joints 28a, 28b. The one or more marriage straps 24 and fasteners 26 described herein can thus allow for edge corners of one or more modular frames to be quickly and efficiently secured together to form a modular structure. As also discussed herein, the marriage strap 24 can have a thickness that matches or substantially matches the depth of the one or more recesses or recessed channels 34 in cube coupling joints 28a, 28b so that an outer surface of marriage strap 24 is flush or substantially flush with an outer surface of the cube coupling joints 28a, 28b. In certain embodiments, the marriage strap 24 can have thicknesses within 5% of depths of the recesses 34 of the cube coupling joints 28a, 28b. In certain embodiments, the marriage strap 24 can have thicknesses within 2% of depths of the recesses 34 of the cube coupling joints 24. Although holes 35, 36 are illustrated without showing threads in some of the figures in the present disclosure, it is to be understood that any of the holes 35, 36 as shown and/or discussed with respect to cube coupling joints 28a, 28b or any other holes in other cube coupling joints similar to holes 35, 36 of cube coupling joints 28a, 28b can be threaded or alternatively, but non-threaded. Further, the bolts discussed herein (such as bolts 26, 130, 132, 230, 232, 330, 332, 630) have been illustrated without showing threads thereon for simplicity, but it is understood that any of these bolts can be threaded. For example, FIGS. 3B and 3H illustrate, threading within holes 36 of cube coupling joint 28a and threading along bolt 26.

Figure 3A:
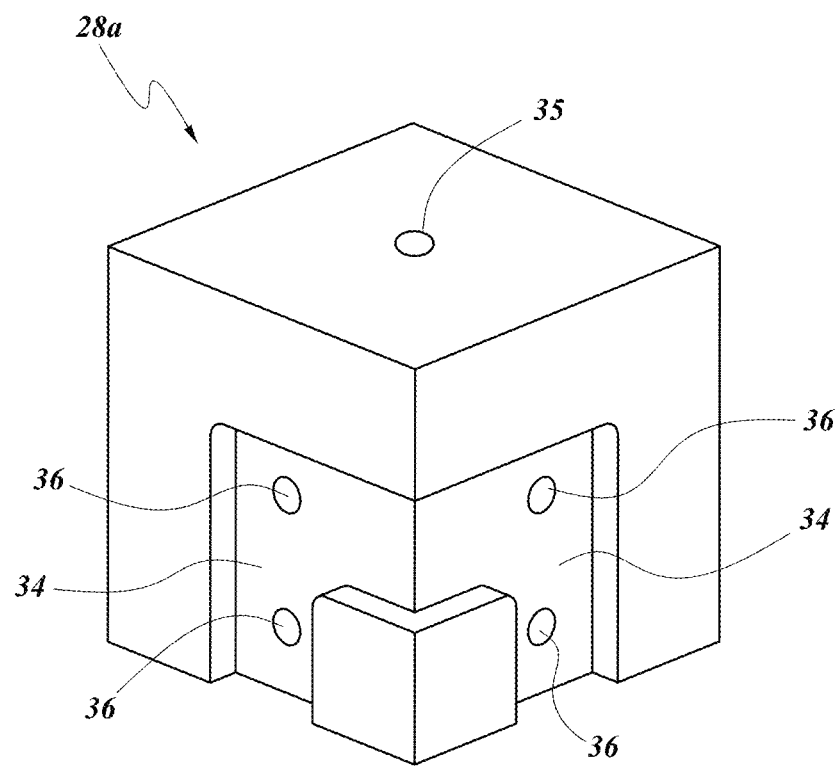
FIG. 3A illustrates a perspective view of an embodiment of a cube coupling joint in accordance with aspects of this disclosure.
Figure 3B:
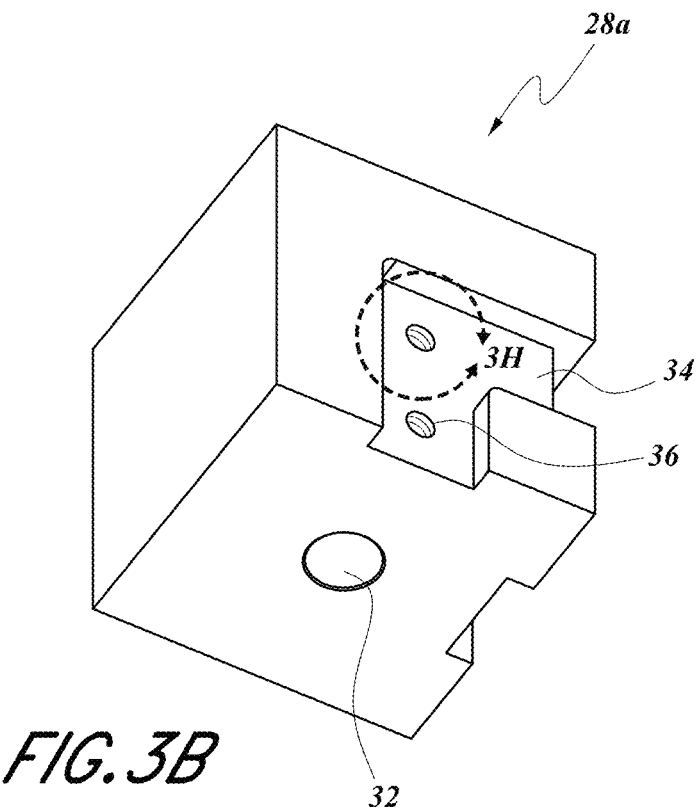
FIG. 3B illustrates another perspective view of the embodiment of a cube coupling joint shown in FIG. 3A.

FIGS. 3A and 3B illustrate perspective views of an embodiment of a cube coupling joint 28a. The cube coupling joint 28a can include a top face, a bottom face, and four side faces, in some embodiments. As discussed above, the cube coupling joint 28a can include one or more alignment holes 32 configured to fit one or more shear pins 22. The one or more alignment holes 32 can be located on, for example, a top or bottom face of the cube coupling joint 28a. Alternatively, one or more alignment holes 32 can be located on one or more side faces of the cube coupling joint 28a to facilitate lateral/horizontal connection of modular frames and/or structures. An alignment hole 32 can be located on a top face of cube coupling joint 28b which faces another alignment hole 32 located on a bottom face of another cube coupling joint 28a that is configured to secure to cube coupling joint 28b with the shear pin 22 described above.

Figure 25:
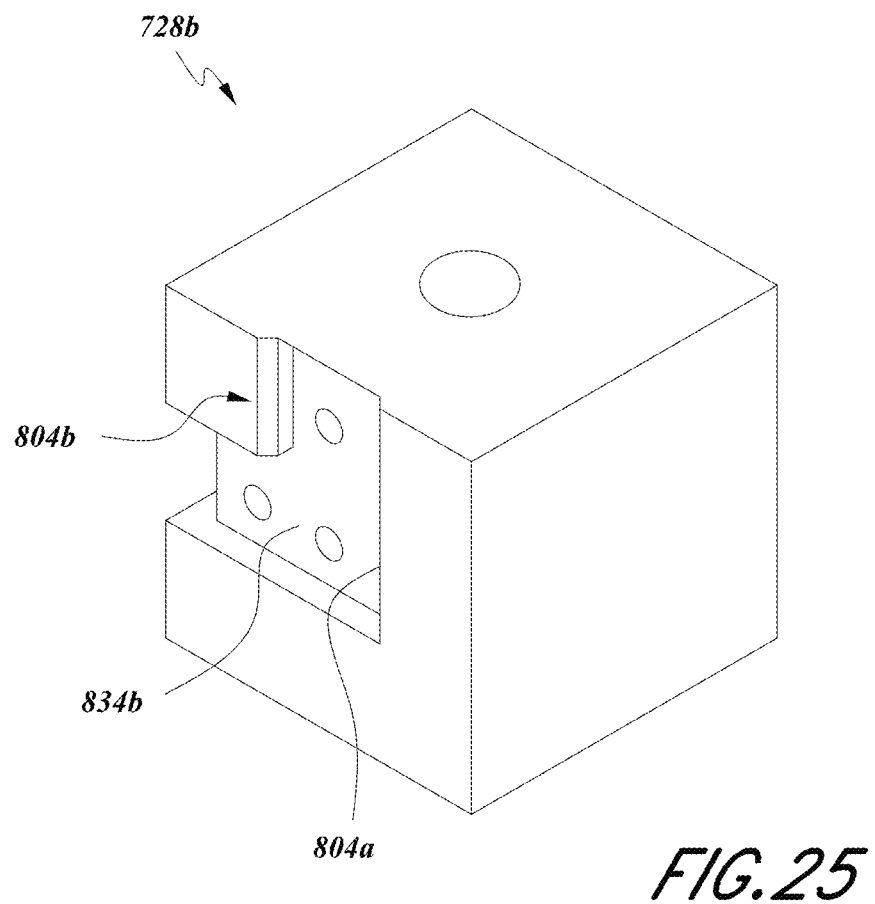
FIG. 25 illustrates a perspective view of an embodiment of a cube coupling joint in accordance with aspects of this disclosure.
Figure 26:
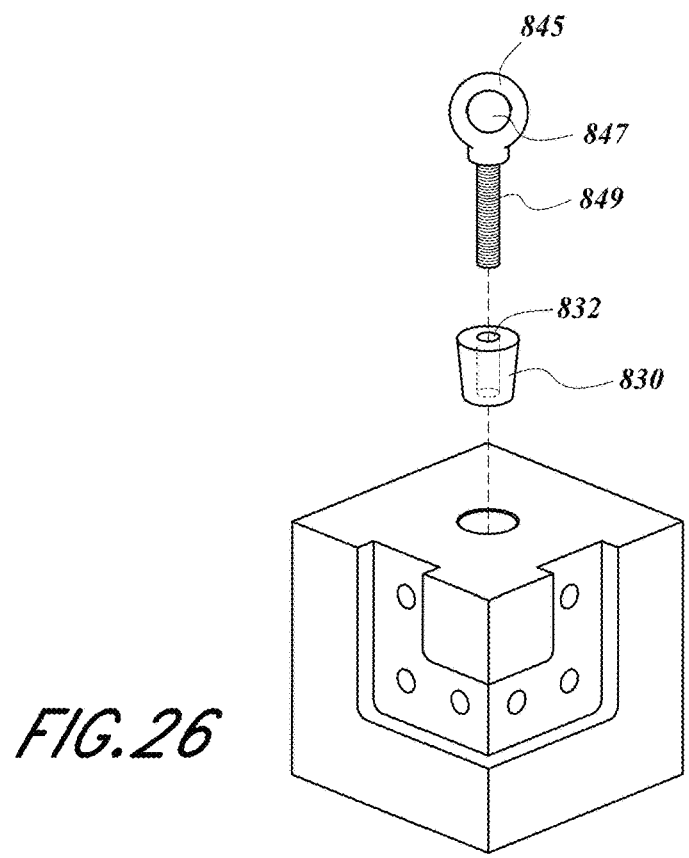
FIG. 26 illustrates an exploded view of an embodiment of an assembly for placing a modular frame in accordance with aspects of this disclosure.

As shown by FIGS. 3A-3D, the cube coupling joint 28a can include one or more recesses or recessed channels 34, such as one or more, two or more, three or more, four or more, five or more, six or more, or seven or more recesses or recessed channels 34. The one or more recesses or recessed channels 34 can be recessed from a face of the cube coupling joint 28a and can be sized and shaped to fit one or more marriage straps such as those discussed herein. In some embodiments, the cube coupling joint 28a has one recess or recessed channel 34 on each of two side faces of the cube coupling joint 28a (see FIG. 3A). The one or more recesses or recessed channels 34 can extend from an edge of a face of the cube coupling joint 28a inward toward a center of the face of the cube coupling joint 28a. In some embodiments, the one or more recesses or recessed channels 34 can comprise a L-shape. For example, the one or more recesses or recessed channels 34 can extend from an edge of a first face of the cube coupling joint 28*a* inwardly toward a center of the first face of the cube coupling joint 28*a* and also can extend from the center of the first face to another edge of the first face of the cube coupling joint 28*a*. The size, shape, and orientation of the one or more recesses or recessed channels 34 can advantageously allow a variety of marriage straps to connect thereto, as shown and described herein. The one or more recesses or recessed channels 34 can comprise a shape other than an L-shape. For example, the one or more recesses or recessed channels 34 can comprise a C-shape, D-shape, E-shape, F-shape, G-shape, J-shape, and X-shape, or a variety of other shapes, depending on the size, shape, and/or orientation of marriage straps that are desired to be arrange and secured thereto. In some embodiments, the marriage straps discussed herein can have the same shape as the one or more recesses or recessed channels 34 of the cube coupling joints. In some embodiments, at least a portion of the marriage straps discussed herein can have the same shape as the one or more or more recesses or recessed channels 34 of the cube coupling joints. The one or more recesses or recessed channels 34 can have edges that are rounded (see FIG. 3A, for example). This can advantageously minimize the amount of material for the marriage straps and also minimize the amount of reduction of cross section of the cube coupling joint 28*a*, which can in turn allow for greater strength capacity of the cube coupling joints 28*a*. The rounded edges of the one or more recesses or recessed channels 34 can also reduce stress concentration around the edges of the one or more recesses or recessed channels 34 when one or more marriage straps are fit therewithin and connected to the cube coupling joints and when vertical and/or lateral loading is applied. In some embodiments, the edges of the one or more recesses or recessed channels 34 are not rounded. As also shown by FIGS. 3A-3D, the cube coupling joints 28*a* can include one or more holes 36 for securing to fasteners, such as the bolts discussed and shown herein. For example, the cube coupling joint 28*a* can include one or more, two or more, three or more, four or more, five or more, six or more, seven or more, eight or more, nine or more, ten or more, or eleven or more holes 36 for securing to fasteners, such as bolts, although the cube coupling joint 28*a* can include more holes in some cases. For example, FIGS. 25 and 26 illustrate an embodiment of a cube coupling joint with three holes within the recessed channel on each side of the cube coupling joint. As compared to the arrangement illustrated in FIG. 3A, in the illustrated embodiment, of FIGS. 25 and 26 the cube coupling joint can include a third hole positioned near an intersection of the recessed channels 34 on the two adjacent faces of the cube coupling joint 28*a*. While many of the embodiments of the cube coupling joint 28*a* described herein are illustrated as having two holes 36 on each side of the cube coupling joint (such as 28*a*, 28*b*, 128*a*, 128*b*, 1238*c*, 227*a*, 227*b*, 228*a*, 228*b*, 228*c*, 228*d*, 328*a*, 328*b*, 328*c*, 328*d*, 328*e*, 628*a*, 628*b*, 628*c*, 728*c*), as noted above, a different number of holes within the recesses channel can be provided in these embodiments. In particular, in certain embodiments, a cube coupling joint illustrated as having two holes within the recessed channel on each side of the cube coupling joint (such as 28*a*, 28*b*, 128*a*, 128*b*, 1238*c*, 227*a*, 227*b*, 228*a*, 228*b*, 228*c*, 228*d*, 328*a*, 328*b*, 328*c*, 328*d*, 328*e*, 628*a*, 628*b*, 628*c*, 728*c*), can be provided with three holes within a recessed channel on each side of the cube coupling joint that are arranged in a manner similar to that illustrated in FIGS. 25 and 26. The one or more holes 36 can be positioned within one or more recesses or recessed channels 34 of the cube coupling joint 28*a*. The one or more holes 36 can include a threaded interior configured to receive and cooperate with threaded surfaces of fasteners, such as bolts 26. As discussed above, although not always illustrated in the figures, such threading can be included in the one or more holes 36 (and other holes discussed herein) and/or bolts 26 (and other bolts discussed herein). As described above, the one or more marriage straps can be utilized to connect one or more cube coupling joints along with fasteners. For example, as illustrated in FIG. 2C, a marriage strap 24 can be placed within one or more recesses or recessed channels 34 of cube coupling joint 28*a* and also within one or more recesses or recessed channels 34 of cube coupling joint 28*b*. During placement, one or more through-holes in the one or more marriage straps 24 can be positioned over and/or aligned with one or more holes 36 in the cube coupling joints 28*a*, 28*b*. Thereafter, one or more fasteners, such as bolts 26, can be threaded through the one or more through-holes of the one or more marriage straps 24 and threaded into the one or more holes 36 of the cube coupling joints 28*a*, 28*b* (see, for example, FIGS. 3B, 3H, and 3I). Thus, the one or more holes 36 of the cube coupling joints 28*a*, 28*b* can allow multiple cube coupling joints, and corresponding connections modular frames and/or structures, to be assembled together. As noted above, in certain embodiments a cube coupling joint can be provided with three holes within the recessed channel on each side of the cube coupling joint as illustrated in FIGS. 25 and 26. In certain embodiments, the marriage straps can be provided with a corresponding number of holes to mate with the holes on the cube coupling joint. Thus, although many of the embodiments of the marriage strap are illustrated with a certain number of holes to mate with a cube coupling joint additional or less holes can be provided to mate with the corresponding holes provided within the recesses of the cube coupling joint.

FIGS. 3C and 3D illustrate side views of the cube coupling joint 28*a*, including two, L-shaped recessed channels 34 and a plurality of holes 36. While the coupling joint 28*a* (and/or other embodiments of the cube coupling joints discussed herein) is referred to as a "cube" coupling joint herein, the coupling joint 28*a* can be designed as a shape other than a square cube. For example, the cube coupling joint 28*a* can have surfaces and/or edges with various, unequal, widths, heights, and/or lengths. In some embodiments, the cube coupling joint 28*a* has two different widths, for example, as shown by W1 and W2 in FIG. 3C. The cube coupling joint 28*a* can be rectangular, for example. In some embodiments, the cube coupling joint 28*a* has an equal width, height, and length.

As shown by FIGS. 3C and 3D the one or more recesses or recessed channels 34 and the one or more holes 36 can be sized, shaped, and/or spaced in a variety of configurations to accommodate one or more marriage straps and/or one or more fasteners. The one or more recesses 34 can be L-shaped, as discussed above, and can be sized and/or spaced from edges of a face of the cube coupling joint 28*a* as shown. The cube coupling joint 28*a* can include a recess with a first leg (of the L-shape) that can be spaced from a first edge of the cube coupling joint 28*a* a distance D1 and spaced from a second edge (opposite of the first edge) of the cube coupling joint 28*a* a distance D3. The first leg of the recess can span a distance D2. The recess of the cube coupling joint 28*a* can also include a second leg (of the L-shape) that can be spaced from a third edge of the cube coupling joint 28*a* a distance D4 and spaced from a fourth edge of the face (opposite of the third edge) a distance D6. The second leg of the recess can span a distance D5. The first leg can transition to the second leg at or near a center region of a face of the cube coupling joint 28a.

Non-recessed portions of the cube coupling joint 28a can be sized, shaped, and/or configured so as to increase the strength capacity of the cube coupling joint 28a. For example, when two cube coupling joints are secured to another with one or more marriage straps, edges of the marriage straps may press against non-recessed portions of the cube coupling joint 28a. This can result in stress concentrations in such portions or regions of the cube coupling joint 28a. For example, a non-recessed portion in a bottom corner of the face of the cube coupling joint 28a shown in FIG. 3C can have a width D3 and a height D4 that, if not sized and/or shaped appropriately relative to the recess 34, may be chipped off or otherwise fracture when sufficient loading conditions are experienced in a connection assembly and/or between one or more cube coupling joints. However, width D3 and/or height D4 of the non-recessed portion can have suitable dimensions, in proportion to the dimensions of the recess 34, which provide sufficient strength capacity for the non-recessed portion. For example, the non-recessed portion can have a width D3 equal to or greater than 30% or about 30% of the width D2 of the recessed portion, and a height D4 equal to or greater than 30% or about 30% of the width D5 of the recess 34 to provide sufficient capacity so that the non-recessed portion does not fracture prematurely when the cube coupling joint 28a encounters forces and/or stresses. For example, where the width D2 and/or width D5 are 2 inches, the non-recessed bottom corner portion can have a width D3 and/or height D4 of equal to or greater than 0.6 inches. In some embodiments, the non-recessed portion can have a width D3 equal to or about 50%, 70%, 90%, 100%, 120%, or 150% of width D2, or any percentages therebetween, or any ranges bounded by any combination of these percentages, although other values can be used in some implementations. In some embodiments, the non-recessed portion can have a height D4 equal to or about 50%, 70%, 90%, 100%, 120%, or 150% of width D5, or any percentages therebetween, or any ranges bounded by any combination of these percentages, although other values can be used in some implementations. For example, where the width D2 and/or width D5 are 2 inches, the non-recessed bottom corner portion can have a width D3 and/or height D4 of 1 inch, 1.4 inch, 1.8 inch, 2 inch, 2.4 inch, or 3 inch. As another example, a width D6 of a non-recessed portion adjacent to a recessed channel 34 can be greater than or equal to a certain percentage of width W2 such that the non-recessed portion can have sufficient bearing capacity to resist forces exerted by one or more marriage straps secured to recessed channels 34. In some embodiments, the depth D6 can be no less than 15%, 20%, 25%, 30%, 35%, or 40% of width W2 of cube coupling joint 28a. These percentages can allow the non-recessed portions to be proportionally sized and shaped so as to reduce the likelihood that the non-recessed portions will fracture, which can in turn increase the strength capacity of the cube coupling joint connection assembly as a whole.

As also shown by FIGS. 3C and 3D the one or more holes 36 can be sized, shaped, and/or spaced in a variety of configurations to allow fasteners, such as bolts 26, to connect thereto. For example, the one or more holes 36 can be spaced various distances from each other and/or from edges of the cube coupling joint 28a. Including a plurality of holes can advantageously increase the load capacity between marriage straps and connected cube coupling joints shown and described herein. However, such load transfer capacity can also be increased by increasing the size of the holes and the size of the corresponding bolts threaded thereto. Including more holes within the recess may result in tighter spacing between the bolts, which may in turn reduce the bearing capacity of the holes and the cube coupling joint, depending on the size of the cube coupling joint and/or marriage strap. The one or more holes can be spaced from each other and also spaced from edges of the one or more recesses or recessed channels so as to provide optimal bearing capacity.

As discussed above, the cube coupling joints discussed herein can include one or more holes configured to align with one or more through-holes in one or more marriage straps. The one or more holes can include threads inside an interior of the one or more holes configured to allow securement by threaded bolts (see FIGS. 3H and 3I). However, the one or more holes in the cube coupling joints as discussed herein can include no threads. For example, bolts or other types of fasteners could be secured to the one or more holes of the cube coupling joints with the use of bonding material that can be placed within the one or more holes of the cube coupling joints and can facilitate securement of the one or more bolts and the one or more marriage straps to the cube coupling joints. Additionally, in some embodiments, the cube coupling joints do not include any holes for fasteners, and securement of the one or more marriage straps to the cube coupling joints can occur with the use of one or more rivets, such as one or more, two or more, three or more, four or more, five or more, or six or more rivets. For example, one or more marriage straps can be placed within one or more recesses or recessed channels of the cube coupling joints and then one or more rivets can be driven through one or more through-holes of the one or more marriage straps and surfaces of the cube coupling joints. Alternatively, the one or more marriage straps can have no through-holes and the rivets can be driven through the body of the marriage straps and also driven into the cube coupling joints. The one or more rivets can be hydraulically, pneumatically, electromagnetically, or hand driven (e.g., a hammer) into the cube coupling joints, for example, at a construction site when the modular structure or building is being assembled. Thus, the cube coupling joints and modular frames described herein can be secured using non-threaded fasteners and using fastening methods other than threading and/or screwing.

As shown at least in FIGS. 3C and 3D, the cube coupling joint 28a can include two holes on a first face of the cube coupling joint 28a and two holes on a second face of the cube coupling joint 28a. The two holes can be located within the recesses 34, as discussed above. The two holes 36 can be spaced a distance D7 from an edge of the cube coupling joint 28a. As shown, the two holes can be spaced distances D8, D9 from other edges of the cube coupling joint 28a. The two holes can be spaced from each other to provide a greater bearing length in between the two holes and thus a greater bearing capacity for the cube coupling joint 28a when one or more bolts transfer loads to the cube coupling joint 28a along with the one or more marriage straps 24, for example. The two holes on the first and second faces of the cube coupling joint 28a can align with one or more through-holes 41 in one or more marriage straps 24, and one or more bolts 26 can pass through the one or more through-holes 41 and secure to the cube coupling joint 28a, 28b.

Figure 3G:
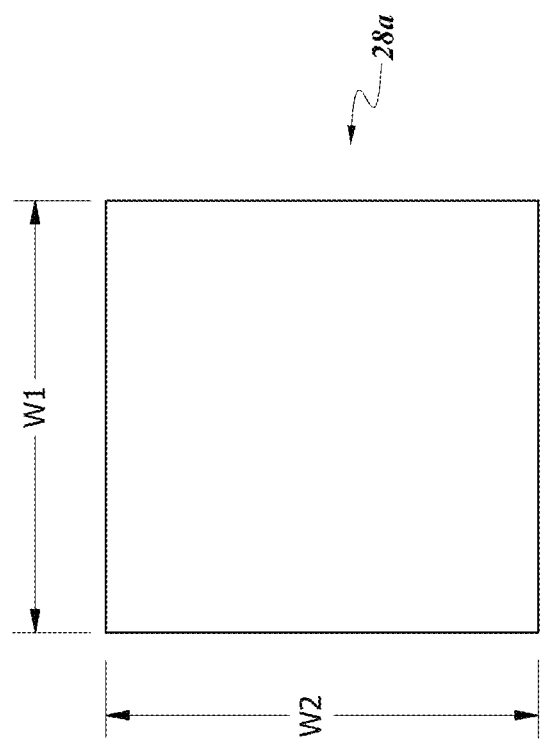
FIG. 3G illustrates another side view of the cube coupling joint of FIG. 3A sure.
Figure 3E:
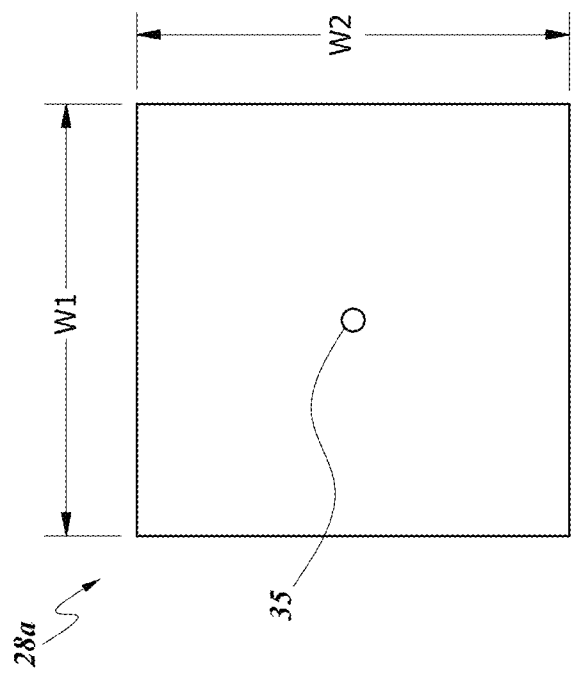
FIG. 3E illustrates a top view of the cube coupling joint of FIG. 3A.
Figure 3J:
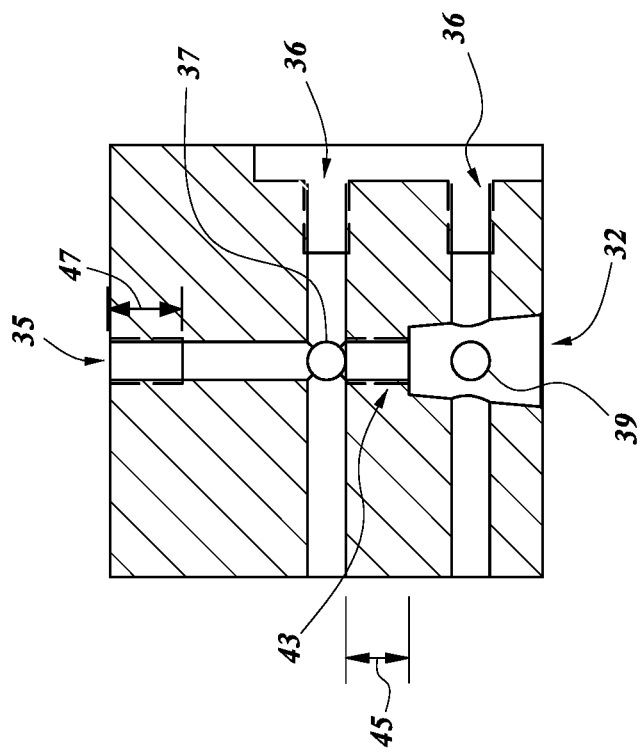
FIG. 3I illustrates a threaded bolt fastener in accordance with aspects of this disclosure and FIG. 3J illustrates a cross section through the cube coupling joint of FIG. 3F.
Figure 3F:
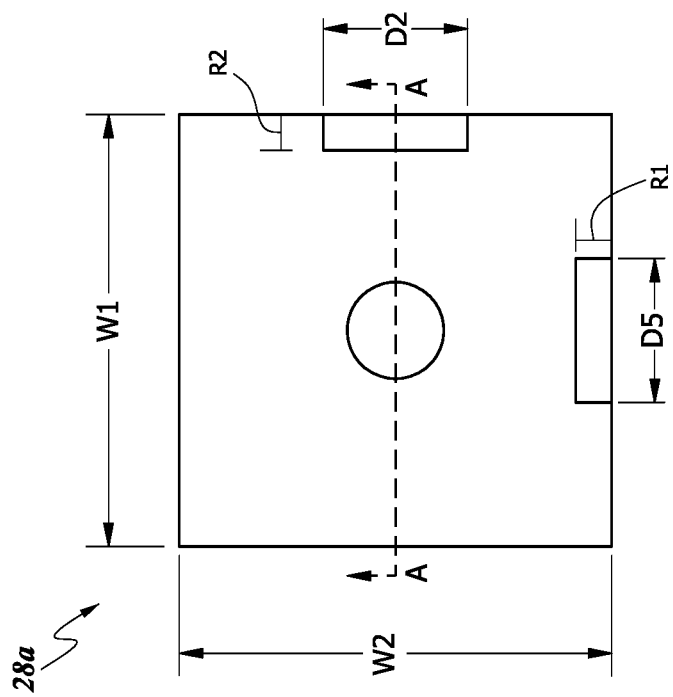
FIG. 3F illustrates a bottom view of the cube coupling joint of FIG. 3A.
Figure 3I:
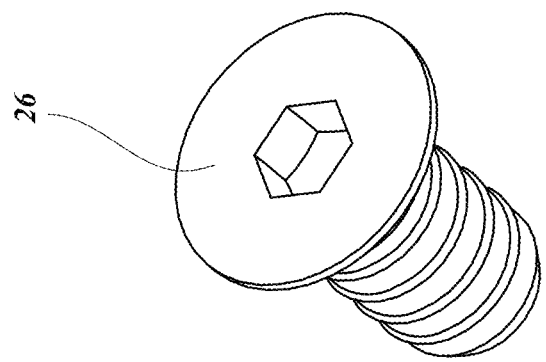
Figure 3H:
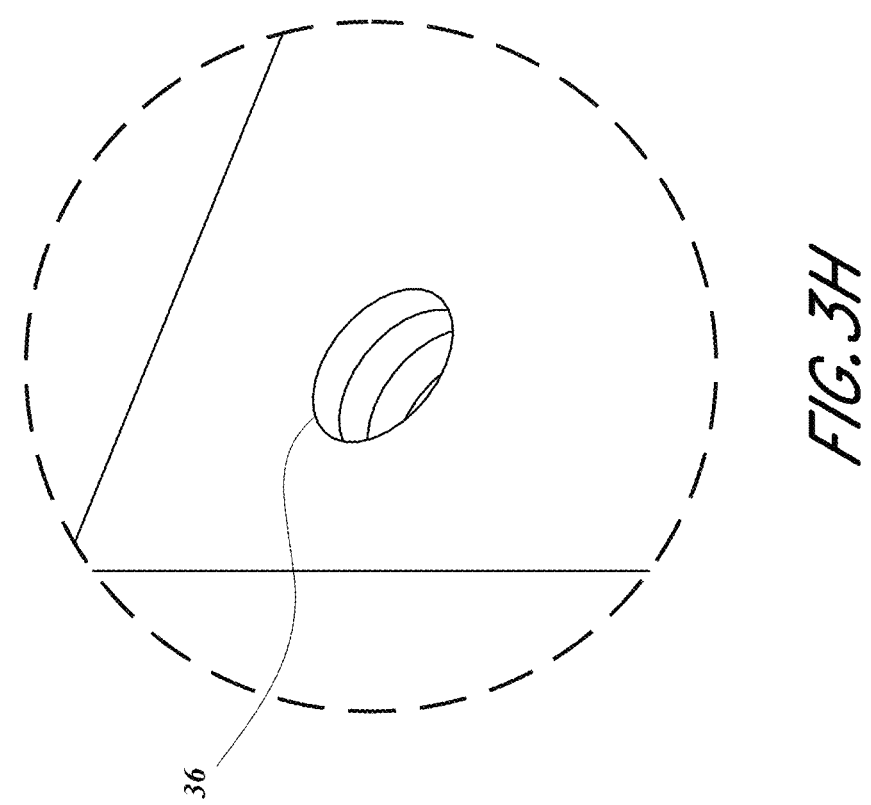
FIG. 3H illustrates a close up view of a threaded hole within a recessed portion of the cube coupling joint of FIG. 3B in accordance with aspects of this disclosure.

FIGS. 3E, 3F, and 3G show a top, bottom, and a side surface (respectively) of the cube coupling joint 28a described above. As shown, the cube coupling joint 28a can have a top surface or face that has no alignment holes, no fastener holes, and/or no recesses or recessed channels. As shown by FIG. 3G, the cube coupling joint 28a can have a side surface or face that has no alignment holes, no fastener holes, and/or no recesses or recessed channels. The bottom face shown in FIG. 3F illustrates the one or more alignment holes 32 that can be present in the cube coupling joint 28a. The one or more alignment holes 32 can be sized, shaped, and/or configured so as to permit one or more shear pins 22 to fit within and/or be secured thereto, as discussed herein. The one or more alignment holes 32 can spaced from edges of the cube coupling joint 28a a suitable distance to increase the bearing length of the one or more shear pins 22 and/or reduce the likelihood that loading, such as lateral loading, will cause fracture or failure of the cube coupling joint 28a. For example, as discussed and shown in FIGS. 2C and 2D, two cube coupling joints 28a, 28b can be aligned and/or secured to one another using one or more alignment holes 32 and one or more shear pins 22. In some configurations, cube coupling joint 28a is placed atop and aligned with and/or secured to cube coupling joint 28b of a top corner of a modular frame when assembling portions of a modular structure. Including a plurality of shear pins 22 and corresponding alignment holes 32 can advantageously reduce the lateral forces and/or stresses experienced by each shear pin 22 and/or the areas of the cube coupling joints 28a, 28b that bear against such shear pins 22. However, the more alignment holes 32 and/or the greater the cross sectional area of the alignment hole(s) 32 along a face of the cube coupling joint 28a, 28b, the less cross sectional area the cube coupling joints 28a, 28b have to resist forces and/or stresses. Further, the more alignment holes 32 in a given face (such as a bottom face) of the cube coupling joints 28a, 28b, the less spacing and bearing area there will be between the alignment holes 32 and shear pins 22 inserted within. Thus, the number, size, spacing, and/or configuration of alignment holes 32 can be modified depending on a variety of factors, including but not limited to: the size and/or material properties of the components of the modular frame (e.g., cube coupling joints, structural members, marriage straps, bolts/rivets); and the loads calculated/estimated to be experienced in the modular structure/building during dead, live, and/or lateral loading conditions or events.

For example, where a cube coupling joint 28a includes a plurality of alignment holes 32, the plurality of alignment holes 32 can be spaced from each other and/or staggered in alignment. For example, a cube coupling joint 28a can include four alignment holes 32 that are spaced and/or staggered from each other. This can advantageously provide greater bearing area in the cube coupling joint resulting from forces/pressure/stresses caused by one or more shear pins 22 that transfer, for example, lateral loads between the cube coupling joints 28a. In some embodiments, the cube coupling joints 28a include one alignment hole 32 configured to permit one shear pin 22 to fit within and thus align and secure the cube coupling joints 28a.

As discussed herein, shear pin 22 can transfer lateral loads between vertical stories along with the marriage straps, such as the marriage straps shown and/or discussed herein. In some cases, the shear pin or pins 22 can resist all or substantially all the lateral loads transferred when lateral loading events occur, such as wind or seismic events. As discussed above, the one or more alignment holes 32 in the cube coupling joints 28a reduce the bearing area that is available to resist forces and/or stresses caused by the transfer of forces from the shear pins 22. Thus, in order to prevent premature failure of the modular structure and/or frame system including cube coupling joints 28a, the amount and/or size of the alignment holes can be proportioned and/or optimized. For example, the total area of the alignment hole(s) on a face of the cube coupling joint 28a can be equal to or smaller than one-third ($\frac{1}{3}$) of the total area of the face of the cube coupling joint 28a, 28b. For example, if the cube coupling joint 28a has a face that is 6 inches by 6 inches, the total area of the alignment hole(s) can be equal to or smaller than 12 inch$^2$. This can advantageously allow for sufficient bearing area in the cube coupling joint 28a to bear against the one or more shear pins 22 when forces and/or stresses are applied. On the other hand, the total area of the alignment hole(s) 32 and corresponding cross sectional area of the one or more shear pin(s) 22 on a face of the cube coupling joint 28a can be equal to or greater than a certain percentage or fraction of the total area of the face of the cube coupling joint 28a to allow the shear pin(s) 22 to sufficiently transfer lateral loads without failing (for example, in bending or in shear). For example, the total area of alignment hole(s) 32 and corresponding cross sectional area of the one or more shear pin(s) 22 on a face of the cube coupling joint 28a can be equal to or greater than one-ninth ($\frac{1}{9}$) of the total area of the face of the cube coupling joint 28a to ensure that the shear pin(s) 22 can sufficiently resist the shear forces experienced during lateral load transfer without failing. For example, where the cube coupling joint 28a has a face that is 6 inches by 6 inches, the total area of the alignment hole(s) 32 and corresponding cross sectional area of the one or more shear pin(s) 22 can be equal to or greater than 4 inch$^2$. For example, the total area of the one or more alignment holes 32 and corresponding cross sections of the one or more shear pins 22 can be 4 inch$^2$, 6 inch$^2$, 8 inch$^2$, 10 inch$^2$, or 12 inch$^2$, or any values therebetween, or any ranges bounded by any combination of these values, although other values can be used in some implementations. Thus, the one or more alignment holes 32 can be sized to optimally provide sufficient bearing strength of the cube coupling joint 28a and also sufficient shear capacity of the one or more shear pins 22.

While the sections above discuss optimizing the relative total area of the one or more alignment holes 32 to achieve optimal bearing and shear strength capacity, such strength capacity can also be achieved by using stronger materials. For example, the one or more shear pins 22 can comprise a greater material strength that can provide greater shear capacity. Additionally or alternatively, the material of the cube coupling joint 28a, 28b can be varied to have a greater strength capacity, for example, bearing strength capacity. For example, where it is desired to have only one alignment hole 32 in a cube coupling joint 28a, the shear pin 22 can be made of a material (such as steel) with a shear strength that ensures that failure will not occur as a result of shear forces/stresses in the shear pin 22. This can be achieved by designing the shear pin 22 with a steel material including a sufficient shear capacity. Thus, greater bearing strength and/or shear strength can be achieved by selecting stronger materials.

FIG. 3F illustrates, from a bottom view, the one or more recesses or recessed channels that can be present in the cube coupling joint 28a. FIG. 3F shows what the one or more recesses or recessed channels 34 can look like from a different perspective as that shown in FIGS. 3C and 3D. More specifically, FIG. 3F shows the depth of the one or more recesses or recessed channels 34 as extending from an edge of the cube coupling joint 28a. As discussed above, the one or more recesses or recessed channels 34 can span a distance D2 and/or D5. Further, the one or more recesses or recessed channels 34 can be recessed at a depth R1 and R2 (see FIG. 3F). The depths R1 and R2 can be equal in some embodiments of the cube coupling joint 28a. Alternatively, the depths R1 and R2 can be unequal. The depths R1 and/or R2 can be a certain percentage of the width or length of the cube coupling joint 28a, such as 4%, 8%, 13%, 17%, 21%, 25%, 29%, 33%, 38%, 42%, or any values therebetween, or any ranges bounded by any combination of these values, although other values can be used in some implementations. For example, depths R1 and/or R2 can be in certain embodiments, between 5% and 15%, between 4% and 42%, between 8% and 38%, between 13% and 33%, between 17% and 33%, between 21% and 29%, between 4% and 33%, between 4% and 25%, or between 4% and 21% of the width or length of the cube coupling joint 28a, or any range bounded by these ranges. For example, where the cube coupling joint 28a has a width of 6 inches, the depth R1 and/or R2 can be equal to or about ¼ inch, equal to or about ½ inch, equal to or about ¾ inch, equal to or about 1 inch, equal to or about 1.25 inch, equal to about 1.5 inch, equal to about 1.75 inch, equal to or about 2 inch, equal to or about 2.25 inch, equal to or about 2.5 inch, or any values therebetween, or any ranges bounded by any combination of these values, although other values can be used in some implementations. For example, where the cube coupling joint 28a has a width of 6 inches, the depth R1 and/or R2 can be between ¼ inch and ¾ inch in certain embodiments, between ¼ inch and 2.5 inch, between ½ inch and 2.25 inch, between ¾ inch and 2 inch, between 1 inch and 1.75 inch, between 1.25 inch and 1.5 inch, or any range bounded by these ranges. One having skill in the art will recognize that, depending on the dimensions of the cube coupling joint 28a, the depths R1, R2 of the one or more recesses or recessed channels 34 can vary. As discussed below, having a larger depth R1 and/or R2 can be advantageous for cube coupling joints configured to secure to structural foundations.

The depth(s) R1 and/R2 can be varied to provide optimal strength capacity of the cube coupling joint 28a, the connected components, and/or the connection assembly as a whole. For example, including a smaller depth for the one or more recesses or recessed channels 34 allows greater cross sectional area of the cube coupling joints and can allow the cube coupling joints to have greater load strength capacity. On the other hand, having larger depths R1 and/or R2 for the one or more recesses or recessed channels 34 can allow thicker marriage straps to secure two or more cube coupling joints and connected modular frames. The thicker the marriage strap, the greater potential for increased strength capacity of the marriage straps, for example to resist shear and/or tensile forces and/or stresses. Thus, the depths R1, R2 of the one or more recesses or recessed channels 34 can be optimally sized within the ranges described above to provide greater strength capacity for the modular structure system. However, similar to as discussed above with regard to the alignment hole(s) and shear pin(s), greater strength capacity could be also or alternatively be achieved for both the cube coupling joints and/or the marriage straps by varying the material properties.

FIG. 3G shows a side face of a cube coupling joint. As shown, the side face of the cube coupling joint 28a has no recesses or recessed channels, no alignment holes, and no fastener holes.

As shown in FIG. 3A, for example, the cube coupling joint 28a can have one or more holes 35. Holes 35 can extend a depth from a face of the cube coupling joint 28a, such as a top face. For example, holes 35 can extend through the cube coupling joint 28a and join with channel 43 (described below). Holes 35 can have a threaded portion 47 which can extend from a face of the cube coupling joints 28a. Holes 35 can allow for ease in assembly of one or more modular frames as described herein. For example, a link or connector (such as the eye bolt 845 shown in FIGS. 26-27) can be threaded into threads in hole 35. The link or connector can extend away from hole 35 and/or a face of the cube coupling joint 28a and terminate in a head. The termination head of the link or connector can facilitate connection to a crane device, which can be used to lift and/or carry modular frames during assembly. For example, a link or connector can be threaded into the hole 35 and a crane device can grab onto the head and thereby lift and/or move a modular frame (which can include a cube coupling joint 28a and one or more connected structural members) to assembly with another modular frame. Thus, the holes 35 can provide a mechanism which helps facilitate assembly of modular frames and/or structures. The holes 35 and its capability of interacting with a link or connector and/or an assembly crane such as that described above, are the same as holes shown in other figures in this disclosure, for example, holes 127, 227, 327.

As shown in FIG. 3F and FIG. 3J, which shows a cross-section A-A through FIG. 3F, and as discussed herein, cube coupling joint 28a can have one or more holes 35, 36, and/or one or more alignment holes 32. These holes 35, 36, and/or 32 can extend partially through an interior of the cube coupling joint 28a. Alternatively, these holes 35, 36, and/or 32 can extend through a portion of a height, depth, and/or length of the cube coupling joint 28a, as shown in FIG. 3J. While FIG. 3J shows holes 36 extending through the cube coupling joint 28a from one face to an opposite face, these holes 36 can alternatively extend only partially through the cube coupling joint 28a. For example, holes 36, along with holes 37 and 39 (which are the same as holes 36 but are on a different face of the cube coupling joint 28a) can extend a distance (not shown) from a recessed portion of a face of the cube coupling joint 28a (see dashed lines extending to the left of arrows 36 in FIG. 3J). As another example, if the cube coupling joint 28a is a 6 inch by 6 inch by 6 inch cube, these holes 36, 37, 39, can extend approximately 1.25" from a recessed face of the cube coupling joint 28a. This can allow for an adequate amount of threaded to be in holes 36, 37, 39 for securement of a marriage strap (discussed herein) while also minimizing the amount of reduction of volume of the cube coupling joint 28a. As discussed in more detail below, the cube coupling joint 28a can have a channel 43 with a depth 45, which can facilitate securement of one or more alignment or shear pins 22 with the one or more alignment holes 32. The attributes discussed with reference to FIGS. 3F and 3J with respect to cube coupling joint 28a are applicable to all cube coupling joints described herein.

Figure 4C:
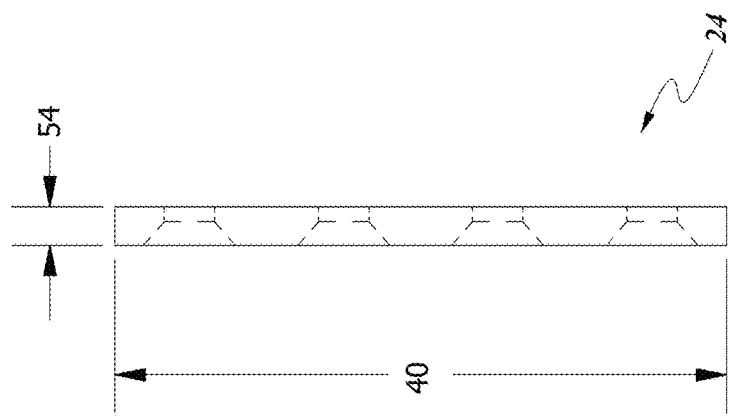
FIG. 4C illustrates a side view of the marriage strap of FIG. 4A.
Figure 4B:
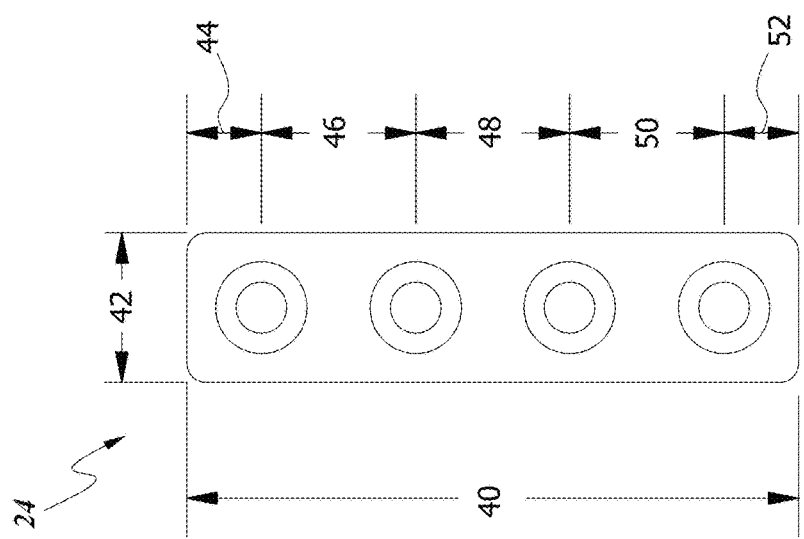
FIG. 4B illustrates a front view of the marriage strap of FIG. 4A.
Figure 4A:
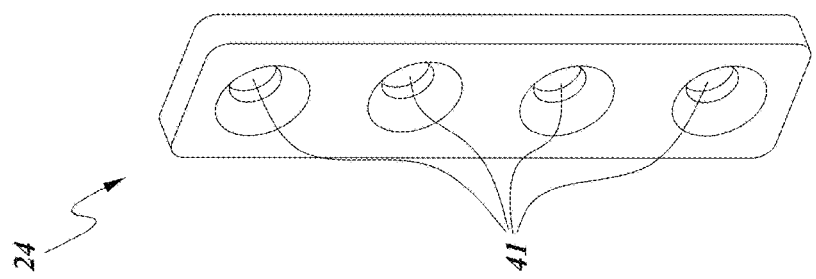
FIG. 4A illustrates a perspective view of an embodiment of a marriage strap in accordance with aspects of this disclosure.

As discussed herein, one or more modular frames can be connected using one or more cube coupling joints and one or more marriage straps. FIGS. 4A-4C illustrate an embodiment of a marriage strap 24 that can be used in the intermediate joint assembly 12 shown in FIG. 2C-2D. The marriage strap 24 can include one or more through-holes 41. The one or more through-holes 41 can align with one or more fastener holes 36 in the cube coupling joints 28a, 28b when the marriage strap 24 is placed within the one or more recesses or recessed channels 34 of the cube coupling joint 28a, 28b. The one or more through-holes 41 can be sized and shaped to accommodate various fasteners to pass therethrough. For example, the one or more through-holes 41 can have a diameter that allows a fastener to pass therethrough and secure to one or more fastener holes 36 in the cube coupling joint 28a, 28b. The one or more through-holes 41 can have a countersunk rim surrounding the perimeter of the one or more through-holes 41 that can allow for a portion of a fastener to fit within and be "countersunk." This can advantageously allow for a flush surface to be achieved when the fastener is passed through the one or more through-holes 41 and secured to a portion of the cube coupling joint 28a, 28b. As discussed above, the one or more marriage straps 24 can have a thickness 54 equal to the depth of the one or more recesses or recessed channels 34 in the cube coupling joints 28a, 28b.

The marriage strap 24 can have one or more through-holes 41, such as one or more, two or more, three or more, four or more, five or more, six or more, seven or more, or eight or more through-holes, although values outside these are possible in some cases. The one or more through-holes 41 can be sized, shaped, spaced, and/or oriented to correspond with the size, shape, spacing, and/or oriented of one or more holes within recesses or recessed channels of the cube coupling joints 28a, 28b as discussed herein. The one or more through-holes 41 can be sized, shaped, spaced, and/or oriented to accommodate different sizes of fasteners to pass therethrough. The one or more through-holes 41 can be sized, shaped, spaced, and/or oriented to increase the capacity of the marriage strap 24 to resist forces and/or stresses. For example, the spacing between the one or more through-holes 41 can be optimized so as to provide adequate bearing strength in the marriage strap 24. The greater the spacing between the one or more through-holes 41, and between the one or more through-holes 41 and exterior edges of the marriage strap 24, the greater bearing capacity the marriage strap 24 can have. However, depending on the size of the marriage strap 24 and the connection assembly configuration, a certain amount of bolts and corresponding through-holes 41 may be required to sufficiently transfer loads from one cube coupling joint to another (and thus one modular frame to another).

The marriage strap 24 can have a length 40, width 42, and a thickness 54. The length 40, width 42, and/or thickness 54 of the marriage strap 24 can vary depending on the size, shape, and/or orientation to correspond to the size, shape, depth, and/or orientation of one or more recesses or recessed channels 24 in the cube coupling joints 28a, 28b and/or one or more holes 36 within the one or more recesses or recessed channels 34 of the cube coupling joints 28a, 28b. The marriage strap 24 can have one or more through-holes 41 spaced at varying distances from each other and/or from exterior edges of the marriage strap 24 to align with one or more holes within one or more recesses or recessed channels of the cube coupling joint. For example, the marriage strap 24 can have four through-holes 41. The four through-holes 41 can be spaced distances 46, 48, and 50 from each other (see FIG. 4B). The outer two of the four through-holes can be spaced distances 44 and 52 from exterior edges of the marriage strap 24. Distances 46, 48, 50, 44, and/or 52 can be equal, or alternatively can be unequal. As shown in FIGS. 2C and 2D, marriage strap 24 can be used to secure cube coupling joints 28a and 28b and their respective connected structural members 20. For example, marriage strap 24 can be placed vertically in one or more recesses 34 of cube coupling joint 28a and one or more recesses in cube coupling joint 28b and can be secured to both cube coupling joints 28a, 28b using fasteners, such as those discussed herein. As also discussed herein, marriage strap 24 can have a thickness that matches or substantially matches the depth of the one or more recesses 34 in cube coupling joints 28a, 28b so that an outer surface of marriage strap 24 is flush or substantially flush with an outer surface of the cube coupling joints 28a, 28b. In certain embodiments, the marriage strap 24 can have thicknesses within 5% of depths of the recesses 34 of the cube coupling joints 28a, 28b. In certain embodiments, the marriage strap 24 can have thicknesses within 2% of depths of the recesses 34 of the cube coupling joints 24. However, in some embodiments the cube coupling joints 28a and/or 28b do not have recessed channels 34 and cube coupling joints 28a, 28b can be secured without having a flush or substantially flush surface.

As discussed above, one or more structural members can be secured to the cube coupling joint or portions thereof. Such securement can be, for example, by welding in a factor prior to assembly of a modular structure. FIG. 2B, among others, illustrates how the one or more structural members can be aligned and/or secured to a cube coupling joint. As shown, the one or more structural members 20 can be secured to one or more faces or surfaces of a cube coupling joints 28a, 28b. Depending on the size, shape, and/or orientation of the cube coupling joints 28a, 28b and/or the connection assembly of a modular frame or modular structure, one or more structural members 20 can be secured to the cube coupling joints. For example, where the cube coupling joints 28a, 28b include six faces, as shown in FIG. 2B, three structural members can be secured to a first side face, second side face, and bottom face of the cube coupling joints 28a, 28b. The structural members secured to the first and second side faces can be, for example, beams, designed to span between one or more columns. The structural member secured to the bottom side face in FIG. 2B can be, for example, a column, designed to transfer the vertical and/or other loads to lower stories and/or a structural foundation.

Figure 5A:
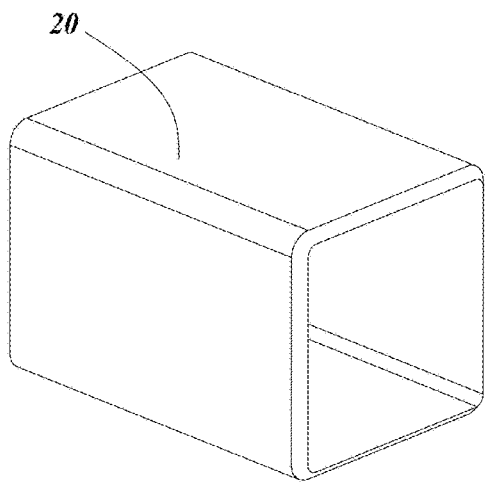
FIG. 5A illustrates a perspective view of an embodiment of a structural member in accordance with aspects of this disclosure.
Figure 5B:
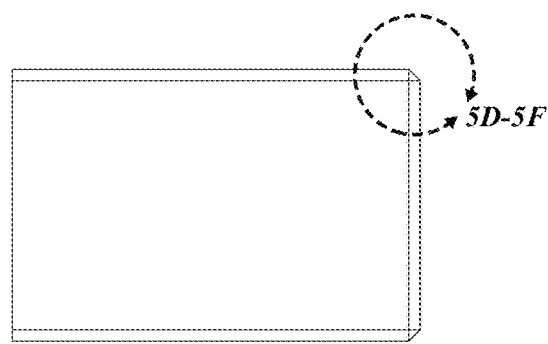
FIG. 5B illustrates a side view of the structural member of FIG. 5A.
Figure 5C:
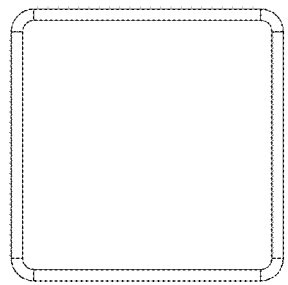
FIG. 5C illustrates a front view of the structural member of FIG. 5A.

The one or more structural members 20 can be a variety of sizes and/or shapes, depending on the configuration and/or design of the modular frame and/or cube coupling joints 28a, 28b. As with other components of the modular frames discussed herein, the one or more structural members 20 can comprise a variety of materials, as well. For example, in some embodiments, the one or more structural members 20 comprise steel, and can also comprise a hollow cross section in certain embodiments, such as a hollow structural section (HSS) shape. FIG. 5A illustrates a perspective view of a structural member 20 comprising an HSS shape. FIGS. 5B and 5C illustrate side and front views of a structural member 20 having an HSS shape. These shapes can be advantageous in modular frames and modular construction because of their relatively light weight as compared with other structural sections and because of their desirable strength/configuration properties, such as moment of inertia as compared with other structural sections. HSS can also be advantageous for modular frames and/or structures like those discussed herein because they can be sized, shaped, and/or oriented to match the size, shaped, and/or orientation of the cube coupling joints discussed herein. For example, as shown by FIG. 2B and other figures, an HSS can comprise a square cross section that is equal or substantially equal to dimensions of one or more faces of the cube coupling joints. This can advantageously allow the HSS structural members to align with and/or secure to the cube coupling joints more easily. For example, where a cube coupling joint has dimensions 6 inch×6 inch×6 inch, the a structural member 20 can comprise a 6 inch×6 inch cross section, thereby facilitating the alignment and/or securement with the cube coupling joint. Matching the cross sectional dimensions of the one or more structural members with dimensions of the cube coupling joints can also maintain flush surfaces, as discussed herein.

Figure 5D:
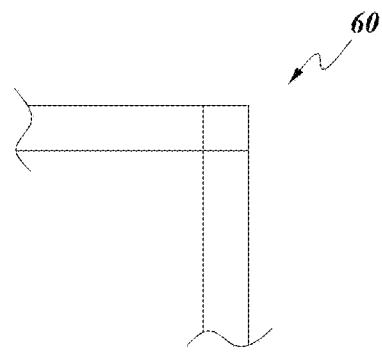
FIG. 5D illustrates an embodiment of a welding edge of a structural member in accordance with aspects of this disclosure.
Figure 5E:
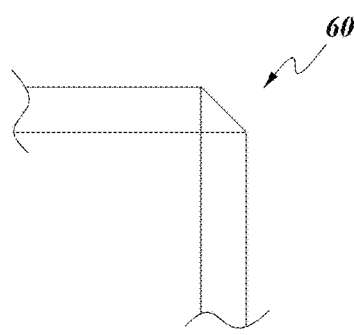
FIG. 5E illustrates another embodiment of a welding edge of a structural member in accordance with aspects of this disclosure.
Figure 5F:
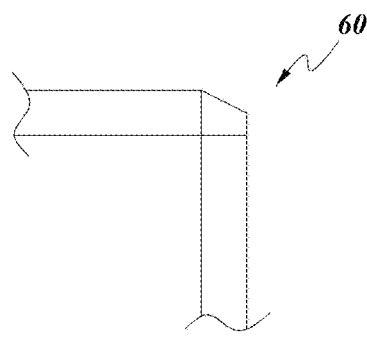
FIG. 5F illustrates another embodiment of a welding edge of a structural member in accordance with aspects of this disclosure.

As discussed above, the one or more structural members 20 can be welded to the cube coupling joints or portions thereof prior to deliver of modular frames to a construction site. FIGS. 5D, 5E, and 5F show different designs for exterior edges of a structural member 20. Depending on the design, different welding techniques can be utilized. For example, as shown by FIG. 5D, where the exterior edges or portions of exterior edges of a structural member 20 are not trimmed, exterior edges of structural members 20 can be welded via a fillet weld (if the cross sectional dimensions of the structural member are smaller than the dimensions of the corresponding face of the cube coupling joint secured thereto) and/or another type of weld (where the structural member and the cube coupling joint dimensions match).

Alternatively, the one or more structural members 20 can be designed so as to accommodate a flush surface after welding to the cube coupling joint or portions thereof. For example, as shown by FIGS. 5B and 5E, exterior edges of the structural members 20 can be beveled. Beveling the exterior edges of the structural members 20 can allow weld material to fill within the beveled region and also maintain a flush surface in surfaces surrounding the cube coupling joints and/or structural members, which can lead to advantages in adding other structural, or non-structural elements and/or components to the modular frames, as discussed herein. Beveling the exterior edges can also allow a stronger weld to be provided. For example, beveling the exterior edges can allow a continuous joint penetration (CJP) weld to be formed, while also maintaining a flush surface. A CJP weld made with the appropriate weld material can advantageously be designed to be stronger than the base metals that they connect, and can allow development of the full strength of the base metals and corresponding components they connect. As discussed above, the cube coupling joints and other components discussed herein can be utilized to construct modular frames and structures that are capable of resisting strong lateral loads, such as wind and seismic loads. The modular frames and structures constructed with these cube coupling joints and other components discussed herein can comprise a lateral resisting system such as a moment resisting frame. Thus, designing the structural members 20 with a beveled edge and CJP weld can provide a strong connection for use in a moment resisting frame.

In addition to, or as an alternative to, the fillet and/or CJP welds, the structural members 20 can be designed to accommodate other types of welds, such as a partial joint penetration welds. For example, as shown by FIG. 5F, exterior edges of the structural members can be partially beveled (chamfered). A partially beveled exterior edge can allow a partial joint penetration (PJP) weld to be formed within the partially beveled portion, while also maintaining a flush surface. While CJPs generally produce stronger welds than PJPs and fillet welds, these weld types, as well as others, can be used to secure the one or more structural members 20 to the cube coupling joints or portions therefore and can be used to provide strong load transfer characteristics, including as lateral resisting frames.

As discussed above, one or more alignment pins 22 can be utilized to align and/or secure two or more cube coupling joints to each other. As also discussed above, the one or more alignment pins 22 can be shear pins that can transfer forces, such as lateral forces between modular frames via the cube coupling joints. FIG. 6A illustrates an embodiment of a shear pin 22. As shown, the shear pin 22 comprises a generally cylindrical cross section with an inner diameter 74 and an outer diameter 73. The shear pin 22 can comprise an inner diameter 74 at ends of the shear pin 22 and an outer diameter 73 at a cross section between the two ends, such as at a middle region. The inner diameters 74 at opposite ends of the shear pins 22 can gradually transition or slope to the outer diameter 73. However, the inner diameters 74 can transition to the outer diameter 73 in a non-gradual or non-sloped manner. For example, there can be a stepped transition from the inner diameters 74 to the outer diameter 73. The shear pin 22 can alternatively comprise a cylindrical cross section with only one diameter (e.g., 73 or 74) that is uniform throughout the length of the shear pin 22. The shear pin 22 can also comprise a non-cylindrical cross section, such as a rectangular cross section. The one or more shear pins 22 can have a size, shape, and/or orientation corresponding to the size, shape, and/or orientation of the one or more alignment holes 32 in the cube coupling joints, as discussed herein. For example, where the shear pins 22 have an outer diameter 73 which increases radially outward to an inner diameter 74 in a middle region of the shear pin 22, the one or more alignment holes 32 can be shaped to accommodate portions of the shear pin 22. For example, an alignment hole 32 in a first cube coupling joint can be sized to receive a portion of the shear pin 22 between the middle region and a top end of the shear pin 22, and another alignment hole 32 in a second cube coupling joint can be sized to receive another portion of the shear pin 22 between the middle region and a bottom end of the shear pin 22.

The inner diameter 74 can advantageously provide greater shear capacity of the shear pin 22. For example, where two cube coupling joints are aligned and horizontally secured with a shear pin 22, the shear pin 22 can experience the greatest shearing force along a plane where the two cube coupling joints meet. This plane can be in a middle region of the shear pin 22. Having a shear pin 22 with a larger diameter along this plane can provide greater shear capacity of the shear pin 22 due to the larger diameter. Since the modular frames discussed herein can rely, at least in part, on the one or more shear pins 22 to sufficiently transfer loads, such as horizontal or lateral loads, between modular frames, this greater capacity can advantageously provide safe transfer of lateral loads and can ensure that shearing of the shear pin 22 is not the first failure mode when strong lateral loads are experienced. Thus, designing the shear pin 22 with a larger inner diameter 74 at the shear transfer plane can advantageously allow the cube coupling joints and connected modular frames to safely transfer lateral loads. However, increasing the shear capacity of the shear pin 22 can be accomplished by other designs and/or methods as well. For example, the material properties of the shear pin 22 can be modified to provide greater shear capacity of the shear pin 22 and ensure that the modular structure and/or portions thereof do not first fail via shearing of the pins. In such case, it may not be necessary to design the shear pin 22 to have more than one diameter. The shear pin 22 can be sized, shaped, and/or oriented to fit within one or more alignment holes in the cube coupling joints. The shear pin 22 can have a length 71.

The non-uniform or tapered diameter of the alignment or shear pin 22 can also advantageously allow for ease in assembly and/or disassembly of modular frames. For example, the tapered diameter of the alignment pins 22 allows the alignment holes 32 of the cube coupling joint 28*a* (which can be sized and shaped according to the tapered diameter of the alignment pins 22) to more easily pull-out and/or away from the alignment pins 22, especially where tolerances or gaps between exterior surfaces of the alignment pins 22 and the alignment holes 32 are small.

The one or more alignment pins and/or shear pins 22 can have a stem 21 that extends from one or both ends (see FIGS. 6A and 6B). The stem 21 can have a threaded exterior configured to thread into a channel 43 of the cube coupling joint 28*a* (see FIGS. 3F and 3J). As illustrated in FIG. 3J and as discussed above, the cube coupling joint 28*a* can have one or more alignment holes 32 and can also have a channel 43 extending through an interior portion of the cube coupling joint 28*a*. The channel 43 can be threaded so as to secure to the threaded stem 21 of the one or more alignment or shear pins 22. Incorporating a threaded exterior surface on the stem 21 can allow the one or more alignment or shear pins 22 to be secured to the cube coupling joints 28*a* conveniently during assembly of a modular frame. For example, during assembly of one or more modular frames having a cube coupling joint and one or more structural members secured thereto, a first modular frame can be placed atop another modular frame (by aligning up the two respective cube coupling joints) after an alignment or shear pin 22 has been passed through the alignment hole 32 and fastened to the channel 43 of one of the cube coupling joints. This can help speed up the assembly process and can help make sure the alignment pins 22 stay in place during such process. The channel 43 can extend a distance 45 beyond an edge of the alignment hole 32 (see FIGS. 3F and 3J). In some cases, the channel 43 can be threaded for an entire length of the channel 43. For example, with reference to FIGS. 3F and 3J, the threading of channel 43 can include the distance 47, distance 45, and a distance extending between 47 and 45.

The alignment or shear pin 22 can have a slot (not shown) on an end surface. For example, the alignment or shear pin 22 shown in FIG. 6A can have a slot on a top surface (opposite to the end with the stem 21) that has a slot configured to allow a portion of a tool (such as a drill or flathead screwdriver) to fit within. For example, this slot can allow a flathead screwdriver to engage the alignment or shear pin 22 and secure the pin into the cube coupling joint 28*a* by threading of a threaded stem 21 into a threaded channel 43.

As discussed above, the total area of the one or more alignment holes of the cube coupling joints can be optimally proportioned in relation to the total area of a face of the cube coupling joint having the one or more alignment holes 32. Because the one or more shear pins 22 can be sized, shaped, and/or oriented so as to match the size, shape, and/or orientation of the one or more alignment holes 32, the total cross sectional area of the one or more shear pins 22 can also be proportioned accordingly. For example, the total area of the one or more shear pins 22 can be designed as a certain percentage of the total area of the cube coupling joint(s) to which they connect. These certain percentages can be equal to the percentages described above with reference to the one or more alignment holes 32 in order to provide sufficient total cross sectional area of the shear pins 22 to adequately resist shearing forces experienced during lateral load transfer.

Figure 7:
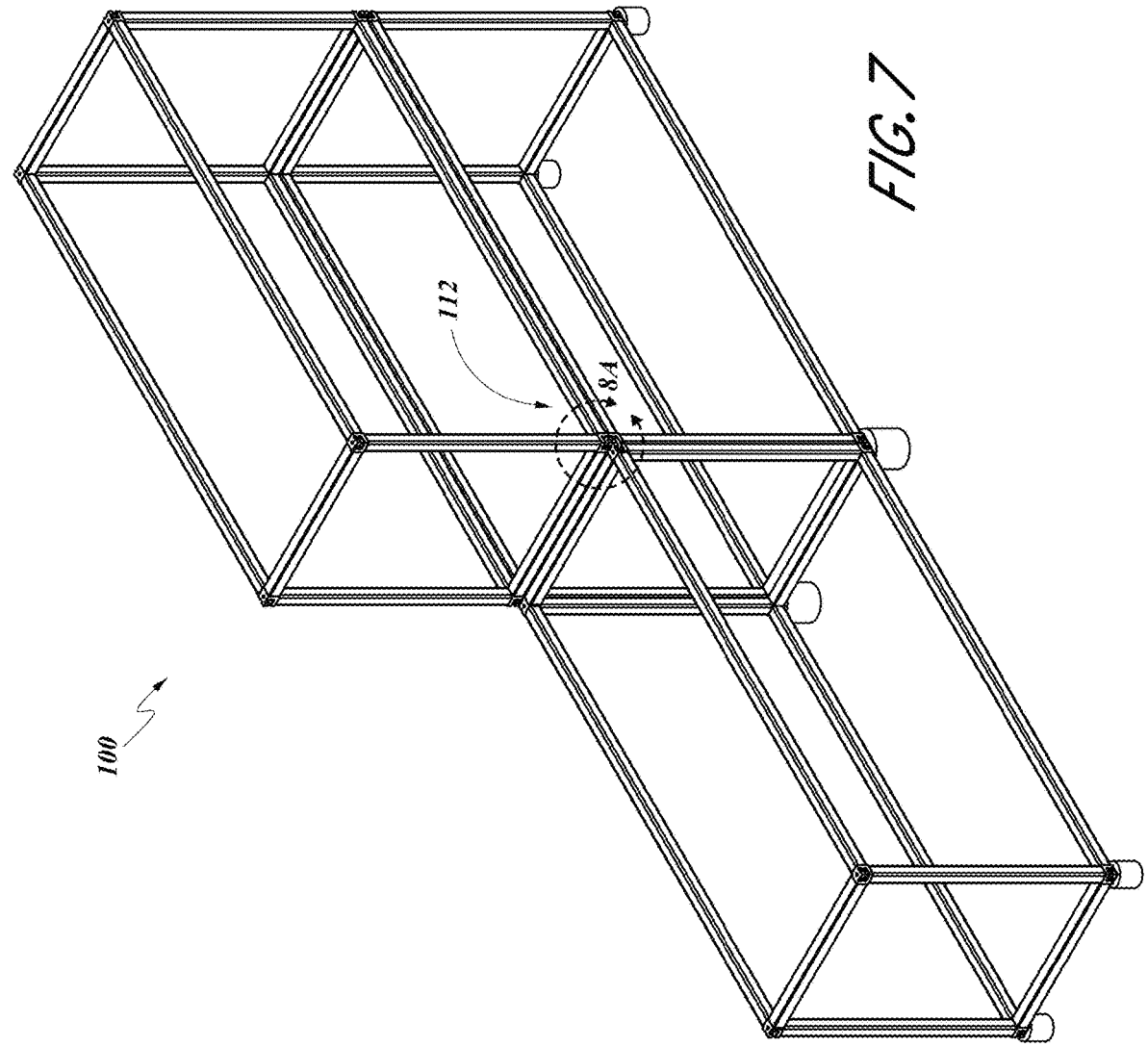
FIG. 7 illustrates a perspective view of another configuration for a modular structure in accordance with aspects of this disclosure.

FIG. 7 illustrates how one or more cube coupling joints can be used to connect a top corner of a single-story modular frame to a two-story modular frame at an intermediate joint assembly 112 of the two-story modular frame. Utilization of one or more cube coupling joints along with, for example, the one or more marriage straps, one or more shear pins, and one or more bolts, rivets, and/or other fasteners can provide significant flexibility in the construction of modular frames and/or modular structures including multiple modular frames. For example, the modular structure 10 in FIG. 1 can be converted into the modular structure 100 of FIG. 7 by utilizing different configurations of marriage straps, such as those discussed herein. FIGS. 8A and 8B show, respectively, a close up perspective view and close up exploded perspective view of a joint assembly 112 where a one-story modular frame is connected to a two story modular structure at the second floor of the modular structure.

FIG. 8B shows the various components that can be utilized in the joint assembly 112. For example, the joint assembly 112 can be connected using one or more structural members 120, one or more cube coupling joints 128*a*, 128*b*, 128*c*, one or more shear pins 122, one or more marriage straps 124, 126, and/or one or more fasteners 130, 132. The cube coupling joints 128*a*, 128*b*, 128*c* can be the same as cube coupling joints 28, 28*a*, 28*b* in some or all respects and accordingly reference can be made to the aspects and modified and alternative aspects described above. Alternatively, the cube coupling joints 128*a*, 128*b*, 128*c* can be different than the cube coupling joints 28*a*, 28*b* in some or all respects. For example, the cube coupling joints 128*a*, 128*b*, and/or 128*c* can comprise a different number size, shape, o and/or orientation of recesses or recessed channels. Alternatively, the cube coupling joints 128*a*, 128*b*, 128*c* can be the same as the cube coupling joints 28*a*, 28*b*, which may provide simplicity and efficiency in construction. The shear pin 122 can be the same as the shear pin 22 in some or all respects and accordingly reference can be made to the aspects and modified and alternative aspects described above. The structural members 120 can be the same as the structural members 20 in some or all respects and accordingly reference can be made to the aspects and modified and alternative aspects described above.

The one or more bolts 130, 132 can be the same as the bolts 26 in some or all respects and accordingly reference can be made to the aspects and modified and alternative aspects described above. The one or more bolts 132 can be longer than the one or more bolts 26, 130. For example, the one or more bolts 132 can comprise a longer length so as to fit through a portion of a marriage strap 124 that is thicker than another portion of a marriage strap 124. As discussed below, the marriage strap 124 can comprise two different thickness in order to facilitate securement between the one or more cube coupling joints 128*a*, 128*b*, and/or 128*c* in the joint assembly 112*a* as shown in FIGS. 7-8B.

FIGS. 9A-9C illustrate another embodiment of a marriage strap, which is also shown in FIGS. 8A and 8B. As shown, marriage strap 126 has a shape enabling the marriage strap 126 to secure, and secure to, cube coupling joints 128*a*, 128*b*, and 128*c* (see FIG. 8A). The marriage strap 126 can include four straight portions. The marriage strap 126 can include a first straight portion that transitions into a second straight portion that transitions into a third straight portion that transitions into a fourth straight portion. As shown, marriage strap 126 is not continuous. Thus, in the illustrated embodiment, there is a gap between the first straight portion and the fourth straight portion.

Marriage strap 126 can include one or more through-holes, that can be similar in many or all respects to the one or more through-holes of marriage strap 24. For example, the one or more through-holes of marriage strap 126 can include inner diameters and countersunk rims surrounding the perimeters of the one or more through-holes which are configured to allow a portion of a fastener to fit within and create a flush surface along a plane of marriage strap 126. The one or more through-holes of marriage strap 126 can be sized, spaced, shaped, and/or oriented to align with one or more holes in cube coupling joints 128*a*, 128*b*, and/or 128*c*. The size, spacing, shape, and/or orientation of the one or more through-holes can be selected based on the amount of cube coupling joints that are to be connected in a joint assembly configuration of a modular structure. Additionally, the size, spacing, shape, and/or orientation of the one or more through-holes can be designed so as to optimize the strength capacity of marriage strap 126, for example bearing and/or tensile capacity. This sizing, spacing, shaping, and/or orientation can be the same in many or all respects as that discussed with regard to the one or more through-holes 41 of marriage strap 24.

As shown in FIGS. 9A and 9B, marriage strap 126 has a length 134 along a first side, a length 131 along a second side, a length 130 along a third side, and a length 133 along a fourth side. The lengths 130, 131 can be equal to each other. Alternatively, the lengths 130, 131 can be unequal. The lengths 134, 133 can be equal to each other. Alternatively, the lengths 134, 133 can be unequal. As shown, marriage strap 126 has two through-holes along length 134, two through-holes along length 131, four through-holes along length 130, and one through-hole along length 133. The number of through-holes along any of these four lengths can vary and correspond to the number of fastener holes in the cube coupling joints 128a, 128b, 128c. Marriage strap 126 can have the same or varying widths along its length. For example, marriage strap 126 can have width 135 along length 134 and a width 136 along length 133. Widths 135, 136 can be equal or unequal, and can vary according to the widths of the one or more recesses or recessed channels of cube coupling joints 128a, 128b, 128c.

While marriage strap 126 includes two through-holes as shown along length 131, more through-holes can be included to increase the securement between cube coupling joints 128b, 128c. For example, four through-holes and fasteners can be positioned along length 131, two of which secure to cube coupling joint 128b and two of which secure to cube coupling joint 128c. As shown in FIG. 9B, marriage strap 126 can include four through-holes along length 130. The four through-holes can be equally or unequally spaced from each other. For example, depending on the dimensions of the cube coupling joints 128a, 128b (see FIG. 8A) and/or the number, size, spacing, shape, and/or orientation of the one or more recesses or recessed channels and/or one or more holes within the one or more recesses or recessed channels of the cube coupling joints 128a, 128b, the four through-holes can be spaced unequally so as to facilitate connection between the two cube coupling joints 128a, 128b. The four through-holes can be spaced from each other at distances 138, 139, and/or 140, which can be equal or unequal. As shown in FIG. 9C, marriage strap 126 can have a thickness 132. The thickness 132 can be equal or substantially equal to the depth of the one or more recesses or recessed channels of cube coupling joints 128a, 128b, 128c so as to facilitate a flush surface when marriage strap 126 is fit within one or more recesses or recessed channels.

FIGS. 10A-10C illustrate another embodiment of a marriage strap. Marriage strap 124 can be similar in some or all respects to marriage strap 24 and accordingly reference can be made to the aspects and modified and alternative aspects described above. Marriage strap 124 can be sized, shaped, and/or oriented to fit within one or more recesses or recessed channels of one or more cube coupling joints. Marriage strap 124 can have one or more through-holes, such as one or more, two or more, three or more, four or more, five or more, six or more, seven or more eight or more, or nine or more through-holes to permit one or more bolts or other fasteners to pass there through and secure to a portion of the cube coupling joints.

Marriage strap 124 has two different cross sectional thicknesses 161, 162 along length 160. This can advantageously facilitate unique connection configurations of one or more cube coupling joints, such as 128a, 128b, and 128c. For example, as shown in FIG. 8B, cube coupling joint 128a can be configured to connect to cube coupling joint 128b or 128c via marriage strap 124. Marriage strap 124 can have a greater thickness for a bottom region of the connector 124 that is configured to fill a recess within cube coupling joint 128b and a recess within cube coupling joint 128c. The bottom region can fill all or substantially all the space in between these two recesses or recessed channels. The larger cross section of the bottom region of the connector 124 can provide greater strength capacity to marriage strap 124 due to the increased thickness. The top region of marriage strap 124 can be configured to secure to the cube coupling joint 128a when the joint assembly 112 is connected, and the bottom region can be configured to secure to either of cube coupling joints 128b, 128c when the joint assembly 112 is connected. While FIG. 8B orient bolts 132 toward cube coupling joint 128b, one or both bolts 132 could be oriented and configured to secure to cube coupling joint 128c. In such case, the countersunk perimeter portion surrounding the respective through-holes in the bottom region of marriage strap 124 could be oriented on the opposite face of the bottom region of marriage strap 124 so as to facilitate a flush surface along that face when the one or both bolts 132 pass therethrough. Where is it desired to provide additional securement between cube coupling joints 128a and 128b, bolts 130 and 132 could secure to the cube coupling joints 128a and 128b respectively, and the corresponding countersunk rims surrounding the through-holes in marriage strap 124 could be oriented accordingly. However, where it is desired to provide additional securement between the cube coupling joints 128a and 128c, the two countersunk rims could be oriented on the opposite face of the bottom region of marriage strap connector 124 from that which is shown in FIG. 8B.

Figure 12A:
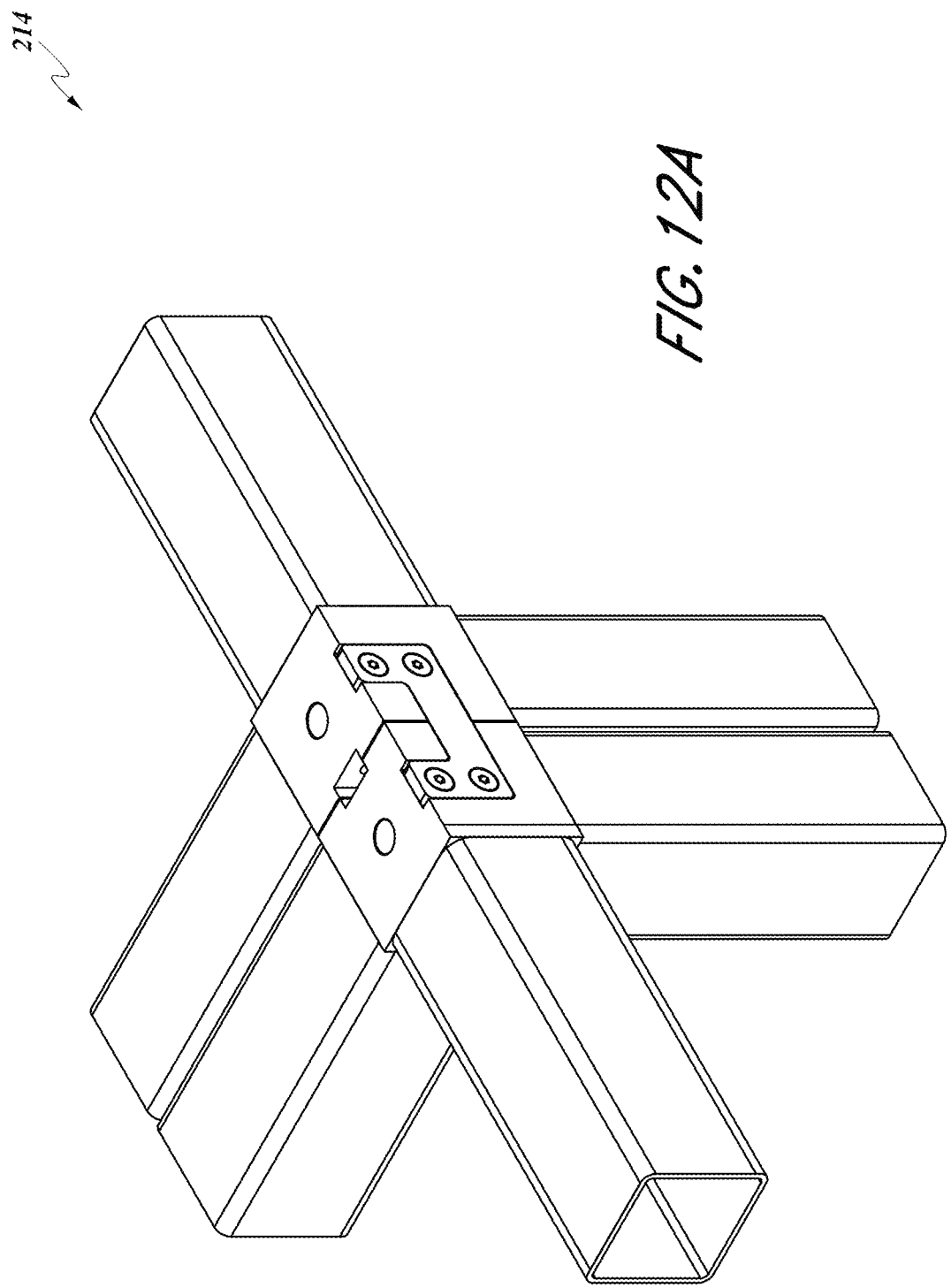
FIG. 12A illustrates a perspective view of a top corner connection assembly shown in FIG. 11 and labeled 12A in FIG. 11.
Figure 12B:
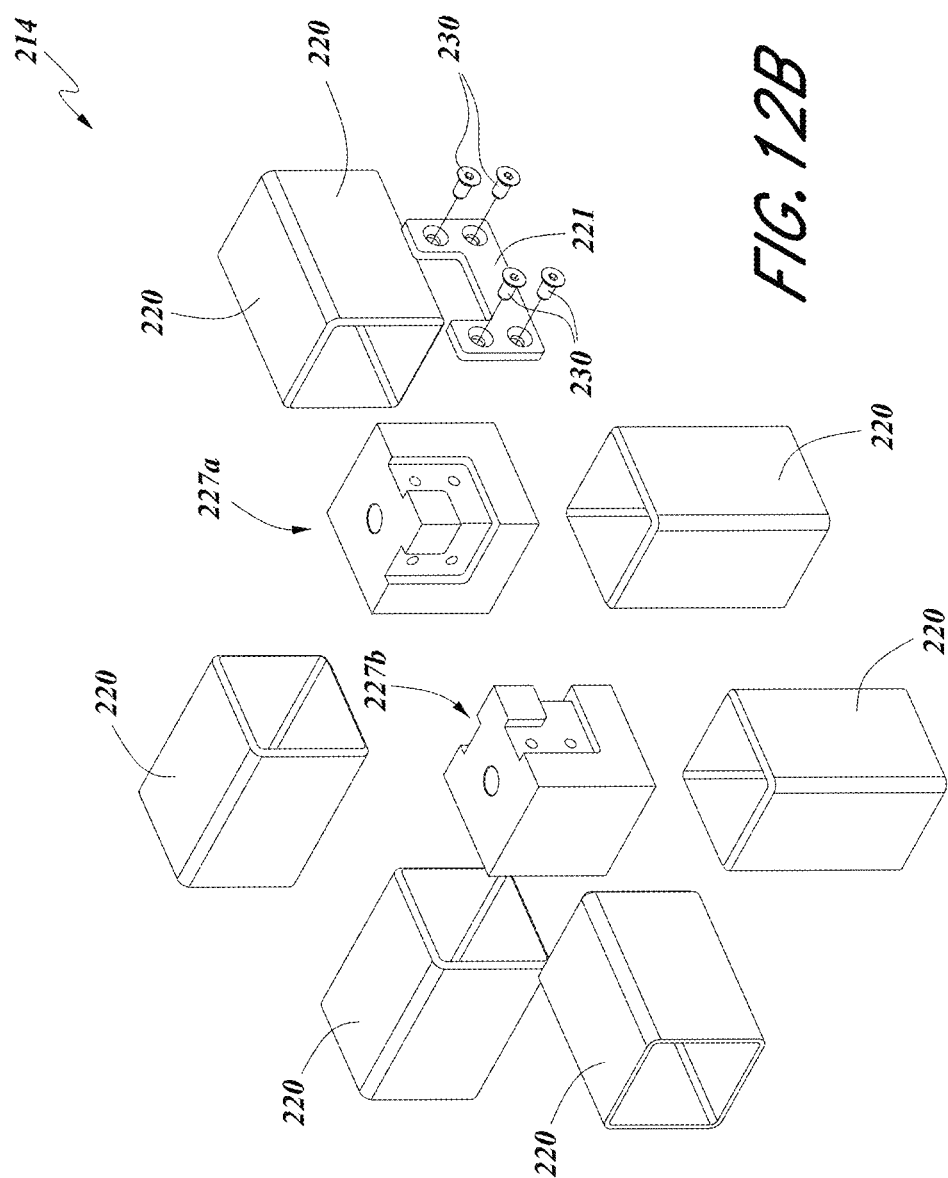
FIG. 12B illustrates an exploded view of the top corner connection assembly of FIG. 12A.

FIG. 11 illustrates a modular structure 200 comprised of four modular frames. The modular structure 200 illustrates how these four modular frames can be connected to form a two-story modular structure 200. The modular structure 200 can be assembled using the cube coupling joints described herein. FIGS. 12A and 12B illustrate a close up perspective view and a close up exploded perspective view of a connection assembly 214 wherein two top corners of two-story modular structures can be connected using the cube coupling joints and marriage straps discussed herein. For example, the cube coupling joints 227a and 227b can be placed beside each other and secured to one another using marriage strap connector 24 discussed above. Marriage strap 24 can be placed within a recess or recessed channel on each of the cube coupling joints 227a, 227b. Thereafter, fasteners can be placed through one or more through-holes in marriage strap 24 and secured to one or more holes in the cube coupling joints 227a and 227b. Thus, the cube coupling joints, and the connected modular frame and/or structures can be secured to one another. Alternatively, marriage strap 221 can be utilized. In the illustrated embodiment, marriage strap 221 can be similar to marriage strap 24 described above except its shape and orientation of through-holes. As shown by FIG. 12B, marriage strap 221 can have a three straight portions, forming a C-shape (or partial C-shape). While only four through-holes are shown, a different number of through-holes could be present on marriage strap 221. For example, a middle straight portion having a longer length than the two other straight portions could have two additional through-holes. Such two additional through-holes could align with two additional holes in the recesses of cube coupling joints 227a, 227b and could allow two additional fasteners to secure thereto.

Figure 12D:
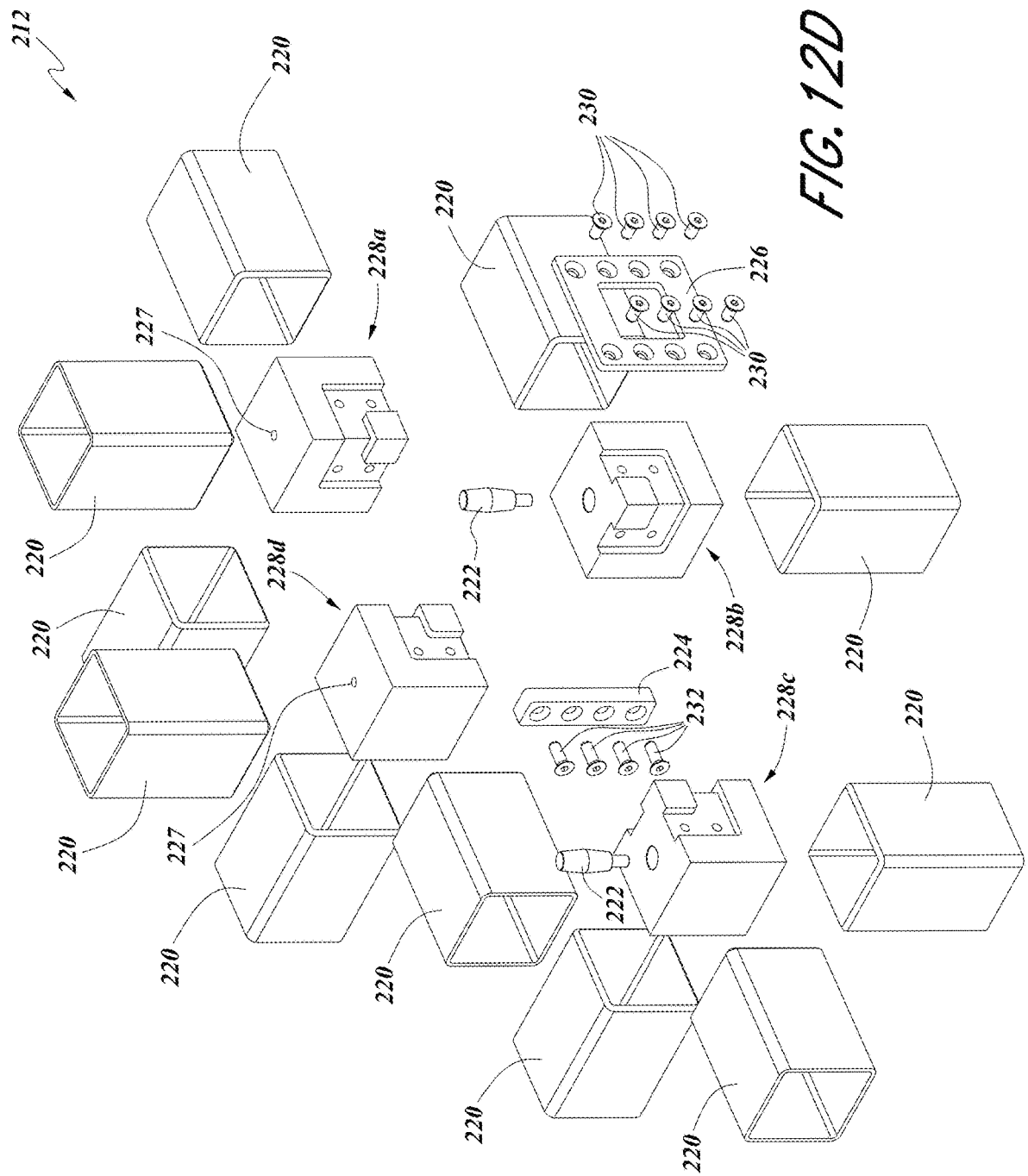
FIG. 12D illustrates an exploded view of the intermediate connection assembly of FIG. 12C.

FIGS. 12C and 12D illustrate an intermediate joint assembly 212 shown in FIG. 11. As shown by FIG. 12D, the intermediate joint assembly 212 can include four cube coupling joints 228a, 228b, 228c, 228d, one or more marriage straps 224, 226, one or more structural members 220, one or more shear pins 222, and one or more bolts 230, 232. Depending on the configuration and or number of marriage straps 224, 226, the joint assembly 212 can include one or more, two or more, three or more, four or more, five or more, six or more, seven or more, eight or more, nine or more, ten or more, eleven or more, or twelve or more bolts 230, 232. For example, as shown, the joint assembly 212 can include twelve bolts. Further, depending on the configuration, the joint assembly 212 can have one or more, two or more, three or more, four or more, five or more, six or more, or seven or more marriage straps. For example, the joint assembly 212 can have one marriage strap 224 and one marriage strap 226. The joint assembly 212 can include two shear pins 222. The one or more bolts 230, 232 can be the same in some or all respects as the bolts 130, 132 discussed and shown above and accordingly reference can be made to the aspects and modified and alternative aspects described above. The one or more shear pins 222 can be the same in some or all respects as the shear pins 22, 122 discussed and shown above and accordingly reference can be made to the aspects and modified and alternative aspects described above. The one or more structural members 220 can be the same in some or all respects as the structural members 20, 120 discussed and shown above and accordingly reference can be made to the aspects and modified and alternative aspects described above. The cube coupling joints 228a, 228b, 228c, 228d can be the same in some or all respects as other cube coupling joints discussed and shown herein and accordingly reference can be made to the aspects and modified and alternative aspects described above.

The joint assembly 212 shown in FIGS. 12C and 12D can be assembled in a variety of different ways. For example, three structural members 220 can be secured to each of cube coupling joints 228a, 228b, 228c, and 228d via welding in a factory as discussed above. After delivery of the assembled modular frames/sections to the construction site, each of the four cube coupling joints 228a, 228b, 228c, 228d can be connected to each other using the one or more shear pins 222, one or more marriage straps 224, 226, and one or more bolts 230, 232. For example, the cube coupling joint 228a and its respective connected structural members 220 can be aligned and/or secured with cube coupling joint 228b and its respective connected structural members 220 using one or more alignment holes on cube coupling joint 228a, 228b and one or more shear pins 222. The one or more alignment holes can be the same in some or all respects as the one or more alignment holes 32 discussed and shown above and accordingly reference can be made to the aspects and modified and alternative aspects described above. In the same way, cube coupling joints 228c, d and their respective connected structural members 220 can be aligned and/or secured using one or more alignment holes and one or more shear pins 222. Once cube coupling joints 228a and 228b are aligned and/or secured and cube coupling joints 228c and 228d are aligned and/or secured, each of the four cube coupling joints 228a, 228b, 228c, 228d can be secured to each other using the one or more marriage straps 224, 226 and the one or more bolts 230, 232. For example, marriage strap 224 can be used to connect two of cube coupling joints 228a, 228b, 228c, 228d.

Marriage strap 224 can have one or more through-holes, as discussed below. For example, marriage strap 224 can have four through-holes. Marriage strap 224 can have a countersunk portion around the perimeter of each of the through-holes to allow a head portion of the bolts 232 to fit therewithin and lay flush with a surface of marriage strap 224. As illustrated by FIG. 12D, marriage strap 224 can have four through-holes and four countersunk portions on a face of marriage strap 224. This configuration can allow cube coupling joints 228a and 228b to be secured to each other using marriage strap 224 and the one or more bolts 232. For example, marriage strap 224 can be placed within a recess or recessed channel of cube coupling joint 228a and also a recess or recessed channel of cube coupling joint 228b so that two of the four through-holes align with two holes on cube coupling joint 228a and so that two of the four through-holes align with two holes on cube coupling joint 228b. Further, the two through-holes that align with the two holes on cube coupling joint 228a can have countersunk portions surrounding the perimeter of the two through-holes so that head portions of bolts 232 that thread into two holes of cube coupling joint 228a can sit flush with a surface of marriage strap 224. Further, the two through-holes that align with the two holes on cube coupling joint 228b can have countersunk portions surrounding the perimeter of the two through-holes so that head portions of bolts 232 that thread into two holes of cube coupling joint 228b can sit flush with a surface of marriage strap 224.

In some embodiments, marriage strap 224 has countersunk portions surrounding one or more through-holes on two opposing surfaces of marriage strap 224. Such configuration can allow cube coupling joint 228a to be secured to cube coupling joint 228c. Such configuration can also allow cube coupling joint 228b to be secured to cube coupling joint 228d. For example, marriage strap 224 can be placed within a recess of cube coupling joint 228b and also a recess of cube coupling joint 228d so that two of the four through-holes align with two holes on cube coupling joint 228b and so that two of the four through-holes align with two holes on cube coupling joint 228d. Further, the two through-holes that align with the two holes on cube coupling joint 228b can have countersunk portions surrounding the perimeter of the two through-holes so that head portions of bolts 232 that thread into two holes of cube coupling joint 228d can sit flush with a surface of marriage strap 224. Further, the two through-holes that align with the two holes on cube coupling joint 228b can have countersunk portions surrounding the perimeter of the two through-holes so that head portions of bolts 232 that thread into two holes of cube coupling joint 228d can sit flush with a surface of marriage strap 224. Using a marriage strap 224 with countersunk portions surrounding one or more through-holes on two opposing surfaces of the marriage strap 224 can enable cube coupling joints 228a and 228c to be secured to one another in a similar fashion.

After one or more of the cube coupling joints 228a, 228b, 228c, 228d are secured using marriage strap 224, marriage strap 226 can be used to provide additional securement to the joint assembly 212 and/or one or more of the cube coupling joints 228a, 228b, 228c, 228d. Alternatively, marriage strap 226 can be used to provide securement to the joint assembly 212 and/or one or more of the cube coupling joints 228a, 228b, 228c, 228d without also utilizing marriage strap 224. Utilizing both marriage straps 224 and 226 can, however, provide significant strength to the joint assembly 212 to enable vertical and or horizontal (e.g., seismic and/or wind lateral loads) to be safely transferred. As shown and as discussed below, the marriage strap 224 can have a thicker cross section than other marriage straps discussed and shown herein. Marriage strap 224 can be sized, shaped, and/or oriented to fit within one or more recesses or recessed channels of cube coupling joints 228a, 228b, 228c, and/or 228d so that there is minimal or no space or gap between the cube coupling joints 228a, 228b, 228c, 228d when the joint assembly 212 is assembled. The thicker cross section of marriage strap 224 can provide greater strength capacity for the marriage strap 224 and enable it to transfer greater loads between one or more of the cube coupling joints 228a, 228b, 228c, 228d.

As discussed above, marriage strap 226 can also be used to secure one or more of the four cube coupling joints 228a, 228b, 228c, 228d to each other. Marriage strap 226 can be sized, shaped, and/or oriented to fit within one or more recesses or recessed channels of the cube coupling joints 228a, 228b, 228c, 228d, as shown in FIGS. 12C and 12D. For example, marriage strap 226, which has a square-shape (e.g., FIG. 12D), can be placed within one or more recesses or recessed channels of each of the four cube coupling joints 228a, 228b, 228c, 228d and one or more bolts 230 can be placed through one or more through-holes in marriage strap 226 and threaded into one or more holes positioned within one or more recesses or recessed channels of each of the four cube coupling joints 228a, 228b, 228c, 228d. Marriage strap 226 can have one or more through-holes, such as one or more, two or more, three or more, four or more, five or more, six or more, seven or more, eight or more, nine or more, ten or more, eleven or more, or twelve or more through-holes. The number of through-holes of marriage strap 226 can be the same as the number of holes in the one or more recesses or recessed channels of the cube coupling joints 228a, 228b, 228c, 228d. The one or more through-holes can align with the one or more holes in the one or more recesses or recessed channels of cube coupling joints 228a, 228b, 228c, 228d.

FIG. 13A-13C illustrate various views of the marriage strap 226. As shown, the marriage strap 226 has a shape enabling the marriage strap 226 to secure, and secure to, four cube coupling joints (see FIG. 12C). As shown, the marriage strap 226 has a square-shape, with four integral straight portions. However, the marriage strap 226 can have an alternative shape that does not have straight portions, such as an O-shape, if the marriage strap 226 is configured to fit within a correspondingly shaped recess or recessed channel of one or more cube coupling joints. The marriage strap 226 can have a first straight portion that transitions into a second straight portion which transitions into a third straight portion which transitions into a four straight portion which transitions into the first portion. Each straight portion can be perpendicular to the straight portion is transitioned from, and transitions to. For example, the first straight portion is orthogonal to the fourth straight portion and the second straight portion. However, in some embodiments, marriage strap 226 can have four straight portions with transitions that are non-orthogonal, non-straight, and/or can have a non-square shape, depending on the corresponding shape of the one or more recesses or recessed channels in the one or more cube coupling joints that marriage strap 226 fits within. Where the cube coupling joints 228a, 228b, 228c, 228d have one or more recesses or recessed channels shaped and oriented as shown in FIG. 12D, however, marriage strap 226 can be shaped with straight portions that traverse the four cube coupling joints 228a, 228b, 228c, 228d.

Marriage strap 226 can have four straight portions that form a square and that surround an open section (see FIG. 13A, 13B). The open section can be sized to accommodate portions of the cube coupling joints 228a, 228b, 228c, 228d when marriage strap 226 is placed in one or more recesses or recessed channels of the cube coupling joints 228a, 228b, 228c, 228d and/or secured to the cube coupling joints 228a, 228b, 228c, 228d. As shown in FIG. 13B, the open section can have a length 234 and a height 233 which can be sized to match one or more non-recessed portions of cube coupling joints 228a, 228b, 228c, 228d.

As discussed above, the marriage strap 226 can include one or more through-holes that can be similar in many or all respects to the one or more through-holes of other marriage straps discussed herein. For example, the one or more through-holes of marriage strap 226 can include inner diameters and countersunk rims surrounding the perimeters of the one or more through-holes which are configured to allow a portion of a fastener to fit within and create a flush surface along a plane of the marriage strap 226. The one or more through-holes of marriage strap 226 can be sized, spaced, shaped, and/or oriented to align with one or more holes in the cube coupling joints 228a, 228b, 228c, 228d. The size, spacing, shape, and/or orientation of the one or more through-holes can be selected based on the amount of cube coupling joints that are to be connected in a joint assembly configuration of a modular structure. Additionally, the size, spacing, shape, and/or orientation of the one or more through-holes can be designed so as to optimize the strength capacity of the marriage strap 226, for example bearing and/or tensile capacity. This sizing, spacing, shaping, and/or orientation can be the same in some or all respects as that discussed with regard to the one or more through-holes 41 of marriage strap 24, for example, and accordingly reference can be made to the aspects and modified and alternative aspects described above.

As shown in FIGS. 13A-13C, marriage strap 226 has a first side with a length 230, a second side with a length 232, a third side with a length 230 and a fourth side with a length 232. Marriage strap 226 can have the same width along the entirety of its length. Alternatively, marriage strap 226 can have variable width along the entirety of its length. The width of marriage strap 226 at any point along its length can be varied depending on the width of one or more recesses or recessed channels of the cube coupling joints 228a, 228b, 228c, 228d so that marriage strap 226 can fit within the one or more recesses or recessed channels.

As also shown in FIGS. 13A-13C, the marriage strap 226 can have eight through-holes. However, as discussed above, marriage strap 226 can have a different number of through-holes. The number of through-holes can be varied depending on the number of holes in one or more recesses or recessed channels of cube coupling joints 228a, 228b, 228c, 228d. For example, if it is determined that a joint assembly in a particular location in a modular structure will need to be able to transfer more vertical and/or lateral loads, marriage strap 226 can be designed with more through-holes, such as nine, ten, eleven, or twelve through-holes. This can allow more bolts 230 to be utilized in the securement of the joint assembly 212, which may provide additional load transfer capacity in the joint assembly 212, depending on the other material and/or structural properties of other components in the joint assembly 212. The one or more through-holes in marriage strap 226 can align with one or more holes in one or more recesses or recessed channels of the cube coupling joints 228a, 228b, 228c, 228d.

The size and/or spacing of the one or more through-holes in marriage strap 226 can be varied to increase the strength capacity of the bolts and/or marriage strap 226. For example, marriage strap 226 can have four through-holes spaced equally from each other along a first and/or third side (opposite to the first side) of marriage strap 226. The one or more through-holes can be spaced at distances, 236, 237, 238 from each other, for example. Spacings 236, 237, and/or 238 can be the same or different. The one or more through-holes can be spaced a distance 239 and/or 235 from exterior edges of marriage strap 226.

The marriage strap 226 can have a height/length 230 along a first side and/or third side, and a height/length of 232 on a second and/or fourth side. The dimensions 230 and 232 can be the same (e.g., for a square-shape configuration) or different. As discussed above, marriage strap 226 can have an open section. The dimensions of the open section can be a dimension 233 along a first and/or third interior edge of marriage strap 226 and can be a dimension 234 along a second and/or fourth interior edge of marriage strap 226. The one or more through-holes of marriage strap 226 can be spaced a distance from an interior edge of marriage strap 226 that surrounds the open section. For example, the one or more through-holes can be spaced a distance 242 and/or 241 from an interior edge of the marriage strap. As discussed herein, the greater the spacing between one or more through-holes, and between an through-hole and an edge or side of the marriage strap, the greater bearing capacity marriage strap 226 will generally have.

As shown in FIG. 13C, the marriage strap 226 can have a thickness 231. The thickness 231 of marriage strap 226 can be the same or different as the thicknesses of other marriage straps discussed herein. The thickness 231 of marriage strap 226 can be equal or substantially equal to the depth of the one or more recesses or recessed channels of the cube coupling joints 228a, 228b, 228c, 228d so as to facilitate a flush surface when marriage strap 226 is fit within one or more recesses or recessed channels.

FIGS. 14A-14C illustrate marriage strap 224 described above with reference to FIGS. 12C-12D. Marriage strap 224 can be the same in some or all respects as marriage strap 24 discussed and shown above and accordingly reference can be made to the aspects and modified and alternative aspects described above. Marriage strap 224 can be the same as marriage strap 24, except for having a greater thickness. For example, marriage strap 224 can have a thickness 261 that is sized to fit within recesses or recessed channels of two of cube coupling joints 228a, 228b, 228c, 228d as discussed above, so that there is little or no gap between the one or more recesses or recessed channels of the cube coupling joints 228a, 228b, 228c, 228d. In some embodiments, marriage strap 224 has a thickness double that of marriage strap 226. In some embodiments, marriage strap 224 has a thickness equal to that of marriage strap 226. Similar to other marriage straps discussed herein, marriage strap 224 can have one or more through-holes, such as one or more, two or more, three or more, four or more, five or more, six or more, seven or more, or eight or more holes. In some embodiments, marriage strap 224 has four through-holes spaced from each other at distances 265, 266, and 267. Spacings 265, 266, and/or 267 can be the same or different. One or more through-holes at longitudinal ends of marriage strap 224 can be spaced from exterior longitudinal ends of marriage strap 224 at distances 264 and 268. Spacings 264 and 268 can be the same or different from each other. The one or more through-holes can be spaced from transverse ends of marriage strap 226 a certain distance, such as distance 263. Distance 263 can be the same or different from spacings 265, 266, 267, 264, and/or 264. As discussed above, marriage strap 224 can have countersunk rim portions surrounding the one or more through-holes. As also discussed above, the countersunk rim portions can be on the same or opposite sides of marriage strap 224, depending on the desired securement of the cube coupling joints 228a, 228b, 228c, and/or 228d. In certain embodiments, the marriage strap 224 of FIG. 14A can be modified to have for example, ½ the thickness and/or double the thickness, 1, 2, 3, 4 or more holes and/or having a different length (for example, ½ the length).

Figure 16A:
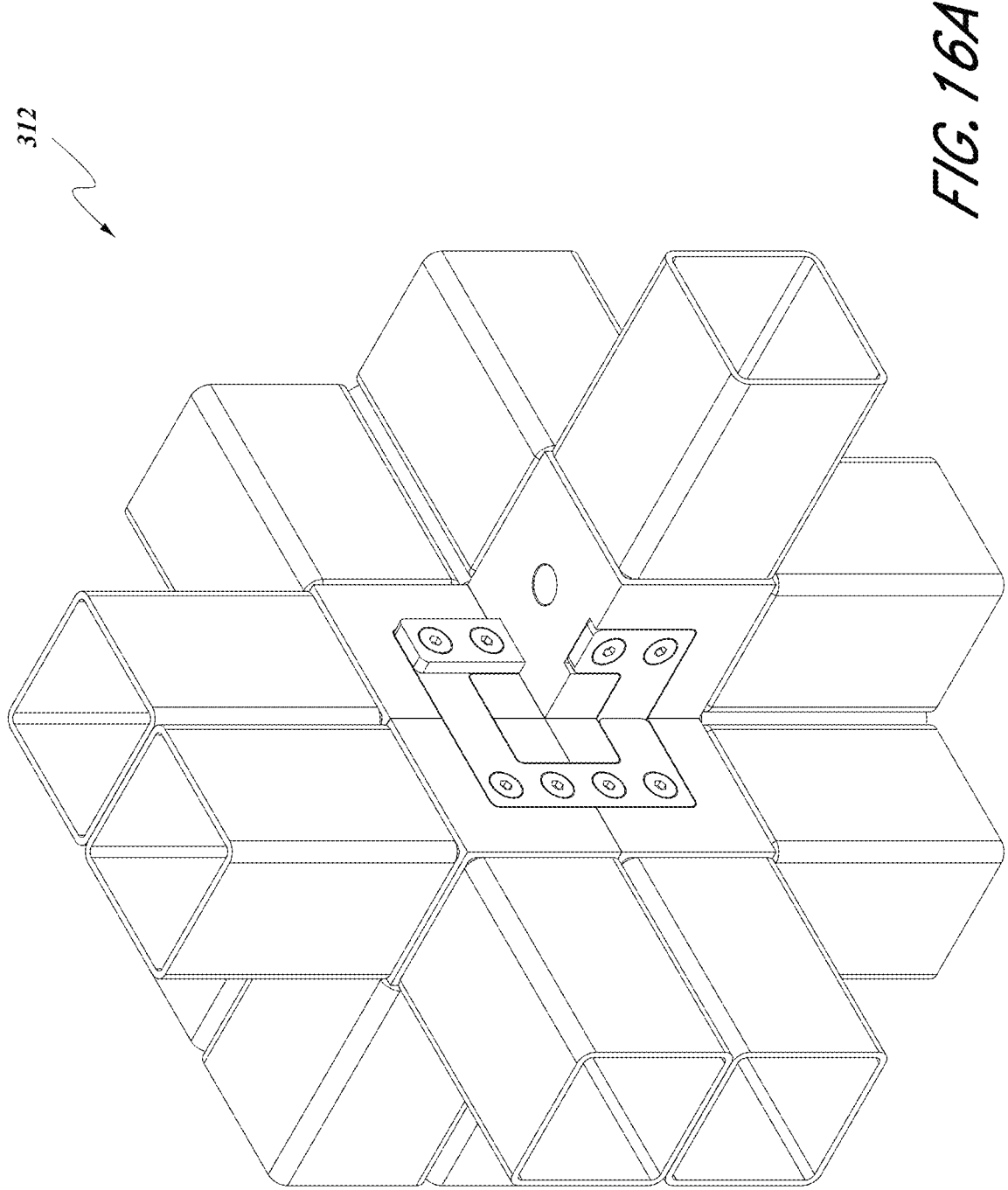
FIG. 16A illustrates a perspective view of an intermediate connection assembly shown in FIG. 15 and labeled 16A.
Figure 16B:
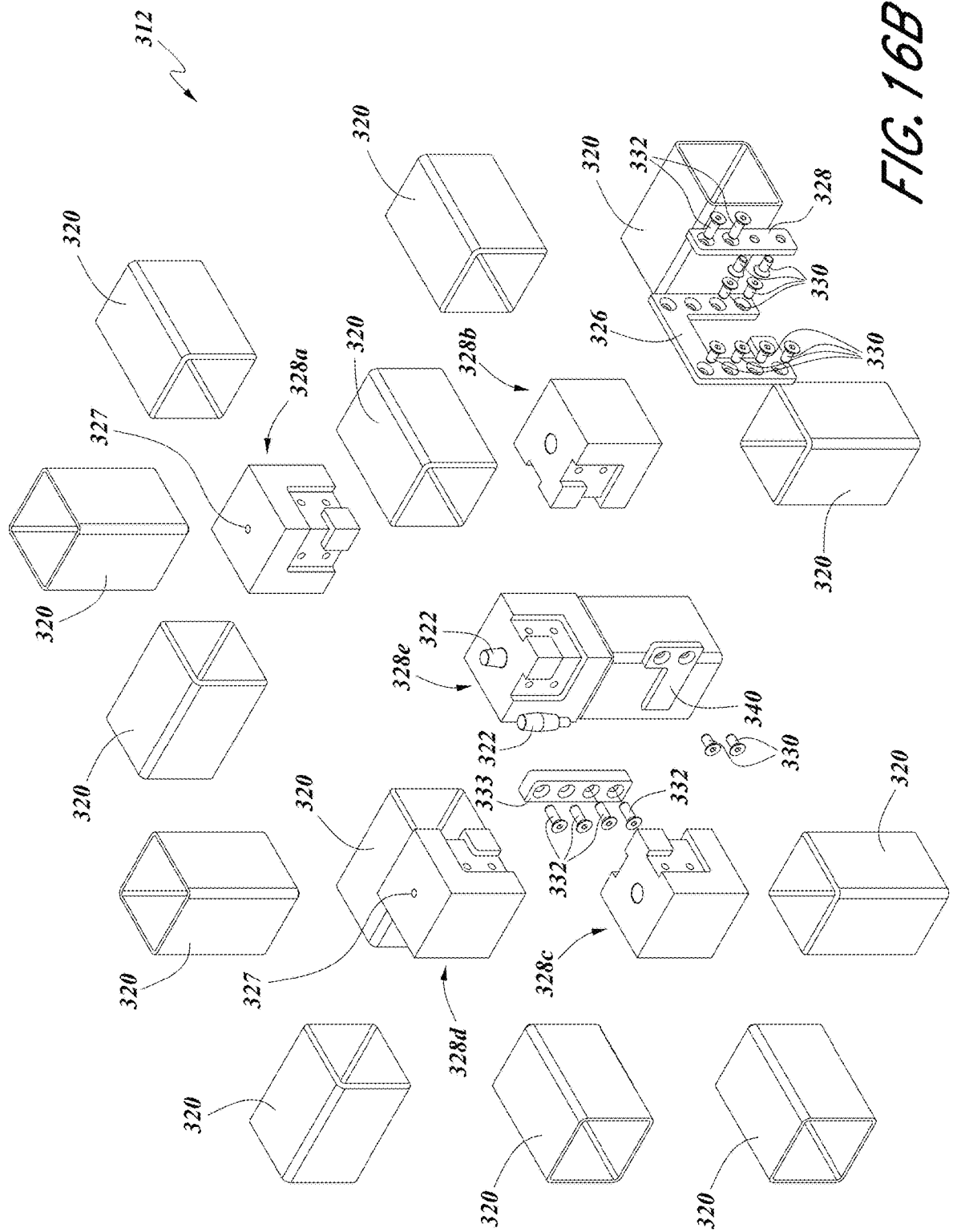
FIG. 16B illustrates an exploded view of the intermediate connection assembly of FIG. 16A.

FIG. 15 illustrates a modular structure 300 having five modular frames. FIG. 15 illustrates five modular frames connected together to form a partial two-story modular structure 300. As shown, the modular structure 300 can be assembled by connecting two, two-story modular structures with a one-story modular frame. The modular structure 300 can be assembled using the cube coupling joints described herein. FIGS. 16A and 16B illustrate a close up perspective view and a close up exploded perspective view of a joint assembly 312.

As shown by FIG. 16B, the joint assembly 312 can include five cube coupling joints 328a, 328b, 328c, 328d, 328e, one or more marriage straps 333, 340, 326, 328, one or more structural members 220, one or more shear pins 322, and one or more bolts 330, 332. Depending on the configuration and or number of marriage straps 333, 340, 326, 328, the joint assembly 312 can include one or more, two or more, three or more, four or more, five or more, six or more, seven or more, eight or more, nine or more, ten or more, eleven or more, or twelve or more bolts 332, 339. For example, as shown in FIG. 16B, the joint assembly 312 can include fourteen bolts—six of which are bolts 332 and eight of which are bolts 330. Joint assembly 312 can include one marriage strap 333, one marriage strap 340, one marriage strap 326, and one marriage strap 332. Joint assembly 312 can include two shear pins 222. The one or more bolts 330 can be the same in some or all respects as the bolts 26, 130 discussed and shown herein and accordingly reference can be made to the aspects and modified and alternative aspects described above. The one or more shear pins 222 can be the same in some or all respects as the shear pins 22, 122 discussed and shown herein and accordingly reference can be made to the aspects and modified and alternative aspects described above. The one or more structural members 320 can be the same in some or all respects as the structural members 120, 220 discussed and shown herein and accordingly reference can be made to the aspects and modified and alternative aspects described above. The cube coupling joints 328a, 328b, 328c, 328d, and 328e can be the same in some or all respects as other cube coupling joints discussed and shown herein and accordingly reference can be made to the aspects and modified and alternative aspects described above.

The joint assembly 312 shown in FIGS. 16A and 16B can be assembled in a variety of different ways. For example, three structural members 320 can be secured to each of cube coupling joints 328a, 328b, 328c, 328d, and 328e via welding in a factory. After delivery of the assembled modular frames/sections to the construction site, each of the four cube coupling joints 328a, 328b, 328c, 328d, 328e can be connected to one or more of each other using one or more shear pins 322, marriage straps 333, 340, 326, and/or 328, and one or more bolts 330, 332. For example, cube coupling joint 328a and its respective connected structural members 320 can be aligned and/or secured with cube coupling joint 328e and its respective connected structural members 320 using one or more alignment holes on cube coupling joints 328a, 328e and one or more shear pins 322. The one or more alignment holes can be the same in some or all respects as the one or more alignment holes 32 (see FIG. 3B) and accordingly reference can be made to the aspects and modified and alternative aspects described above. In the same way, cube coupling joints 328c, 328d and their respective connected structural members 320 can be aligned and/or secured using one or more alignment holes and one or more shear pins 322. Once cube coupling joints 328a, 328e are aligned and/or secured and cube coupling joints 328c, 328d are aligned and/or secured, any two of the four cube coupling joints 328a, 328e, 328c, 328d can be secured to each other using marriage strap 333. Marriage strap 333 can be the same in all respects as marriage strap 224 discussed above. Further, marriage strap 333 can be used to connect two of the four cube coupling joints 328a, 328e, 328c, 328d in the same manner as the manner in which marriage strap 224 can be used to connect any two of cube coupling joints 228a, 228b, 228c, 228d.

Marriage strap 333 can cooperate with marriage strap 340 to allow for alignment and/or securement of cube coupling joint 328b. Marriage strap 340 has an L-shape, as shown in FIG. 16B for example. This shape enables marriage strap 340 to secure to cube coupling joint 328b while also securing to marriage strap 333. For example, prior to securing marriage strap 333 to two of the four cube coupling joints 328a, 328e, 328c, 328d as discussed above, marriage strap 340 can be secured to marriage strap 333, for example, by welding a tip, edge, or end of marriage strap 340 to a surface of marriage strap 333, such as a surface of marriage strap 333 that does not have one or more through-holes. This welding can occur in a factory prior to delivery to a construction site, or alternatively, could occur on site. One of skill in the art will also recognize that marriage straps 333 and 340 could be integral. For example, marriage straps 333, 340 could include a thicker portion with four through-holes (as shown by marriage strap 333 in FIG. 16B) and could also have an L-shaped portion (as shown by marriage strap 340 in FIG. 16B). In some embodiments, marriage strap 340 and 330 are integral and form a T-shape, which enables connection and/or securement of cube coupling joint 328b and one or more of cube coupling joints 328a, 328c, 328d, and/or 328e. Whether marriage straps 333, 340 are integral or non-integral, they can be used to secure, and secure to, the five cube coupling joints 328a, 328e, 328c, 328d, 328b. Once marriage straps 333, 340 are welded together (or delivered to the construction site as an integral unit), marriage strap 333 can be placed within one or more recesses or recessed channels of cube coupling joints 328a, 328e, 328c, 328d and can be secured to two of the four cube coupling joints 328a, 328e, 328c, 328d, and a portion of marriage strap 340 can be placed within one or more recesses or recessed channels of cube coupling joints 328c and/or 328e.

After one or more of the cube coupling joints 328a, 328e, 328c, 328d are secured using marriage strap 333 (which can be integral with or separate from 340), marriage straps 340, 326, and/or 328 can be used to provide additional securement to the joint assembly 312 and/or one or more of the cube coupling joints 328a, 328e, 328c, 328d, 328b. Alternatively, marriage straps 326, and/or 328 can be used to provide securement to the joint assembly 312 and/or one or more of the cube coupling joints 328a, 328e, 328c, 328d, 328b without also utilizing marriage straps 333 and/or 340. However, utilizing marriage straps 333, 340 along with any or all of marriage strap 326 and/or 328 can provide significant strength to the joint assembly 312 to enable vertical and or horizontal (e.g., seismic and/or wind lateral loads) to be safely transferred.

As shown and as discussed above with reference to marriage strap 224, marriage strap 333 can have a thickness greater than marriage strap 24 and can be sized, shaped, and/or oriented to fit within one or more recesses or recessed channels of cube coupling joints 328a, 328e, 328c, and/or 328d so that there is minimal or no space or gap between the cube coupling joints 328a, 328e, 328c, 328d when the joint assembly 312 is assembled. The thicker cross section of marriage strap 333 can provide greater strength capacity for the marriage strap 333 and enable it to transfer greater loads between one or more of the cube coupling joints 328a, 328e, 328c, 328d.

As discussed above, marriage strap 326 can also be used to secure one or more of the four cube coupling joints 328a, 328e, 328c, 328d to each other. Marriage strap 326 can be sized, shaped, and/or oriented to fit within one or more recesses or recessed channels of the cube coupling joints 328a, 328e, 328c, 328d, as shown in FIGS. 16A and 16B. For example, marriage strap 326 can be placed within one or more recesses or recessed channels of each of the four cube coupling joints 328a, 328e, 328c, 328d and one or more bolts 330 can be placed through one or more through-holes in marriage strap 326 and threaded into one or more holes positioned within one or more recesses or recessed channels of each of the four cube coupling joints 328a, 328e, 328c, 328d. Marriage strap 326 can have one or more through-holes, such as one or more, two or more, three or more, four or more, five or more, six or more, seven or more, eight or more, nine or more, ten or more, eleven or more, or twelve or more through-holes. The number of through-holes of marriage strap 326 can be the same as the number of holes in the one or more recesses or recessed channels of the cube coupling joints 328a, 328e, 328c, 328d. The one or more through-holes can align with the one or more holes in the one or more recesses or recessed channels of cube coupling joints 328a, 328e, 328c, 328d. As shown and discussed below, marriage strap 326 can have a terminating end which provides a gap permitting marriage strap 326 to be placed over and/or around marriage strap 340. This gap allows marriage strap 340 to protrude or extend through a plane of marriage strap 326 so as to fit within one or more recessed or recessed channels of cube coupling joint 328b and secure thereto. As discussed below, marriage strap 340 can have two through-holes that align with two holes in a recess of cube coupling joint 328b which can allow bolts 330 to pass therethrough and thread into the two holes.

Marriage strap 328 can also be used to secure one or more of the cube coupling joints 328a, 328e, 328c, 328d, 328b together. For example, marriage strap 328 can be used to secure cube coupling joint 328a to cube coupling joint 328b. Marriage strap 328 can be the same in some or all respects as marriage strap 24 and accordingly reference can be made to the aspects and modified and alternative aspects described above. Marriage strap 328 can be identical to marriage strap 24 in every respect except with respect to the one or more countersunk rim portions surrounding one or more through-holes on marriage strap 328. For example, marriage strap 328 can have four through-holes—two top through-holes and two bottom through-holes. The two top through-holes can have countersunk regions surrounding the two top through-holes on a first face of the marriage strap 328 and can have countersunk regions surrounding the two bottom through-holes on a second face of the marriage strap 328 which is opposite the first face (see FIG. 16B). This configuration of countersunk regions surrounding the two top and two bottom through-holes can allow one or more bolts 332, 330 to pass through the through-holes and thread into one or more holes in the cube coupling joints 328a, 328b. For example, two bolts 330 can be placed through the two bottom holes in marriage strap 328 and can thread into two holes in one or more recesses or recessed channels of the cube coupling joint 328b. Thereafter, two bolts 332 can be placed through the two top through-holes in marriage strap 328, placed through two top through-holes in marriage strap 326, and can be threaded into two holes in one or more recesses or recessed channels of cube coupling joint 328a. This securement of cube coupling joint 328a to cube coupling joint 328b using marriage strap 328 along with marriage strap 326 can advantageously allow cube coupling joints 328a and 328b to secure to one another while cube coupling joint 328a is also secured to cube coupling joints 328e, 328c, and/or 328d using marriage strap 326 and/or 330. Thus, marriage strap 328 can allow two-two story modular frames to connect to a top corner of a one-story modular frame.

FIGS. 17A-17C illustrate another embodiment of a marriage strap. As shown, marriage strap 326 has a shape enabling it to secure, and secure to, four cube coupling joints 328a, 328e, 328c, and 328d (see FIGS. 16A, 16B). In some embodiments, marriage strap 326 has a G-shape, however, alternative shapes are possible depending on whether marriage strap 326 is configured to fit within one or more recesses or recessed channels of one or more cube coupling joints and the size, shape, and/or orientation of the respective recessed or recessed channels. Marriage strap 326 includes four straight portions. Marriage strap 326 is similar to marriage strap 226, except that the four straight portions do not all connect to form a continuous shape. Marriage strap 326 includes a first straight portion (beginning at a bottom right corner location of marriage strap 326 as viewed in FIG. 17B) which transitions to a second straight portion which transitions to a third straight portion which transitions to a fourth straight portion which then terminates without connecting back to the first straight portion.

Marriage strap 326 can include one or more through-holes, that can be similar in some or all respects to the one or more through-holes of the marriage straps 24 for example, and accordingly reference can be made to the aspects and modified and alternative aspects described above. For example, the one or more through-holes of the marriage strap 326 can include inner diameters and countersunk rims surrounding the perimeters of the one or more through-holes which are configured to allow a portion of a bolt to fit within and create a flush surface along a plane of marriage strap 326. The one or more through-holes of marriage strap 326 can be sized, spaced, shaped, and/or oriented to align with one or more holes in the cube coupling joints 328a, 328e, 328c, 328d. The size, spacing, shape, and/or orientation of the one or more through-holes can be selected based on the amount holes in the cube coupling joints 328a, 328e, 328c, 328d and the size, spacing, shape, and/or orientation of such holes. Additionally, the size, spacing, shape, and/or orientation of the one or more through-holes can be designed so as to optimize the strength capacity of marriage strap 326, for example bearing and/or tensile capacity. This sizing, spacing, shaping, and/or orientation can be the same in many or all respects as that discussed with regard to the one or more through-holes 41 of marriage strap 24, for example.

Marriage strap 326 has a first side with a length 350, a second side with a length 352, and a third side with a length 350. Marriage strap 326 has a fourth side which spans a length 352, however, as discussed above, marriage strap 326 is not continuous along the fourth side. The fourth side has a first leg having a length 354 and a second leg having a length 353. The length 353 is also a width of marriage strap 326 along the first straight portion. The first leg of marriage strap 326 can have a width 364 and a length 354, as discussed above. The second side of marriage strap 326 has a width 356 and a length 352. The third side of marriage strap 326 has a width 355 and a length 350.

The widths 353, 356, 355, and/or 364 of marriage strap 326 can be equal or unequal. The widths 353, 356, 355, and/or 364 of the marriage strap 326 can sized to fit within the one or more recesses or recessed channels of the cube coupling joints 328a, 328e, 328c, 328d. In some embodiments, the cube coupling joints 328a, 328e, 328c, 328d have one L-shaped recess on each of two faces having equal widths. In such embodiments, the widths 353, 356, 355, and 364 of marriage strap 326 are equal.

Marriage strap 326 can have one or more through-holes that correspond to one or more holes in cube coupling joints 328a, 328e, 328c, 328d, as discussed above. For example, as shown in FIGS. 17A-17B, marriage strap 326 can have eight through-holes, four of which are positioned along a first side with length 350 and four of which are positioned on a third side opposite to the first side with a length 350. As also shown in FIGS. 17A-17B, two of the eight through-holes located at a top region of the third side of marriage strap 326 can secure to cube coupling joint 328d using bolts 330, two of the eight through-holes located at a bottom region of the third side of marriage strap 326 can secure to cube coupling joint 328c using bolts 330, two of the eight through-holes located at a top region of the first side of marriage strap 326 can secure to cube coupling joint 328a using bolts 332 as discussed above (e.g., via cooperation with marriage strap 328), and two of the eight through-holes located at a bottom region of the first side of marriage strap 326 can secure to cube coupling joint 328e using bolts 330.

The one or more through-holes of marriage strap 326 can be sized, spaced, and/or oriented to align with one or more holes in the cube coupling joints 328a, 328e, 328c, 328d and/or to provide sufficient strength capacity of the system (for example, bearing strength of the marriage strap 326). For example, through-holes along the first side of the marriage strap 326 can be spaced a distance 358, 359, 360 from each other. Spacings 358, 359, and/or 360 can be equal or unequal. The one or more through-holes can be spaced a distance 362 from a first side exterior edge, a distance 361 from a fourth side exterior edge, a distance 357 from a second side exterior edge, and/or a distance 365 from a third side exterior edge of the marriage strap 326. Distances 362, 361, 357, and/or 365 can be equal or unequal. The one or more through-holes can be spaced distance 363, 362 from interior edges of the marriage strap 326, and distances 363 and 362 can be equal or unequal.

As shown in FIG. 17C, marriage strap 326 can have a thickness 351. The thickness 351 of marriage strap 326 can be the same or different as the thicknesses of other marriage straps discussed herein. The thickness of marriage strap 326 can be equal or substantially equal to the depth of the one or more recesses or recessed channels of the cube coupling joints 328a, 328b, 328c, 328d, 328e so as to facilitate a flush surface when the marriage strap 326 is fit within one or more recesses or recessed channels.

Figure 18A:
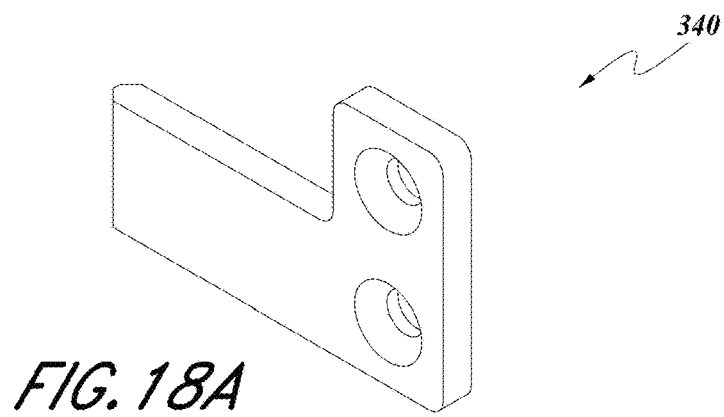
FIG. 18A illustrates a perspective view of an embodiment of a marriage strap in accordance with aspects of this disclosure.
Figure 18B:
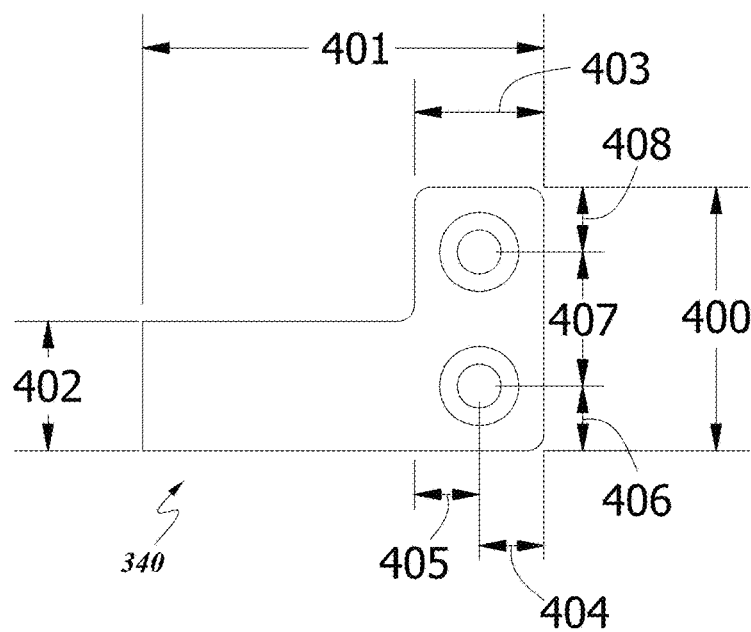
FIG. 18B illustrates a front view of the marriage strap of FIG. 18A.

FIGS. 18A-18E illustrate another embodiment of a marriage strap. As discussed above, marriage strap 340 has an L-shape which enables it to secure to a portion of marriage strap 333, fit within one or more recesses or recessed channels of cube coupling joints 328c and/or 328e, and secure to cube coupling joint 328b. Marriage strap 340 can have one or more through-holes configured to align with one or more holes in one or more recesses or recessed channels of cube coupling joint 328b, such as one or more two or more three or more, four or more, five or more, six or more, seven or more, or eight or more through-holes. As shown in FIG. 18B, marriage strap 340 has a short leg with a length 400 and a long leg with a length 401. The length 401 of the long leg enables the long leg to span between cube coupling joint 328b and cube coupling joint 328c and/or 328e, and allows marriage strap 340 to fit within one or more recesses or recessed channels of cube coupling joint 328c and/or 328e, as discussed above. The short leg of marriage strap 340 has a width 403, and the long leg of marriage strap 340 has a width 402. Widths 403, 402 can be sized to fit within one or more recesses or recessed channels of cube coupling joints 328b, 328c, and/or 328e so that there is no gap. Marriage strap 340 can have two through-holes, as illustrated in FIG. 18B, for example. The through-holes can be spaced a distance 407 from each other. The through-holes can be spaced 404, 406, 408, 405 from exterior edges of the marriage strap 340.

Figure 18C:
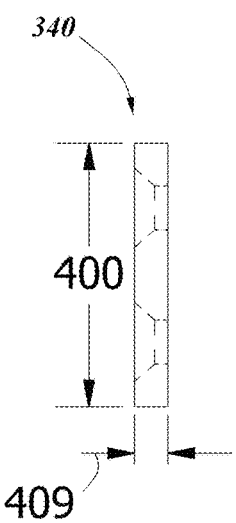
FIG. 18C illustrates a side view of the marriage strap of FIG. 18A.

As shown in FIG. 18C, marriage strap 340 can have a thickness 409. The thickness 409 can be the same or different as the thicknesses of other marriage straps discussed herein. The thickness 409 can be equal or substantially equal to the depth of the one or more recesses or recessed channels of the cube coupling joints 328b, 328c, and/or 328e so as to facilitate a flush surface when the marriage strap 340 is fit within one or more recesses or recessed channels. Marriage strap 340 can have a uniform thickness throughout. Alternatively, marriage strap 340 can have a non-uniform thickness. For example, as discussed above, a portion of the long leg of marriage strap 340 can fit within one or more recesses or recessed channels of cube coupling joints 328e, and/or 328c when a tip, edge, or end of marriage strap 340 is connected to marriage strap 333. This portion can have a thickness that is equal or substantially equal to the depths of both of the two recesses or recessed channels in cube coupling joints 328c, 328e that the portion fits within.

Figure 18D:
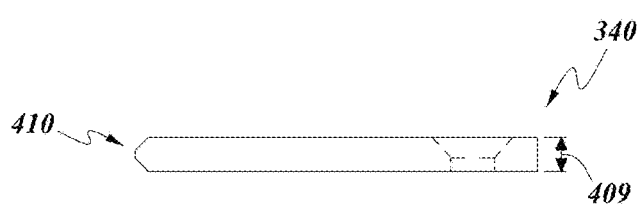
FIG. 18D illustrates a top view of the marriage strap of FIG. 18A having a chamfered edge.
Figure 18E:
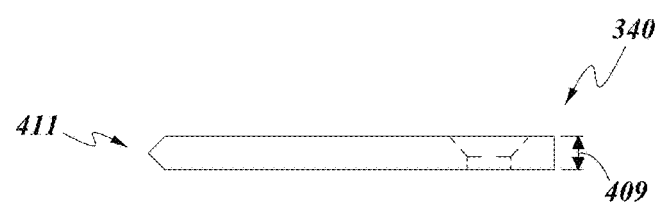
FIG. 18E illustrates a top view of the marriage strap of FIG. 18A having a beveled edge.

FIGS. 18D and 18E illustrate two embodiments of marriage strap 340 having different tips. As discussed above, an end of marriage strap 340 can be welded to a surface of marriage strap 333. To facilitate weld material, the tip of an end of the long leg of marriage strap 340 can be beveled or chamfered (partially beveled). FIG. 18D shows a chamfered tip 410 of marriage strap 340, wherein the tip 410 has two chamfered portions. Alternatively, the tip 410 could have a single chamfered portion. As discussed above with reference structural members, a chamfered tip can allow a partial joint penetration (PJP) weld to be formed within the chamfered portion, while also maintaining a flush surface. PJP welds are generally stronger than some other welds, such as a fillet weld. FIG. 18E shows a beveled tip 411 of the long leg of marriage strap 340. While FIG. 18E shows tip 411 having two beveled surfaces (e.g., forming a V-shape), tip 411 can alternatively have one full beveled surface spanning from a top edge of marriage strap 340 to a bottom edge. Utilizing a beveled tip 411 can allow a complete joint penetration (CJP) weld to be formed within the beveled portion, while also maintaining a flush surface. CJP welds are generally stronger than both PJP and fillet welds. Alternatively, the tip of marriage strap 340 can be connected to a surface of marriage strap 333 using a fillet weld. For example, where marriage strap 333 has a thickness greater than marriage strap 340 and marriage strap 340 fits within the recess of only one of cube coupling joints 328c or 328e, the fillet weld can sit between the differential thicknesses of both marriage straps 333, 340.

Figure 21A:
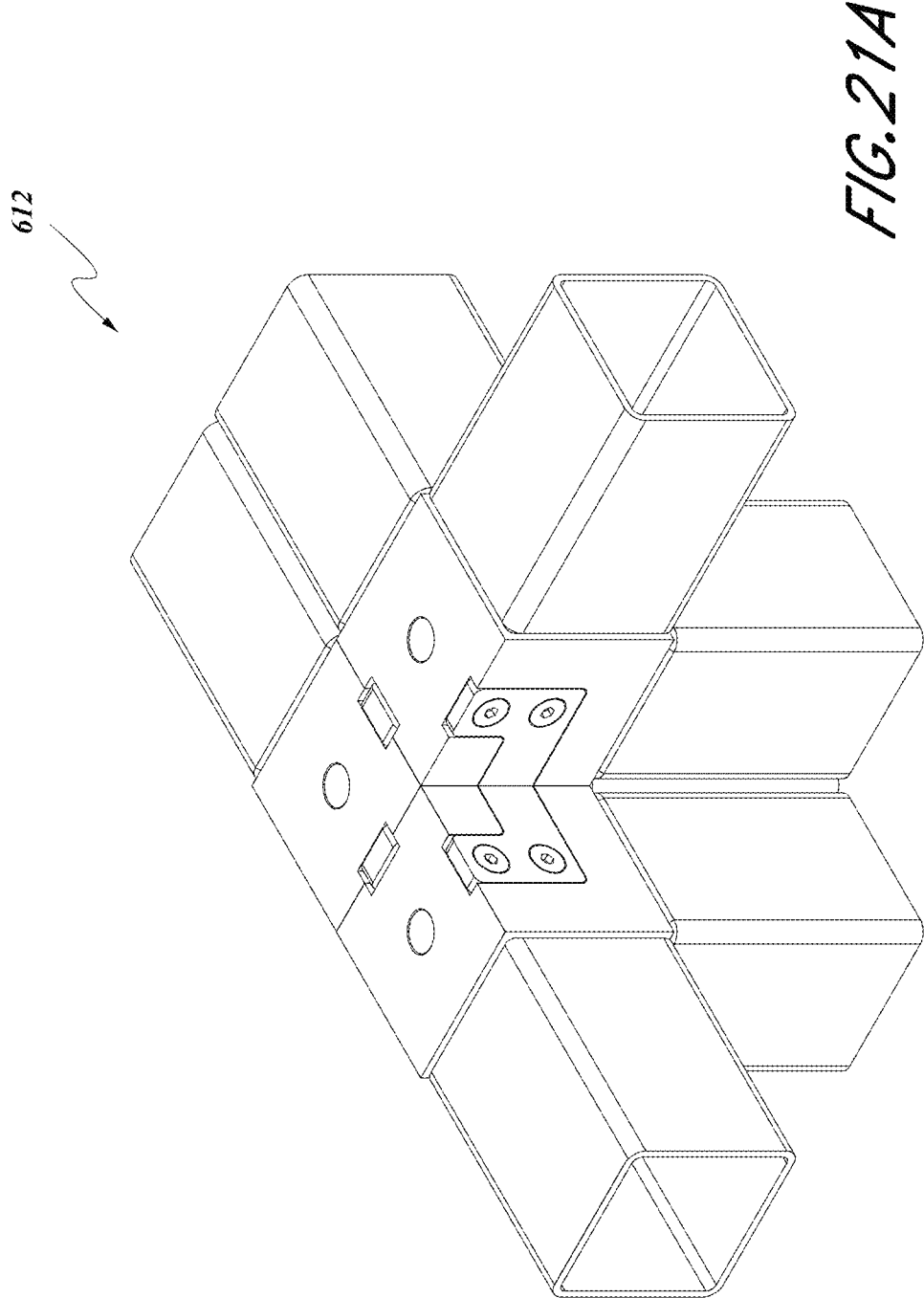
FIG. 21A illustrates a perspective view of a corner connection assembly shown in FIG. 20 and labeled 21A.
Figure 21B:
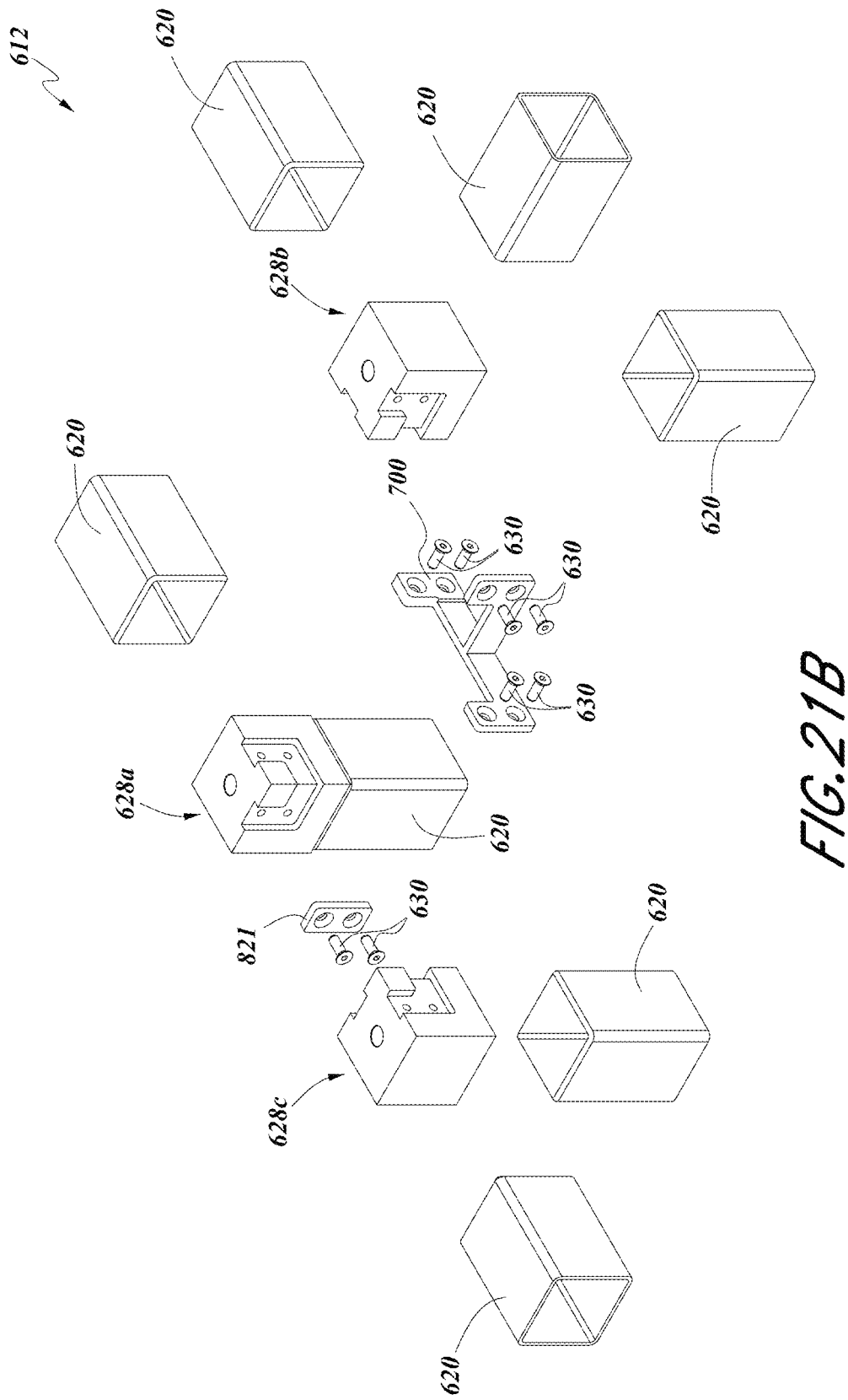
FIG. 21B illustrates an exploded view of the corner connection assembly of FIG. 21A.

FIG. 20 illustrates another example of a modular structure 600. FIG. 20 illustrates three, single-story modular frames connected together to form modular structure 600. The modular structure 600 can be assembled using the cube coupling joints described herein. FIGS. 21A and 21B illustrate a close up perspective view and a close up exploded perspective view of a joint assembly 612, respectively. Joint assembly 612 illustrates how corners of the three modular frames can secure to one another.

As shown by FIG. 21B, joint assembly 612 can include three cube coupling joints 628a, 628b, 628c, one or more marriage straps 700, 821, one or more structural members 620, and one or more bolts 630. Depending on the configuration and or number of marriage straps 700, 821, the joint assembly 612 can include one or more, two or more, three or more, four or more, five or more, six or more, seven or more, eight or more, nine or more, ten or more, eleven or more, or twelve or more bolts 630. In some embodiments, joint assembly 612 includes one marriage strap 821 and one marriage strap 700, each of which are discussed in more detail below. The one or more bolts 630 can be the same in some or all respects as the bolts 26, 130, 330 discussed and shown herein and accordingly reference can be made to the aspects and modified and alternative aspects described above. The one or more structural members 620 can be the same in some or all respects as the structural members 120, 220, 320 discussed and shown herein and accordingly reference can be made to the aspects and modified and alternative aspects described above. The cube coupling joints 628a, 628b, 628c, can be the same in some or all respects as other cube coupling joints discussed and shown herein and accordingly reference can be made to the aspects and modified and alternative aspects described above.

Joint assembly 612 shown in FIGS. 21A and 21B can be assembled in a variety of different ways. For example, three structural members 620 can be secured to each of cube coupling joints 628a, 628b, 628c, via welding in a factory. After delivery of the assembled modular frames/sections to a construction site, each of the three cube coupling joints 628a, 628b, 628c, can be connected to one or more of each other using one or more marriage straps (such as marriage straps 700, 821) and one or more bolts 630. For example, cube coupling joint 628a (and structural members 620 connected thereto) can be secured to cube coupling joint 628c and/or 628b (and structural members 620 connected thereto) using marriage strap 700. Cube coupling joint 628a can represent a "left" configuration or layout and cube coupling joint 628b can represent a "right" configuration or layout when cube coupling joints 628a, 628b are secured as shown in FIG. 21B.

Marriage strap 821 as shown in FIG. 21B can be the same as marriage strap 24 as discussed and shown above with reference to FIGS. 4A-4C except with respect to the height and thickness, as discussed further below. As discussed further below, marriage strap 821 can have a height that is equal to a length of a portion of the cube coupling joints 628a, 628c. For example, where cube coupling joints 628a, 628c are identical to cube coupling joint 28a as shown in FIG. 3C, the height 871 of marriage strap 821 can be equal to distance D4 plus distance D5, which represents a length of a portion of the recessed channel 34. Additionally, marriage strap 821 can have a thickness that is equal or substantially equal to a combined depth of recessed channels of cube coupling joints 628c, 628a that it fits within and/or secures to. As discussed further below, marriage strap 821 can have one or more through-holes that can align with threaded holes within the recessed channels of cube coupling joints 628a, 628c. Marriage strap 821 can be secured with bolts 630 to either of cube coupling joints 628a, 628c. When cube coupling joints 628a, 628c are secured in the joint assembly 612, marriage strap 821 can be sized and shaped to fit within and/or fill the gap between one or more recessed channels in cube coupling joints 628a, 628c (see, for example, FIG. 21A). In such configuration, marriage strap 821 can advantageously act to counteract shear forces and/or movement of surfaces of the cube coupling joints 628a, 628c with respect to one another.

Marriage strap 700 can advantageously be used to secure cube coupling joints 628a, 628b, and 628c together. Marriage strap 700 is shaped so that a first portion of strap 700 fits within and secures to a recessed channel in cube coupling joint 628c, a second portion of strap 700 fits within and secures to a recessed channel in cube coupling joint 628b, a third portion of strap 700 fits within and secures to a recessed channel in cube coupling joint 628a; and a fourth portion 700d to a recessed channel in cube coupling joint 628a. Although not illustrated, the cube coupling joint 628a can include an additional hole within the recessed channel that corresponds with the hole in the fourth portion 700d. In addition, the fourth portion 700d is not illustrated in FIGS. 21B and 22C but could be added to these illustrations and, in certain embodiments, the strap 700 could be formed without the fourth portion 700d. For example, with reference to FIGS. 21B and 22A, a first end 700a of strap 700 can fit within and secure to a recessed channel in cube coupling joint 628c, a second end of 700b of strap 700 can fit within and secure to a recessed channel in cube coupling joint 628b, and a third portion 700c of strap 700 can fit within and secure to a recessed channel in cube coupling joint 628a. As discussed below, the third portion 700c can have a thickness 715 that is equal or substantially equal to a combined depth of recessed channels in cube 628 and 628b such that the third portion 700c (also referred to herein as "end") first within both recessed channels. While marriage strap 700 is illustrated as having two through-holes at the first end, 700a, two through-holes at the second end 700b, and two through-holes at the third end 700c and one through holes at the fourth end 700d, marriage strap 700 could have more or less through-holes along different portions thereof in order to secure to one or more holes in the cube coupling joints 628a, 628b, 628c. For example, additional through-holes to those shown in FIG. 22A could be included along the marriage strap 700 between the first end 700a and the third end 700c and/or between a region where the second end 700b intersects the first and/or second ends 700a, 700c and the respective ends 700a, 700c. As discussed below, in some embodiments, the second end 700b extends from the first and/or third ends 700a, 700c and/or extends from a region between the first and/or third ends 700a, 700c at an angle (such as a generally 90 degree angle). In some cases, the angle at which the second end 700b extends from other portions of the marriage strap 700 allows the second end 700b to secure to cube coupling joint 628b while the first end 700a is secured to cube coupling joint 628c and/or when the third end 700c is secured to cube coupling joint 628a. In some cases, the first end and/or third ends 700a, 700c are generally perpendicular to the second end 700b at a location where they join or intersect.

Figure 22A:
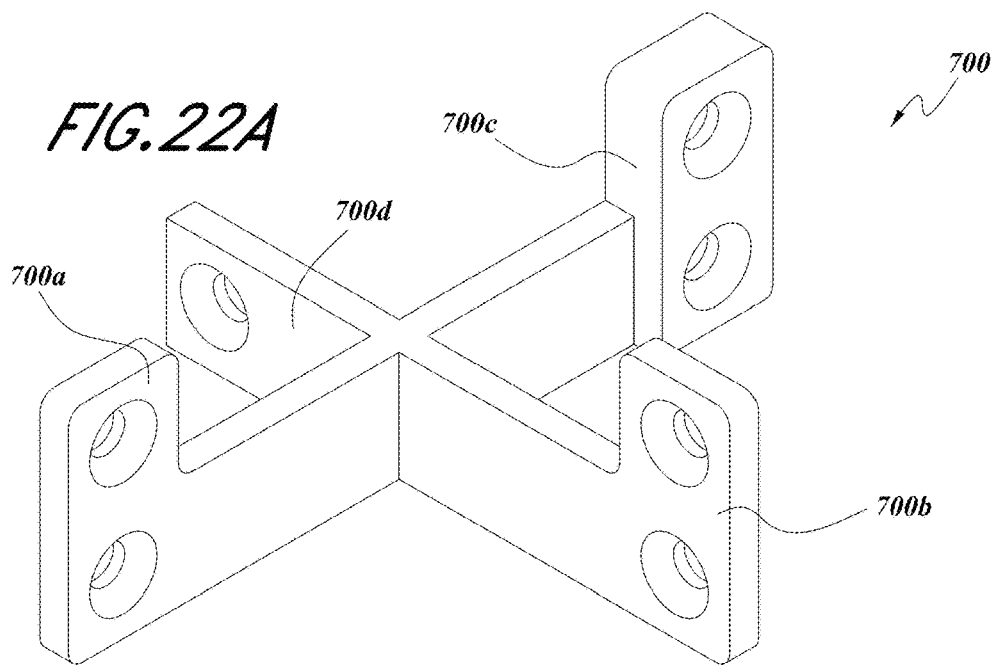
FIG. 22A illustrates a perspective view of an embodiment of a marriage strap in accordance with aspects of this disclosure.

As shown in FIGS. 21B and 22A, the third end 700c of marriage strap 700 can have a thickness 715 that is greater than a thickness 714 of the first and/or second ends 700a, 700b. In some cases, thickness 715 is two times the thickness 714 of the first and/or second ends 700a, 700b. In some cases, the third end 700c has a thickness 715 that is equal or substantially equal to a combined depth of recessed channels in cube coupling joints 628a, 628b that the third end 700c fits within and/or secures to. The third end 700c can have one or more through-holes that can align with threaded holes within the recessed channels of cube coupling joints 628a, 628b. The third end 700c can be secured with bolts 630 to either of cube coupling joints 628a, 628b. When cube coupling joints 628a, 628b are secured in the joint assembly 612, the third end 700c of marriage strap 700 can be sized and shaped to fit within and/or fill the gap between one or more recessed channels in cube coupling joints 628a, 628b (see, for example, FIG. 21A). In such configuration, the third end 700c of marriage strap 821 can advantageously act to counteract shear forces and/or movement of surfaces of the cube coupling joints 628a, 628b with respect to one another.

Figure 24A:
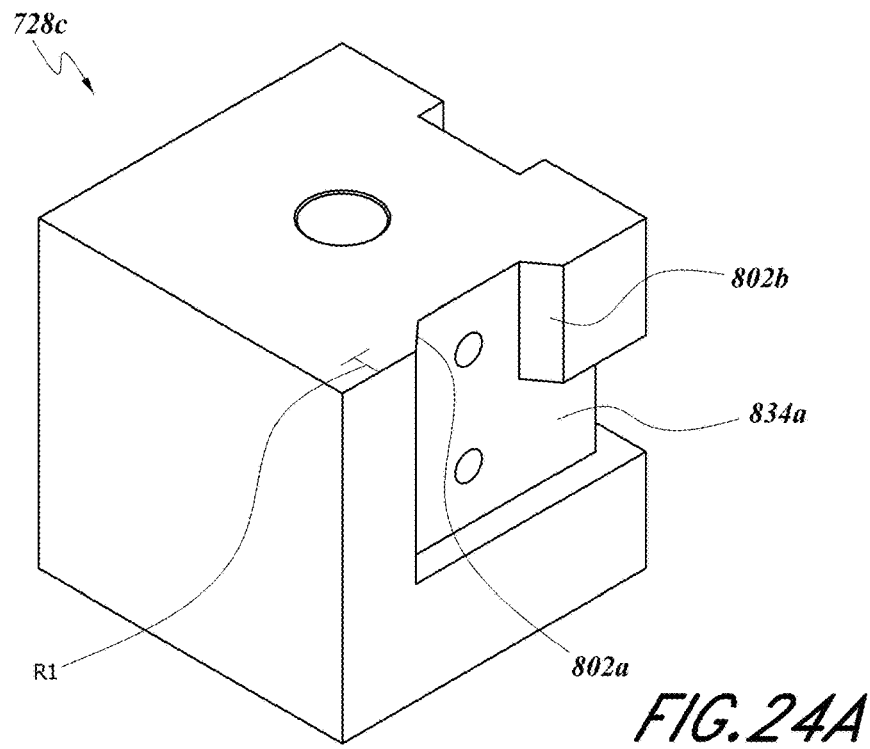
FIG. 24A illustrates a perspective view of an embodiment of a cube coupling joint in accordance with aspects of this disclosure.
Figure 24B:
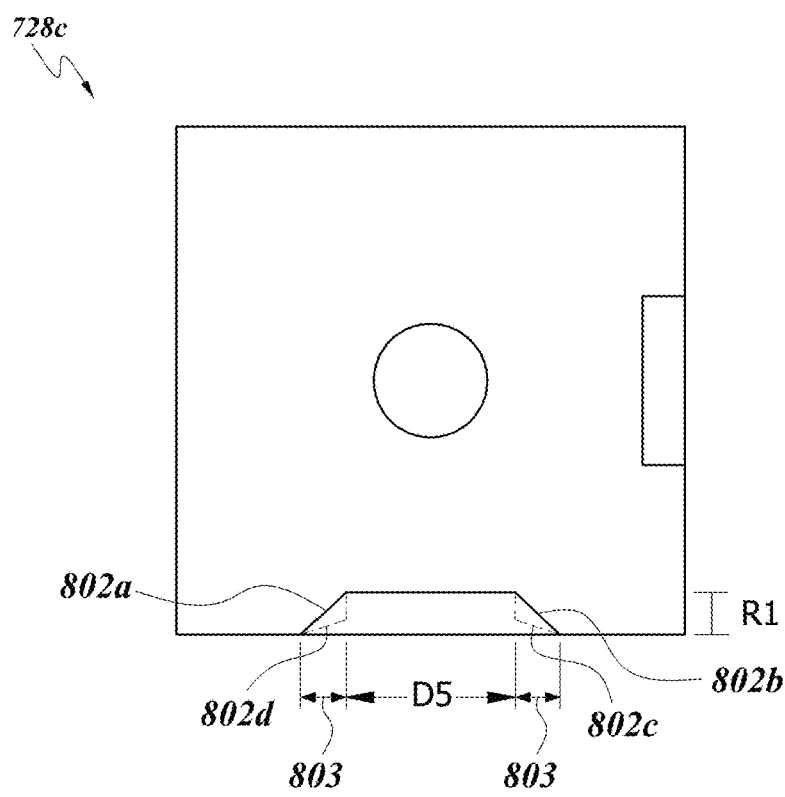
FIG. 24B illustrates a top view of the embodiment of the cube coupling joint of FIG. 24A.

In some cases, when attempting to secure marriage strap 700 to recessed channels of cube coupling joints 628a, 628b, 628c, it may be difficult fit portions of the perimeter of the strap 700 within such recessed channels in view of the tolerances between such portions and perimeter edges of non-recessed portions of cube coupling joints 628a, 628b, 628c proximate to the recessed channels. Cube coupling joints 728c and 728b (as shown in FIGS. 24A-24B) are identical to cube coupling joints 628c and 628b in every respect except that cube coupling joints 728c and 728b have one or more beveled or partially beveled regions that can help allow portions of the marriage strap 700 to fit within the recessed channels when the joint assembly 612 is assembled. For example, perimeter edges of non-recessed portions proximate to recessed channels 834a, 834b of the cube coupling joints 728c and/or 728b can be beveled or partially beveled. As shown in FIGS. 24A, 24B, and 25, perimeter edges 802a and/or 802b of non-recessed portions proximate to recessed channels 834a of cube coupling joint 728c and/or perimeter edges 804a and/or 804b of non-recessed portions proximate to the recessed channels 834b of cube coupling joint 728b can be beveled. As shown in FIG. 24B, the beveling can be defined by a hypotenuse of a triangle having a width 803 and a height equal to a maximum depth R1 of the recessed channel 834a. Alternatively, as represented by the dotted lines appearing in FIG. 24B, perimeter edges of non-recessed portions proximate to recessed channels 834a, 834b of the cube coupling joints 728c and/or 728b can be partially beveled. For example, with reference to FIG. 24B, the partial beveling 802c, 802d can be defined by a hypotenuse of a triangle having a width 803 and a height equal to a depth smaller than the maximum depth R1 of the recessed channel 834a. Where partial beveling 802c and/or 802d is used as shown in FIG. 24B, a portion of the recessed channel between the maximum depth R1 and the beveled portion 802c, 802d can be generally parallel to a surface of an edge of a marriage strap so as to provide a bearing surface against the edge of the marriage strap. As also shown in FIG. 24B, a non-beveled region of the recessed channel 834a, 834b can have a width D5. The beveled regions 804a and/or 804b in cube coupling joint 728b can be the same as the beveled regions 802a, 802d and/or 802b, 802c in cube coupling joint 728c in some cases. In addition or as an alternative to having beveled regions 802a, 802b, 802c, 802d, 804a, 804b on cube coupling joints 728c, 728b, portions of marriage strap 700 can be beveled or partially beveled to help facilitate fitting the marriage strap 700 within recessed channels 834a, 834b. While the beveling and partial beveling has been described with respect to cube coupling joints 728c and 728b and marriage strap 700, such beveling can be equally incorporated into any or all of the other cube coupling joints and/or marriage straps discussed herein.

Figure 22B:
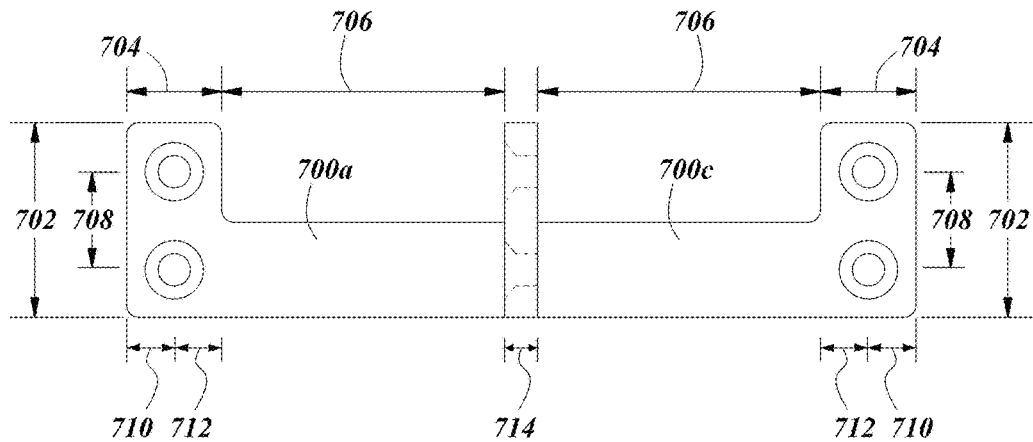
FIG. 22B illustrates a side view of the marriage strap of FIG. 22A.
Figure 22C:
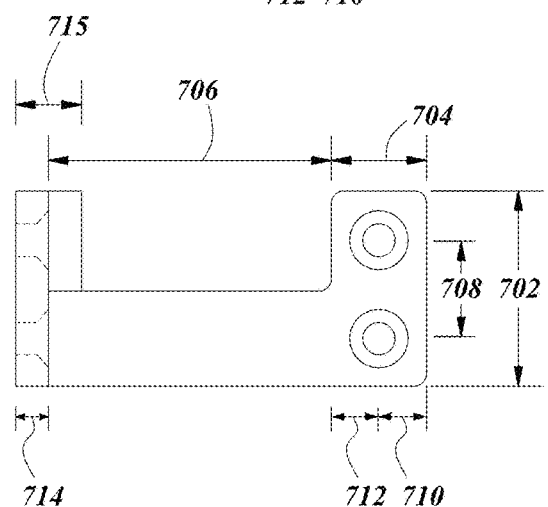
FIG. 22C illustrates another side view of the marriage strap of FIG. 22A.

FIGS. 22A-22C illustrate various views of marriage strap 700. As discussed above, marriage strap 700 has a first end 700a, second end 700b, and third end 700c. The second end 700b extends from a region of the marriage strap 700 between the first and second ends 700a, 700c at an angle. Such angle can be approximately 90 degrees or equal to 90 degrees in some embodiments. The first end 700a, second end 700b, and/or third end 700c can be sized and/or shaped to fit within recessed channels of cube coupling joints 628a, 628b, 628c. In some embodiments, the first end 700a, second end 700b, and/or third end 700c are L-shaped. In some embodiments, the first end 700a, second end 700b, and/or third end 700c have a first portion having a width or length 706 and a second portion having a height 702 and a width 704 (see FIGS. 22B-22C).

Widths and/or lengths 704, 706 can be sized to fit within a width and/or of recessed channels of cube coupling joints 628a, 628b, 628c. Through-holes of the first end 700a, second end 700b, and/or third end 700c can be spaced a distance 708 from each other. The through-holes can be spaced distances 710, 712 from exterior edges of the marriage strap 700. The first and second ends 700a, 700b of marriage strap 700 have a thickness 714 as discussed above. Thickness 714 can be the same or different as the thicknesses of other marriage straps discussed herein. The thickness 714 can be equal or substantially equal to the depth of the one or more recesses or recessed channels of the cube coupling joints 628c, 628b so as to facilitate a flush surface when the marriage strap 700 is fit within the one or more recesses or recessed channels. As discussed above and as shown in FIGS. 22A and 22C, the third end 700c of marriage strap 700 can have a thickness 715 that is greater than thickness 714 of the first and/or second ends 700a, 700b. In some embodiments, thickness 715 is equal or substantially equal to twice thickness 714.

Marriage strap 700 can include one or more through-holes that can be similar in some or all respects to the one or more through-holes of the marriage straps discussed herein, and accordingly reference can be made to the aspects and modified and alternative aspects described above. For example, the one or more through-holes of the marriage strap 700 can include inner diameters and countersunk rims surrounding the perimeters of the one or more through-holes which are configured to allow a portion of a bolt to fit within and create a flush surface along a plane of marriage strap 700. The one or more through-holes of marriage strap 700 can be sized, spaced, shaped, and/or oriented to align with one or more holes in the cube coupling joints 628a, 628b, 628c. The size, spacing, shape, and/or orientation of the one or more through-holes can be selected based on the amount of holes in the cube coupling joints 628a, 628b, 628c and the size, spacing, shape, and/or orientation of such holes. Additionally, the size, spacing, shape, and/or orientation of the one or more through-holes in marriage strap 700 can be designed so as to optimize the strength capacity of marriage strap 700, for example bearing and/or tensile capacity. This sizing, spacing, shaping, and/or orientation can be the same in many or all respects as that discussed with regard to the one or more through-holes 41 of marriage strap 24, for example.

Figure 23A:
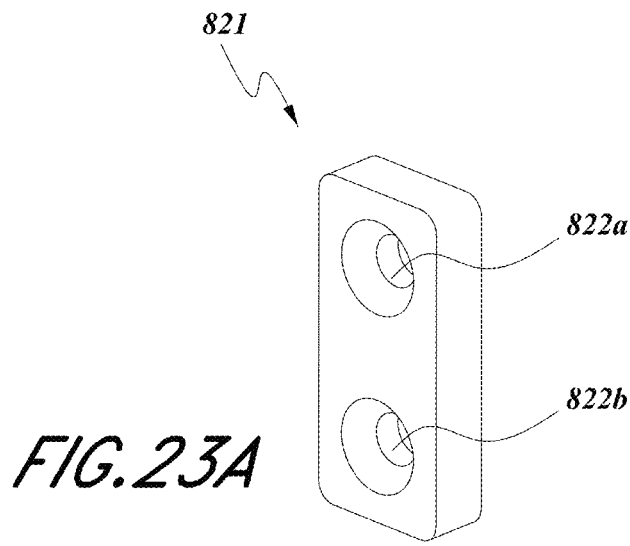
FIG. 23A illustrates a perspective view of an embodiment of a marriage strap in accordance with aspects of this disclosure.
Figure 23B:
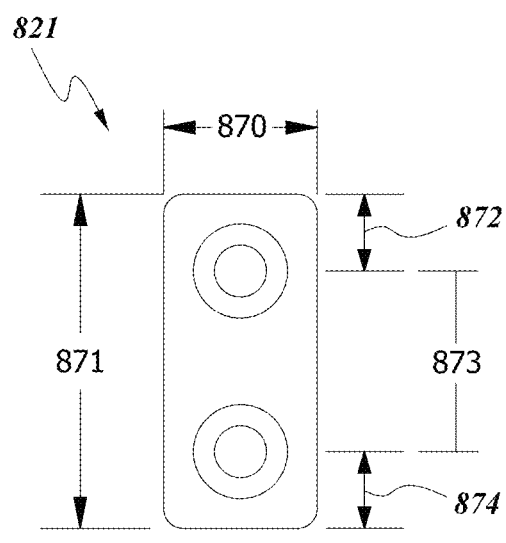
FIG. 23B illustrates a front view of the marriage strap of FIG. 23A.
Figure 23C:
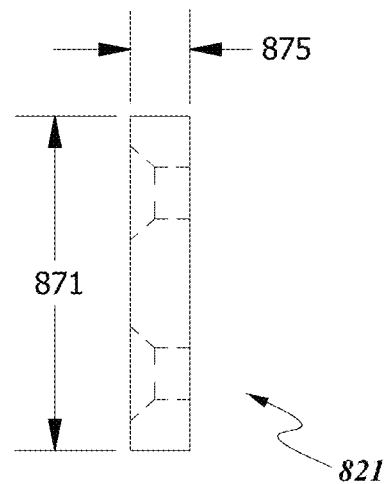
FIG. 23C illustrates a side view of the marriage strap of FIG. 23A.

FIGS. 23A-23C illustrate various views of marriage strap 821. As shown, marriage strap 721 has a shape enabling it to secure to either of cube coupling joints 628c and 628a and fit within a gap defined between recessed channels thereof (see FIGS. 21A-21B). As discussed above, marriage strap 821 can be the same as marriage strap 24 as discussed and shown above with reference to FIGS. 4A-4C except with respect to the height and thickness. Marriage strap 821 can include one or more through-holes 822a, 822b. The one or more through-holes 822a, 822b can align with one or more threaded holes within recessed channels in cube coupling joint 628a, 628c when the marriage strap 821 is fit within the one or more recesses or recessed channels of the cube coupling joints 628a, 628b. The one or more through-holes 822a, 822b can be sized and shaped to accommodate various fasteners to pass therethrough. For example, the one or more through-holes 822a, 822b can have a diameter that allows a fastener to pass therethrough and secure to threaded holes in the cube coupling joints 628a, 628c. The through-holes 822a, 822b can have a countersunk rim surrounding a perimeter of the through-holes 822a, 822b that can allow for a portion of a fastener to fit within and be "countersunk." This can advantageously allow for a flush surface to be achieved when the fastener is passed through the through-holes 822a, 822b and secured to cube coupling joint 628a or 628b. As discussed above, marriage strap 821 can have a thickness 875 equal or substantially equal to the combined depth of a recessed channels in the cube coupling joints 628a, 628c (see, for example, FIG. 21A-21B).

Marriage strap 821 has a length or height 871, width 870, and a thickness 875. The length 871, width 870, and/or thickness 875 of the marriage strap 821 can vary depending on the size, shape, and/or orientation of one or more recesses or recessed channels in the cube coupling joints 628a, 628c. A first through-hole 822a of marriage strap 821 can be spaced a distance 873 from a second through-hole 822b. The first and second through-holes 822a, 822b can be spaced distances 872, 874 from exterior edges of the marriage strap 821.

Figure 27:
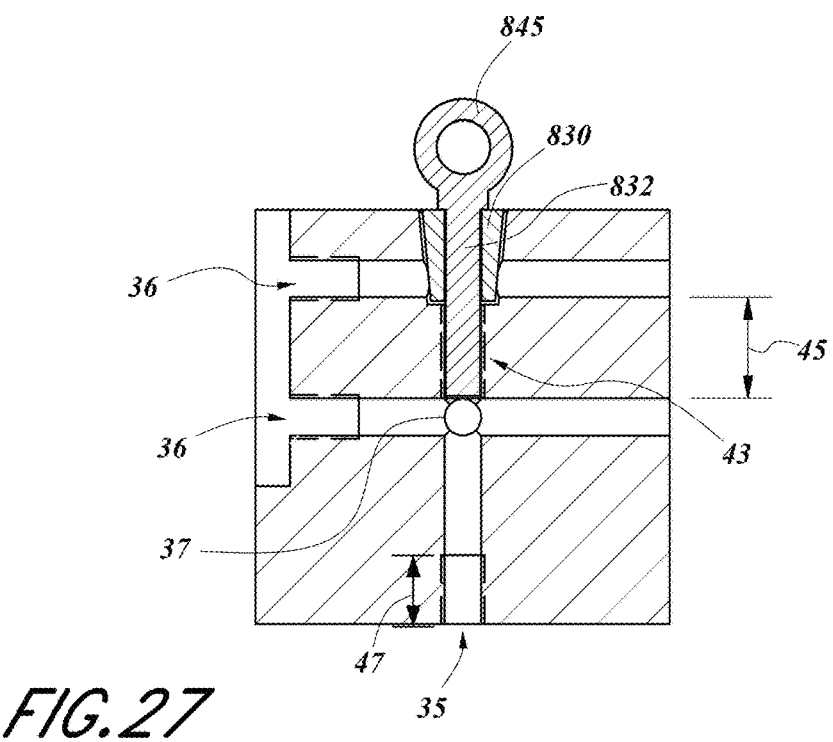
FIG. 27 illustrates a cross section of the assembly of FIG. 26 in accordance with aspects of this disclosure.

FIGS. 26 and 27 illustrate an embodiment of an assembly for moving and/or positioning a modular structure or frame. Once the cube coupling joints and structural members are assembled into modular frames, a crane or other device can be used to move or position such frames in a construction site environment. The cube coupling joints discussed herein can be utilized along with a common eye bolt 845 to facilitate grasping of modular frames by a crane. Eye bolt 845 includes a connection end having an opening 847 therethrough and a threaded portion 849 which can secure to a threaded portion of a hole in the cube coupling joints described herein. Where the cube coupling joint is oriented as shown in FIGS. 21A-21B, 26, and 27 (which represents an opposite orientation to that shown in FIGS. 3F and 3J) the alignment hole 32 faces vertically upward away from the ground, a spacer 830 can be placed within the hole 32. Spacer 830 can include an opening 832 extending through a height of the spacer 830 which can be sized and shaped to allow the threaded portion 849 of eye bolt 845 to pass therethrough. Spacer 830 can include a tapered and/or non-uniform diameter similar in size and/or shape to the non-uniform or tapered diameter of the alignment or shear pin 22 discussed above and as shown in FIGS. 6A-6B. Spacer 830 provides a bearing surface for the perimeter of the threaded portion 849 of the eye bolt 845 when the threaded portion 849 extends through the opening 832 and secures to a threaded hole in the cube coupling joint. As shown in FIG. 27, the threaded portion 849 of eye bolt 845 can extend through the opening 832 of spacer 830 and can thread into a threaded portion 43 of cube coupling joint 28a.

It should be noted that the orientation of cube coupling joint 28a showing in FIGS. 26-27 is rotated 180 degrees with respect to the orientation of the cube coupling joint 28a as shown in FIGS. 3F and 3J. As such, features of cube coupling joint 28a discussed above (and some numerals appearing in FIG. 28) are not again described here.

As discussed above with reference to FIGS. 3F and 3J, the threading of channel 43 can extend through distance 43, 45, and the portion between distances 43 and 45. Accordingly, the threaded portion 849 of eye bolt 845 can thread into a threaded interior channel 43 in the cube coupling joint 28a and can also contact an interior surface defined by the opening 832 in spacer 830. While the spacer 830 can advantageously be used to provide a bearing surface for the threaded portion 849 of eye bolt 845 when the eye bolt 845 is passed through the alignment hole 32 of cube coupling joint 28a, the eye bolt 849 can alternatively be secured to the holes 35 of cube coupling joint 28 (as discussed above). For example, the configuration of cube coupling joints 628a, 628b, 628c of joint assembly 612 could be altered so that the orientation of cube coupling joints 628a, 628b, 628c is flipped or rotated 180 degrees, such that the alignment holes (appearing on the top surfaces as shown in FIG. 21B) face downward (relative to the ground). In such orientation, hole 35 as shown in FIG. 27 with respect to cube coupling joint 28a will face vertically upward and alignment hole 32 will face downward in an opposite direction. Further, in such orientation, threaded portion 849 of eye bolt 845 can be secured to the threaded hole 35 without the need for spacer 830. In some embodiments, hole 35 and recessed channel 43 (which can be included in any of the cube coupling joints discussed herein) are integral and together define a single threaded channel. Thus, an eye bolt 845 can advantageously be secured to the cube coupling joints described herein in a variety of ways which can help facilitate positioning or movement of one or more modular frames with a crane, for example.

Figure 19A:
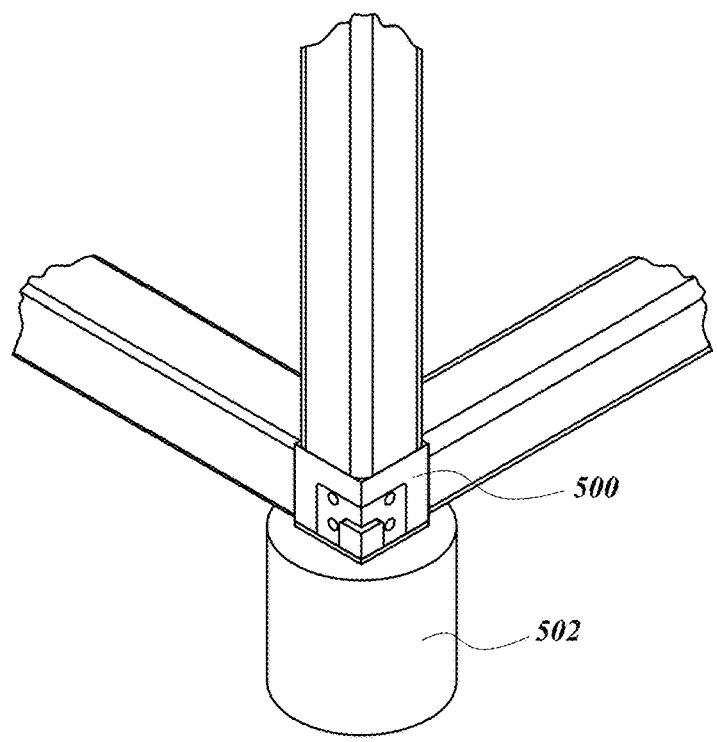
FIG. 19A illustrates a perspective view of a bottom corner of a modular structure supported by a cylindrical footing.
Figure 19B:
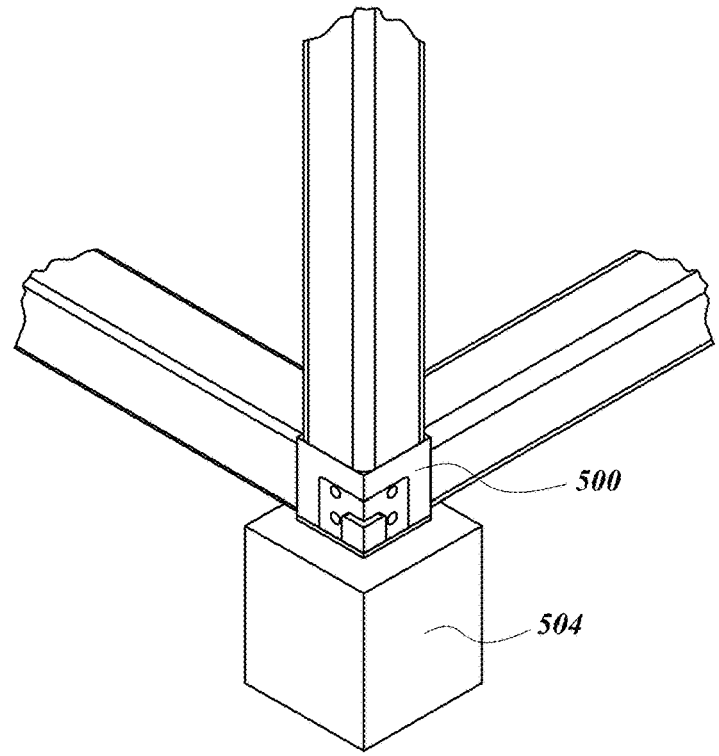
FIG. 19B illustrates a perspective view of a bottom corner of a modular structure supported by a square footing.
Figure 19C:
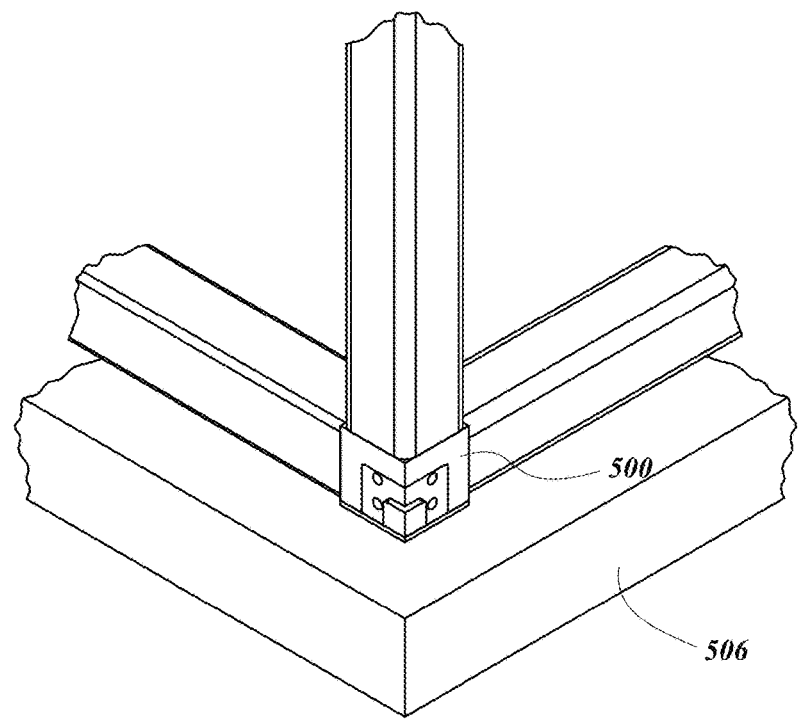
FIG. 19C illustrates a perspective view of a bottom corner of a modular structure supported by a mat foundation.

FIGS. 19A-19E illustrate various perspective views of a bottom corner assembly of a modular frame or structure supported by, and secured to, a structural foundation, such as a concrete structural foundation. The bottom corner assembly and cube coupling joint 500 can be supported by, and secure to, a structural foundation such as a mat foundation, continuous footing, cylindrical footing, a square footing, and/or another type of structural foundation. As illustrated, the bottom corner assembly and cube coupling joint 500 can rest upon and secure to a cylindrical footing 502 (FIG. 19A), a square-shaped footing 504 (FIG. 19B), and/or a mat foundation 506 (FIG. 19C). The structural foundation can be sized and shaped to facilitate vertical support and/or securement of the bottom corner assembly and cube coupling joint 500 and the modular frame or structure. For example, in modular structures similar to that shown in FIG. 1, respective bottom corner assemblies can be supported by and secured to a mat foundation or individual footings. The dimensions, such as the width, length, and/or depth, of the structural foundation or foundations can be designed to support the vertical and/or lateral loads transferred from the modular structure. Further, the dimensions of the structural foundation or foundations can vary based upon the assembly of the modular structure. For example, where two, two-story modular frame structures are joined at a bottom connection (see FIG. 11), the structural foundation underneath the bottom connection can be designed to support the joined structure and to facilitate securement of the two respective cube coupling joints to the structural foundation.

Figure 19D:
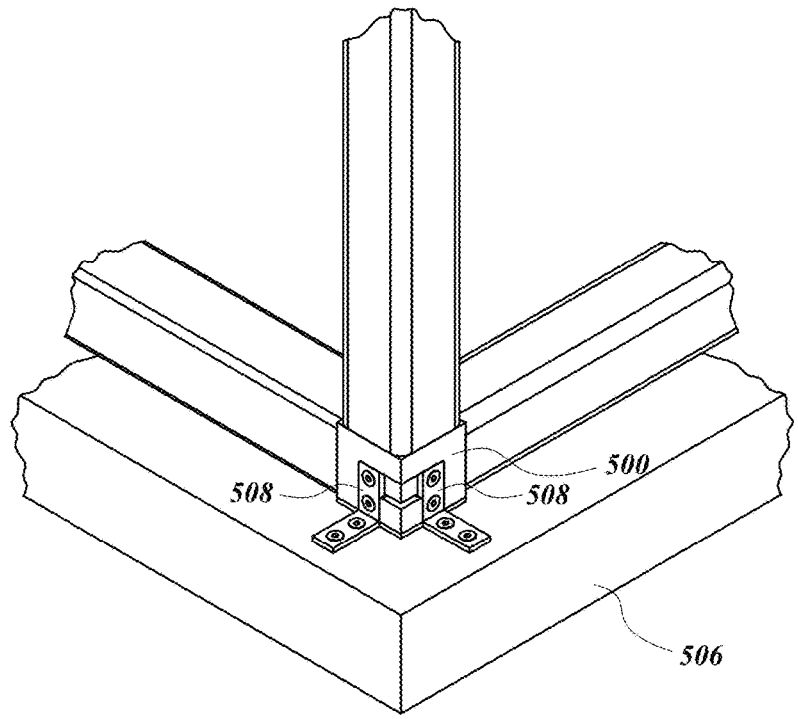
FIG. 19D illustrates a perspective view of an embodiment of an anchoring system to secure a bottom corner of a modular structure to a structural foundation.
Figure 19E:
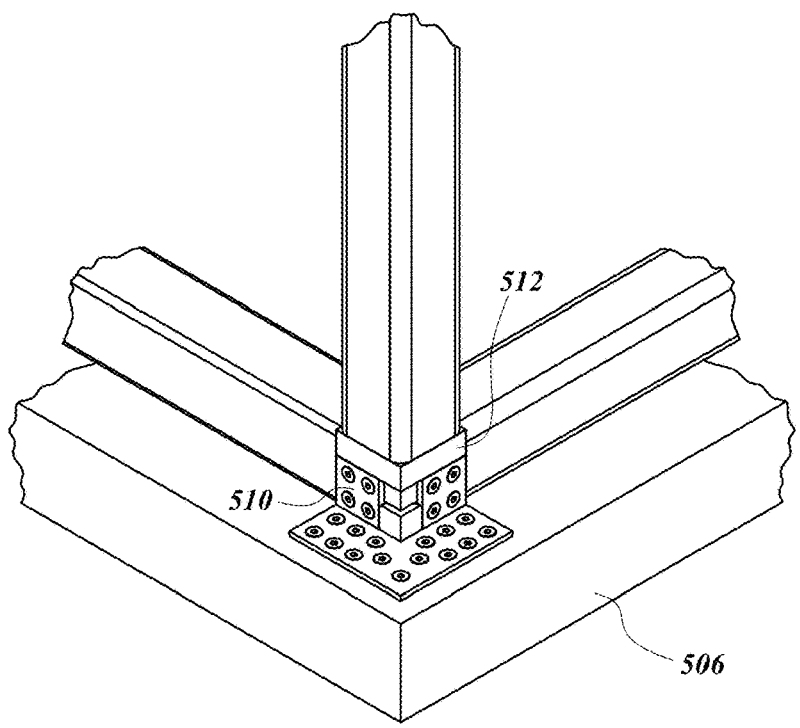
FIG. 19E illustrates a perspective view of another embodiment of an anchoring system to secure a bottom corner of a modular structure to a structural foundation.
Figure 19F:
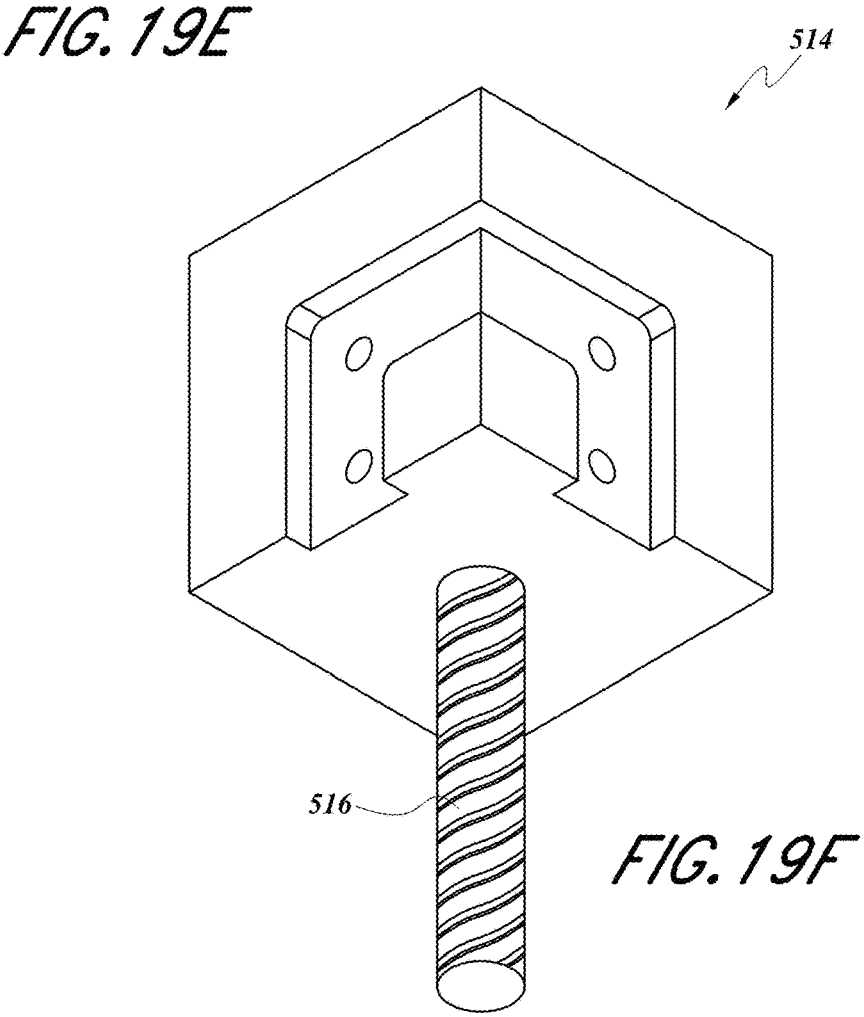
FIG. 19F illustrates a perspective view of an embodiment of a cube coupling joint having an anchor rod extending from a surface of the cube in accordance with aspects of this disclosure.

As illustrated in FIGS. 19D-19F, the modular frame structures discussed herein can be secured and/or anchored to structural foundations in a variety of ways. For example, a modular frame structure can be secured to a structural foundation by securing a cube coupling joint 500 of a bottom corner assembly to the structural foundation. Where the structural foundation is formed with concrete, securement of a cube coupling joint 500 to the structural foundation can occur, for example, after curing of the concrete. A cube coupling joint 500 can be secured to a structural foundation after curing of the concrete using one or more marriage straps 508. Marriage strap 508 can be the same in some or many respects to the other marriage straps described herein. In some embodiments, marriage strap 508 has two legs which traverse planes non-parallel to each other. For example, marriage strap 508 can have a first leg spanning in a vertical direction that is configured to fit within one or more recesses or recessed channels of cube coupling joint 500 and secure to cube coupling joint 500, and can have a second leg spanning a horizontal direction along a plane parallel to a plane of the structural foundation and can be configured to secure to the structural foundation. The second leg of marriage strap 508 can have one or more through-holes configured to allow one or more bolts to be placed therethrough and thread into the structural foundation. The second leg can thus help anchor the cube coupling joint 500 and bottom corner assembly to the structural foundation. The one or more bolts can be drilled into the structural foundation. Alternatively, one or more holes in the structural foundation can be pre-drilled and filled with an anchoring adhesive, prior to threading or placing in the one or more bolts. The anchoring adhesive can be, for example, an epoxy, acrylic, and/or urethane anchoring adhesive. Regardless of whether mechanical fasteners and/or mechanical fastening methods are used or adhesive anchoring materials and/or adhesive anchoring methods are used, the cube coupling joint 500 and connected bottom corner assemblies can be secured and/or anchored to the structural foundation in order to provide strong horizontal and/or vertical (e.g., vertical uplift) load transfer capacity.

In some embodiments, similar to the other cube coupling joints discussed herein, the cube coupling joint 500 includes one or more alignment holes on a bottom surface of the cube (not shown). For example, the bottom surface of the cube coupling joint can have one or more, two or more, three or more, four or more, five or more, six or more, seven or more, or eight or more holes. The one or more holes can be configured to align the cube coupling joint 500 with a desired position on the structural foundation using one or more shear pins, such as one or more, two or more, three or more, four or more, five or more, six or more, seven or more, or eight or more shear pins. For example, one or more shear pins can be placed within one or more holes on a bottom surface of the cube coupling joint 500 prior to positioning the cube coupling joint 500 and a connected bottom corner assembly on a structural foundation. The structural foundation can have one or more sets of holes configured to accept the one or more shear pins and which correspond to the one or more alignment holes and one or more shear pins described above. For example, the structural foundation can have one or more, two or more, three or more, four or more, five or more, six or more, seven or more, or eight or more sets or groups of holes. The one or more sets or groups of holes in the structural foundation can be placed in various locations in the foundation where it may be desirable for a bottom corner assembly including a cube coupling joint 500 to be aligned, secured, and/or anchored to the foundation.

The one or more sets of groups of holes in the structural foundation can be formed prior to curing of the concrete and/or after curing through drilling. The one or more shear pins can fit within one or more holes on a bottom surface of the cube coupling joint 500 and one or more holes in the structural foundation so that the cube coupling joint 500 and connected bottom corner assembly can be positioned in a desired location atop the structural foundation. The one or more shear pins can be sized and shaped to allow the modular frame or structure to transfer lateral loads into the structural foundation. As discussed above, the total area of the one or more alignment holes on a surface of the cube coupling joint can be kept within a certain percentage of the total area of the surface of the cube coupling joint so that the cube coupling joint provides sufficient bearing capacity. In some embodiments, the cube coupling joint 500 can have an alignment hole with a diameter that equates to the maximum percentage, as discussed above with reference to alignment hole 32 and FIG. 3B. This can allow a larger shear pin to be utilized at bottom connections of the modular frame or structure and can thus provide increased lateral load transfer capacity to the modular frame or structure. For example, as discussed above, the cube coupling joint 500 can have a width of 6 inch, length of 6 inch, and a height of 6 inch. In this embodiment, the alignment hole (and thus also the shear pin and corresponding hole in the structural foundation) can have an area of about 12 inch which corresponds to one-third ($\frac{1}{3}$) of the total area of the bottom face of the cube coupling joint 500. In other embodiments, the cube coupling joint 500 has a group of alignment holes which cooperate with a group of shear pins and a group of holes in the structural foundation. The group of alignment holes can together equate to the maximum total area descried above. In some embodiments, the cube coupling joint does not have alignment holes, but rather, has one or more shear pins that are integral with the cube couple joint and that are configured to be placed into one or more holes in the structural foundation.

In some embodiments, the cube coupling joint for a bottom corner assembly has recesses or recessed channels configured to fit marriage straps with larger dimensions. For example, as shown by FIG. 19E, the one or more recesses or recessed channels of cube coupling joint 512 can be wider than that shown and described above so as to accommodate wider marriage straps 510. Additionally or alternatively, the one or more recesses or recessed channels in cube coupling joint 512 can be recessed from an outer surface or face of the cube coupling joint to allow marriage straps with thicker cross sections to fit within the one or more recesses or recessed channels. For example, the one or more recesses or recessed channels of cube coupling joint 512 can be recessed from an outer face by a certain percentage of the width of the cube coupling joint 500, such as by 8%, 13%, 17%, 21%, 25%, 29%, 33%, 38%, 42%, or any values there between, or any ranges bounded by any combination of these values, although other values can be used in some implementations. For example, where the cube coupling joint 512 has a width of 6 inches, the one or more recesses or recessed channels can be recessed from an outer face of the cube coupling joint 500 by a dimension of ½ inch, ¾ inch, 1 inch, 1.25 inch, 1.5 inch, 1.75 inch, 2 inch, 2.25 inch, 2.5 inch, or any values there between, or any ranges bounded by any combination of these values, although other values can be used in some implementations. One having skill in the art will recognize that, depending on the dimensions of the cube coupling joint, the depth of the one or more recesses or recessed channels can vary.

Having a larger width and/or height for one or more recesses or recessed channels in a cube coupling joint 512 can allow larger width marriage straps to secure the cube coupling joint 512 to the structural foundation. This in turn can provide greater load capacity to the marriage straps 510 that secure the bottom corner assembly and cube coupling joint 512 to the structural foundation. For example, marriage strap 510 can have a size, shape, and orientation that allows it to secure to two faces of the cube coupling joint 512 and also to the structural foundation 506 while providing for a number of bolts, such as four bolts. Marriage strap 510 can have a first flange configured to secure to a first face of cube coupling joint 512 and a second flange configured to secure to a second face of cube coupling joint 512. In some embodiments, cube coupling joint 512 is the same as cube coupling joint 28 except with respect to the width of the recess on two faces. For example, referring to FIG. 3C, cube coupling joint 28 has a width D2 and D5. Cube coupling joint 512 can have a recessed portion spanning a distance D2 plus D1 (as shown in FIG. 19E). Further, cube coupling joint 512 can have larger holes than cube coupling joint 28. The larger holes can be for securing larger diameter fasteners. This can allow more load transfer capacity between the cube coupling joint 512 and the structural foundation via marriage strap 510. Cube coupling joint 512 can have a second face with the same size and orientation for the recessed portion as that of the first face described above. The first and/or second flange can have a width of marriage strap 510 that spans a width D2 plus D5, as shown in FIG. 19E. Marriage strap 510 can have one or more through-holes on a surface that lays atop a structural foundation. These one or more through-holes can be sized to allow one or more anchor bolts to pass there through, so as to secure the surface to the structural foundation. To secure this surface, mechanical fasteners can be drilled through these through-holes and into the concrete. Alternatively, expansion anchors could be placed through these through-holes and secured to the concrete foundation. Alternatively, an adhesive anchoring material (such as epoxy adhesive) could be placed into pre-drilled holes and threaded rods could be placed into the pre-drilled holes and configured to secure with the adhesive material to the structural foundation. Alternatively, anchor rods could be cast in place in the concrete foundation and the one or more through-holes in the foundation-facing surface of the marriage strap 510 could be placed over the anchor rods and secured thereto. Regardless of whether mechanical of adhesive anchor rods/anchoring methods or cast in place anchoring methods are used, the anchor rods can have a sufficient length to enable the rods to secure the marriage strap 510, cube coupling joint 512, and modular frame/ structure to the structural foundation.

While FIG. 19E shows marriage strap 510 as separate from cube coupling joint 512, the two could be integral. For example, cube coupling joint 512 could include a marriage strap or base plate portion with one or more through-holes on a surface of the base plate portion that is configured to secure to the structural foundation 506.

In some embodiments, a cube coupling joint is configured to sit atop a base plate (not shown) and be secured to a structural foundation. For example, a bottom corner assembly and cube coupling joint 500 can be placed atop a steel base plate. Thereafter, bottom edges of the cube coupling joint 500 can be welded to the base plate. Before, during, or after such welding, anchor rods and/or structural bolts can be drilled or placed through through-holes in the base plate and into the structural foundation. In some embodiments, holes aligning with the through-holes are drilled through the concrete, adhesive material (e.g., epoxy) is placed into the drilled holes, and threaded rods are placed through the through-holes and into the drilled holes. The threaded rods can thereafter be secured to the base plate portion, and after the adhesive material cures, the threaded rods can secure the base plate portion, cube coupling joint 500, and the modular frame/structure to the structural foundation. In some embodiments, threaded rods can be drilled into the concrete without using adhesive epoxy. In some embodiments, expansion anchors can be placed into pre-drilled holes without using epoxy. In some embodiments, anchor rods can be cast in place with the structural foundation and through-holes of the base plate portion can be placed over the cast in place anchor rods and the base plate portion can be secured to the anchor rods.

With reference to FIG. 19C, in some embodiments, a base plate is welded to portions of a cube coupling joint 500 (which can be identical to the cube coupling joints discussed herein) in a factory prior to delivery to a construction site. For example, a base plate can be placed underneath a cube coupling joint 500 and bottom edges of the cube coupling joint 500 can be welded to the base plate. Such welding of the bottom edges of the cube coupling joint 500 to the base plate can occur before or after welding of structural members (such as those discussed and shown herein) to surfaces of the cube coupling joint 500. Such base plate welded to the cube coupling joint 500 can have a variety of shapes and/or sizes, such as square, rectangular, circular, among other shapes. Such base plate can have one or more through-holes configured to allow anchor rods and/or structural bolts to pass through and secure to a portion of a concrete foundation where the cube coupling joint 500 and/or modular frame or structure sit (such as a mat foundation). In some cases, where two cube coupling joints of corner joints of modular frames are secured to one another, base plates welded to each respective cube coupling joint can be sized so that edges of the base plates abut each other along a plane where the two cube coupling joints meet and/or secure to one another.

In some embodiments, the cube coupling joint 500 comprises a bottom plate portion (not shown) configured to be positioned atop a structural foundation and be secured thereto. The cube coupling joint 500 can have a substantially cube-like shape and have a bottom plate portion that extends outwardly from one or more bottom edges of the cube coupling joint 500. The bottom plate portion can have one or more holes to allow bolts to be drilled through and into the structural foundation. The bottom plate portion of the cube coupling joint 500 can be secured to the structural foundation by drilling threaded rods into the concrete, by placing anchor rods into pre-drilled holes with adhesive material, by placing through-holes of the bottom plate portion over cast in place anchor rods, and/or by using expansion anchors or other types of anchors or anchoring devices and/or methods.

In some embodiments, a cube coupling joint comprises one or more anchor rods on a bottom surface of the cube coupling joint. For example, as shown by FIG. 19F, cube coupling joint 514 can have one anchor rods 516 that extends outward from a bottom surface of cube coupling joint 514. While one anchor rod 516 is shown, cube coupling joint 514 can have more than one anchor rod 516, such as two, three, four, five, or six anchor rods. The one or more anchor rods 516 can comprise the same material as cube coupling joint 514. The one or more anchor rods 516 can be utilized along with adhesive material to secure the cube coupling joint (and connected modular frame/structure) to the structural foundation. For example, one or more holes can be drilled into a concrete foundation prior to positioning and/or placement of the cube coupling joint 514. After the one or more holes are drilled in the concrete, adhesive material, such as epoxy adhesive, can be placed in the one or more drilled holes. Thereafter, the one or more anchor rods 516 of the cube coupling joint 514 can be placed into the one or more drilled holes. Once the epoxy cures, the one or more anchor rods 516 can provide securement of the cube coupling joint 514 (and the connected modular frame/structure) to the structural foundation. In some embodiments, the one or more anchor rods 516 have protrusions that can help engage with the adhesive material. The protrusions can be spiral-patterned. The protrusions can be similar to threaded of anchor bolts. The length of the one or more anchor rods 516 can be selected to provide adequate capacity for securement, such as vertical securement to prevent uplift.

Any of the cube coupling joints and/or one or more marriage straps of the modular frames and/or structures can be secured to the structural foundations using various types of securement devices and/or methods, as discussed herein. For example, adhesive anchors, heavy duty screw anchors, and/or expansion anchors can be utilized to secure the cube coupling joints and/or one or more marriage straps of the modular frames and/or structures to the structural foundations described herein.

The various components described above can be made of a variety of materials with varying material properties (e.g., yield strength). For example, the beam and column structural members, cube coupling joints, marriage straps, fasteners, and/or block shear pins discussed herein can be made of steel having various ASTM designations and/or strength capacities. For example, the beam and column structural members can be carbon steel Hollow Structural Sections having an ASTM designation of A500, Grade B or Grade C with minimum yield stress values of 42 ksi, 46 ksi, or 50 ksi and minimum tensile stress values of 58 ksi or 62 ksi. The marriage straps discussed herein can be made of steel having minimum yield strength and/or minimum tensile strength values of 33 ksi, 36 ksi, 40 ksi, 42 ksi, 50 ksi, or 60 ksi, for example. The fasteners can be rivets or bolts, as discussed herein. For example, the fasteners can be steel bolts having an ASTM designation of A307 (e.g., for common/unfinished bolts) having 45 ksi nominal tensile strength and 27 ksi nominal shear strength. Alternatively or additionally, the fasteners can be steel bolts having ASTM designations of A325 or A490 (e.g., for high-strength bolts) having 90 ksi or 113 ksi nominal tensile strength values and 54 ksi, 68 ksi, or 84 ksi nominal shear strength values, for example. The alignment pins and/or block shear pins discussed herein can be made of steel having ASTM designations of A307, A325, A490 or other designations, for example. The alignment pins and/or block shear pins discussed herein can have various nominal tensile strength values, such as 45 ksi, 90 ksi, or 113 ksi, and can have various nominal shear strength values, such as 27 ksi, 54 ksi, 68 ksi, or 84 ksi, for example.

The cube coupling joints discussed herein can be made of steel having various ASTM designations and steel yield stress and/or tensile stress values. The cube coupling joints discussed herein can comprise carbon steel and/or high-strength low-alloy steel. For example, the cube coupling joints can comprise carbon steel having ASTM designations and stress values such as: A36 with 36 ksi and 58-80 ksi minimum yield and tensile stress values respectively; A53 Grade B with 35 ksi and 60 ksi minimum yield and tensile stress values respectively; A500 Grade B with minimum yield stress values of 42 or 46 ksi and a minimum tensile stress value of 58 ksi; A500 Grade C with minimum yield stress values of 46 ksi or 50 ksi and a minimum tensile stress value of 62 ksi; A501 Grade A with minimum yield stress and tensile stress values of 36 ksi and 58 ksi respectively; A501 Grade B with minimum yield stress and tensile stress values of 50 ksi and 70 ksi respectively; A529 Grade 50 with minimum yield stress and tensile stress values of 50 ksi and 65-100 ksi respectively; A529 Grade 55 with minimum yield stress and tensile stress values of 55 ksi and 70-100 ksi respectively; A709 Grade 36 with minimum yield stress and tensile stress values of 36 ksi and 58-80 ksi respectively; A1043 Grade 36 with minimum yield stress and tensile stress values of 36-52 ksi and 58 ksi respectively; A1043 Grade 50 with minimum yield stress and tensile stress values of 50-65 ksi and 65 ksi respectively; and/or A1085 Grade A with minimum yield stress and tensile stress values of 50 ksi and 65 ksi respectively.

Alternatively or additionally, the cube coupling joints can comprise high-strength low-alloy steel having ASTM designations such as: A572 Grade 42 with minimum yield stress and tensile stress values of 42 ksi and 60 ksi respectively; A572 Grade 50 with minimum yield stress and tensile stress values of 50 ksi and 65 ksi respectively; A572 Grade 55 with minimum yield stress and tensile stress values of 55 ksi and 70 ksi respectively; A572 Grade 60 with minimum yield stress and tensile stress values of 60 ksi and 75 ksi respectively; A572 Grade 65 with minimum yield stress and tensile stress values of 65 ksi and 80 ksi respectively; A618 Grade Ia, Ib, or II with minimum yield stress and tensile stress values of 50 ksi and 70 ksi respectively; A618 Grade IIII with minimum yield stress and tensile stress values of 50 ksi and 60 ksi respectively; A709 Grade 50 with minimum yield stress and tensile stress values of 50 ksi and 65 ksi respectively; A709 Grade 50S with minimum yield stress and tensile stress values of 50-65 ksi and 65 ksi respectively; A709 Grade 50W with minimum yield stress and tensile stress values of 50 ksi and 70 ksi respectively; A913 Grade 50 with minimum yield stress and tensile stress values of 50 ksi and 65 ksi respectively; A913 Grade 60 with minimum yield stress and tensile stress values of 60 ksi and 75 ksi respectively; A913 Grade 65 with minimum yield stress and tensile stress values of 65 ksi and 80 ksi respectively; A913 Grade 70 with minimum yield stress and tensile stress values of 70 ksi and 90 ksi respectively; A992 with minimum yield stress and tensile stress values of 50 ksi and 65 ksi respectively; and/or A1065 Grade 50 with minimum yield stress and tensile stress values of 50 ksi and 60 ksi respectively.

In some cases, it can be advantageous for the cube coupling joints, marriage straps, fasteners, and/or block shear pins discussed herein to be made of a steel with greater stress values (e.g., yield and/or tensile) than the steel of the structural members. Depending on the loading scenario (e.g., vertical and/or lateral loading events or conditions), designing any or all of the cube coupling joints, marriage straps, fasteners, and/or block shear pins with stronger steel strength capacity in relation to the steel structural members can ensure that the first mode of failure is ductile yielding of the beam structural members, which can be advantageous in moment resisting frame systems, such as the modular structures discussed herein.

As discussed herein, the marriage straps shown and/or described herein can be sized and shaped to fit within one or more recesses or recessed channels in one or more cube coupling joints. The marriage straps can have a thickness that is equal to or substantially equal to the depths of one or more recesses or recessed channels of the cube coupling joints so that an outer surface of the marriage strap is flush with an outer surface of one or more of the cube coupling joints. For example, the marriage straps can have a thickness that is within 1%, 2%, 3%, 4%, or 5% of the depth of the recesses or recessed channels of the cube coupling joints. For example the marriage straps can have a thickness that is 99% or 101%, 98% or 102%, 97% or 103%, 96% or 104%, and/or 95% or 105% of the depth of the recesses or recessed channels of the cube coupling joints. The marriage straps can alternatively have a thickness that is not equal or not substantially equal to the depth of the one or more recesses or recessed channels of the cube coupling joints so that a flush plane between an outer surface of the marriage straps and outer surfaces of the cube coupling joints is not achieved. In some embodiments, the marriage straps are configured to sit above an outer surface of the cube coupling joints and/or be positioned on a non-recessed portion of the outer surface of the cube coupling joints. In some embodiments, the cube coupling joints discussed herein can have no recesses or recessed channels, and the one or more marriage straps can be secured to an outer surface of the cube coupling joints.

While the coupling joint 28a (and/or other embodiments of the cube coupling joints discussed herein such as such as 28a, 28b, 128a, 128b, 1238c, 227a, 227b, 228a, 228b, 228c, 228d, 328a, 328b, 328c, 328d, 328e, 628a, 628b, 628c, 728c, 728b) is referred to as a "cube" coupling joint herein, as noted above, the coupling joint 28a can be designed as a shape other than a square cube. For example, the cube coupling joint 28a can have surfaces and/or edges with various, unequal, widths, heights, and/or lengths. In some embodiments, the cube coupling joint 28a has two different widths, for example, as shown by W1 and W2 in FIG. 3C. The cube coupling joint 28a can be rectangular, for example. In some embodiments, the cube coupling joint 28a (such as 28a, 28b, 128a, 128b, 1238c, 227a, 227b, 228a, 228b, 228c, 228d, 328a, 328b, 328c, 328d, 328e, 628a, 628b, 628c, 728c, 728b) can form a square cube that has an equal or substantially equal width, height.

Any or all of the marriage straps, cube coupling joints, and/or structural members discussed herein can together form a building system that can be assembled prior to, during, or after delivery to a construction site environment. As discussed above, the marriage straps, cube coupling joints, and/or structural members described herein can be utilized to form a variety of configurations for a building systems and modular structures. These components can be provided as a system comprising one of more marriage straps, cube coupling joints, and/or structural members according to the embodiments described herein. Various embodiments of the cube coupling joint, the recessed channels and the marriage straps are described herein. These embodiments can be combined in combinations and sub-combinations to form a system for forming a modular structure. In certain embodiments, the system can include various embodiments of a coupling joint with recessed channels and marriage straps as described herein such that a modular structure can be efficiently constructed in different configurations. In certain embodiments, the system comprises a plurality of structural members, the plurality of structural members are coupled to cube coupling joints which can be substantially solid in certain embodiments. The cube coupling joints can have one or more recessed channels according the embodiments described herein. The system can one or more marriage straps configured to fit within and extend between the one or more recessed channels of the substantially solid cube coupling joints. The one or more marriage straps can be configured to secure the cube coupling joints to each other. The one or more recessed channels in the cube coupling joint and the corresponding include marriage straps can have straight, L-shaped, C-shaped, and/or G-shaped configurations and any sub-combinations therein.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims. In addition, while the methods and devices described herein may be susceptible to various modifications and alternative forms, specific examples thereof have been shown in the drawings and are described in detail herein. It should be understood, however, that the inventive subject matter is not to be limited to the particular forms or methods disclosed, but, to the contrary, covers all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. In any methods disclosed herein, the acts or operations can be performed in any suitable sequence and are not necessarily limited to any particular disclosed sequence and not be performed in the order recited. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, embodiments can be carried out in a manner that achieves or optimizes one advantage or group of advantages without necessarily achieving other advantages or groups of advantages. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and can be claimed without or without the terms "about" or "approximately" and should be interpreted based on the circumstances (e.g., as accurate as reasonably possible under the circumstances, for example ±5%, ±10%, ±15%, etc.). For example, "about 7 mm" includes "7 mm." Phrases preceded by a term such as "substantially" include the recited phrase and should be interpreted based on the circumstances. For example, "substantially straight" includes "straight."

What is claimed is:

1. A joint assembly for joining structural members in a building frame, the joint assembly comprising:
   a marriage strap comprising one or more through-holes;
   one or more fasteners configured to be inserted through the one or more through-holes of the marriage strap;
   a cube coupling joint comprising:
   a first face, a second face, a third face, a fourth face, a fifth face, and a sixth face;
   a first recessed channel on the first face, the first recessed channel sized and shaped to receive a portion of the marriage strap; and
   one or more fastener holes located within the first recessed channel and configured to receive and secure to the one or more fasteners;
   a first structural member secured to the second face of the cube coupling joint and a second structural member secured to the third face of the cube coupling joint, wherein the second and third faces are adjacent and orthogonal to the first face;
   wherein the portion of the marriage strap is configured to be inserted into the first recessed channel of the cube coupling joint along a direction perpendicular to the first face, and wherein the one or more fasteners are further configured to be inserted into and secured to the one or more fastener holes of the cube coupling joint; and
   wherein the marriage strap, when inserted into the first recessed channel, sits flush with the first face of the cube coupling joint.

2. The joint assembly of claim 1, wherein the cube coupling joint is substantially solid.

3. The joint assembly of claim 1, wherein the first recessed channel is L-shaped.

4. The joint assembly of claim 1, wherein the cube coupling joint further comprises an alignment hole positioned on the fourth face of the cube coupling joint, the alignment hole configured to receive an alignment pin, and wherein the alignment pin is configured to permit alignment of a second cube coupling joint.

5. The joint assembly of claim 4, further comprising the alignment pin.

6. The joint assembly of claim 5, wherein the alignment pin is a shear pin.

7. The joint assembly of claim 6, wherein the shear pin comprises:
   a first end and a second end, the first end and the second end having an outer diameter; and
   a middle region having an inner diameter greater than the outer diameter.

8. The joint assembly of claim 7, wherein the outer diameter at the first and second ends gradually transitions to the inner diameter in the middle region.

9. A cube coupling joint for joining structural members in a building frame, the cube coupling joint comprising a substantially solid body including:
   a first face, a second face, a third face, a fourth face, a fifth face, and a sixth face;
   wherein the first face comprises a first recessed channel having an L-shape, a first end of the first recessed channel positioned along a first edge of the first face and a second end of the first recessed channel positioned along a second edge of the first face, the first edge perpendicular to the second edge; and
   wherein the second face is adjacent and perpendicular to the first face, and wherein the second face comprises a second recessed channel having an L-shape, a first end of the second recessed channel positioned along a first edge of the second face and a second end of the second recessed channel positioned along a second edge of the second face, the first edge of the second face being perpendicular to the second edge of the second face.

10. The cube coupling joint of claim 9, further comprising an anchor portion extending outward from the third face of the cube coupling joint, the third face being perpendicular to both of the first and second faces, wherein the anchor portion is configured to secure to a concrete structural foundation with an adhesive material, wherein the anchor portion comprises protrusions for engaging with the adhesive material.

11. The cube coupling joint of claim 9, wherein a total volume of hollow portions and reduced cross-section areas of the cube coupling joint comprises less than 50% of a volume of the cube coupling joint.

12. The cube coupling joint of claim 9, wherein a total volume of hollow portions and reduced cross-section areas of the cube coupling joint comprises less than 20% of a volume of the cube coupling joint.

13. The cube coupling joint of claim 9, further comprising:
   one or more fastener holes located within the first recessed channel and configured to receive and secure to one or more fastener stems; and
   one or more alignment holes configured to receive one or more alignment pins to permit alignment of a second cube coupling joint.

14. The cube coupling joint of claim 13, wherein a total volume of the first recessed channel, the one or more fastener holes, and the one or more alignment holes is less than or equal to 40% of a volume of the cube coupling joint.

15. The cube coupling joint of claim 13, wherein a total volume of the first recessed channel, the one or more fastener holes, and the one or more alignment holes is less than or equal to 25% of a volume of the cube coupling joint.

16. The joint assembly of claim 1, wherein a thickness of the marriage strap is within 5% of a depth of the first recessed channel.

17. The joint assembly of claim 1, wherein the one or more through-holes of the marriage strap are configured to align with the one or more fastener holes in the first recessed channel when the portion of the marriage strap is inserted into the first recessed channel, and wherein the marriage strap comprises a tapered perimeter around each of the one or more through-holes, the tapered perimeter configured to allow a fastener head to rest within the tapered perimeter to create a flush plane between the fastener head and an outer surface of the marriage strap when the one or more fasteners are inserted through the one or more through-holes of the marriage strap.

18. The cube coupling joint of claim 9, further comprising an alignment hole positioned on the third face of the cube coupling joint, the alignment hole configured to receive an alignment pin to permit alignment of a second cube coupling joint.

19. The cube coupling joint of claim 18, wherein the alignment pin comprises a first portion extending from an outer end of the alignment pin to a middle region of the alignment pin, wherein the outer end has a first diameter and the middle region has a second diameter greater than the first diameter, and wherein the alignment hole is sized and shaped to accommodate the first portion of the alignment pin.

20. The joint assembly of claim 4, wherein the fourth face of the cube coupling joint is perpendicular to the first face of the cube coupling joint.

21. The joint assembly of claim 4, wherein the alignment hole is positioned in a center of the fourth face.

22. The joint assembly of claim 1, wherein the first structural member is welded to the second face and the second structural member is welded to the third face.

23. The cube coupling joint of claim 18, wherein the third face of the cube coupling joint is perpendicular to both of the first and second faces of the cube coupling joint.

24. The cube coupling joint of claim 9, wherein the first end of the first recessed channel meets the first end of the second recessed channel.

25. The cube coupling joint of claim 13, wherein the one or more alignment holes comprises one alignment hole positioned in a center of the fourth face, the fourth face being perpendicular to the first face.

26. A joint assembly for joining structural members in a building frame, the joint assembly comprising:
   a marriage strap comprising one or more through-holes;
   one or more fasteners configured to be inserted through the one or more through-holes of the marriage strap;
   a cube coupling joint comprising:
      a first surface, a second surface, a third surface, a fourth surface, a fifth surface, and a sixth surface;
      a first recessed channel on the first surface, the first recessed channel having a cross-section sized and shaped to allow a portion of the marriage strap to be inserted from a direction perpendicular to the first surface; and
      one or more fastener holes located within the first recessed channel and configured to receive and secure to the one or more fasteners;
   wherein the one or more fasteners are further configured to be inserted into and secured to the one or more fastener holes of the cube coupling joint, and wherein the marriage strap sits flush with the first surface of the cube coupling joint when inserted into the first recessed channel.

27. The joint assembly of claim 26, further comprising a first structural member secured to the second surface of the cube coupling joint and a second structural member secured to the third surface of the cube coupling joint, wherein at least one of the second and third surfaces is adjacent and perpendicular to the first surface.

28. The joint assembly of claim 27, wherein the first structural member is welded to the second surface of the cube coupling joint and the second structural member is welded to the third surface of the cube coupling joint.

29. The joint assembly of claim 27, further comprising a third structural member secured to the fourth surface of the cube coupling joint, wherein the fourth surface is perpendicular to the first surface.

30. The joint assembly of claim 29, wherein the third structural member is welded to the fourth surface of the cube coupling joint.

31. The joint assembly of claim 27, wherein the first and second structural members are Hollow Structural Sections (HSS).

32. The joint assembly of claim 27, wherein each of the first and second structural members comprises a first width and a first height, and wherein each of the second and third surfaces of the cube coupling joint comprises a second height and second width, the first width being substantially equal to the second width and the first height being substantially equal to the second height.

33. The joint assembly of claim 26, wherein the cube coupling joint comprises steel.

* * * * *